(12) United States Patent
Ohtuka

(10) Patent No.: US 7,515,289 B2
(45) Date of Patent: Apr. 7, 2009

(54) NETWORK PRINTING SYSTEM, SERVER, PRINTING MACHINE, AND PRINTING METHOD

(75) Inventor: Toshihiko Ohtuka, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 854 days.

(21) Appl. No.: 10/602,362

(22) Filed: Jun. 23, 2003

(65) Prior Publication Data

US 2004/0001226 A1    Jan. 1, 2004

(51) Int. Cl.
- G06F 3/12 (2006.01)
- G06F 15/16 (2006.01)
- G06F 15/167 (2006.01)

(52) U.S. Cl. ............... 358/1.15; 358/1.1; 358/1.16; 358/501; 358/524; 358/401; 358/403; 348/207.1; 348/207.99; 709/201; 709/202; 709/203; 709/205; 709/212; 709/213; 709/216; 709/217; 709/218; 709/219

(58) Field of Classification Search ....... 358/1.15–1.18, 358/302, 400–403, 442, 1.1, 501, 524; 709/201–203, 709/211–219, 206, 245; 725/91, 114; 455/3.06, 455/457; 348/231.1, 552, 207.1, 231.99, 348/207.11, 207.2; 396/429
See application file for complete search history.

(56) References Cited

U.S. PATENT DOCUMENTS

| | | | |
|---|---|---|---|
| 6,337,712 B1 * | 1/2002 | Shiota et al. | 348/231.1 |
| 6,778,289 B1 * | 8/2004 | Iwata | 358/1.15 |
| 6,957,040 B1 * | 10/2005 | Tanaka | 455/3.06 |
| 7,019,856 B2 * | 3/2006 | Kawabata | 358/1.15 |
| 7,110,132 B2 * | 9/2006 | Takayanagi | 358/1.15 |
| 7,161,697 B2 * | 1/2007 | Yajima | 358/1.15 |
| 7,197,531 B2 * | 3/2007 | Anderson | 709/203 |
| 7,277,193 B2 * | 10/2007 | Bunn et al. | 358/1.15 |
| 2001/0034774 A1 * | 10/2001 | Watanabe et al. | 709/217 |
| 2001/0041072 A1 * | 11/2001 | Takano | 396/429 |
| 2001/0046067 A1 * | 11/2001 | Taniguchi | 358/1.15 |
| 2002/0032909 A1 * | 3/2002 | Shiota et al. | 725/91 |
| 2002/0041399 A1 * | 4/2002 | Ichikawa | 358/402 |
| 2002/0101611 A1 * | 8/2002 | Shima | 358/1.15 |
| 2002/0101619 A1 * | 8/2002 | Tsubaki et al. | 358/302 |

(Continued)

FOREIGN PATENT DOCUMENTS

JP    10-150523 A    6/1998

*Primary Examiner*—Mark K Zimmerman
*Assistant Examiner*—Chad Dickerson
(74) *Attorney, Agent, or Firm*—Frishauf, Holtz, Goodman & Chick, P.C.

(57) ABSTRACT

A mobile phone transmits an e-mail with attaching captured image data thereto, to a data center. In response to arrival of the e-mail from the mobile phone, the data center transfers the image data attached to the e-mail to a database for storing while associating the image data with user ID information for identifying a user who sent the e-mail concerned. Responding to access with ID notification, the data center retrieves designated image data from the database, and transmits the retrieved image data to a photo vending machine. The photo vending machine transmits request information including the user ID information to said data center, and receives the image data which are transmitted by the data center in response to the request information. The photo vending machine prints the arrived image data in accordance with the user's instruction.

8 Claims, 37 Drawing Sheets

U.S. PATENT DOCUMENTS

| | | | |
|---|---|---|---|
| 2002/0137529 A1* | 9/2002 | Takahashi | 455/457 |
| 2002/0138564 A1* | 9/2002 | Treptow et al. | 709/203 |
| 2002/0140989 A1* | 10/2002 | Shinchi et al. | 358/402 |
| 2002/0154336 A1* | 10/2002 | Takei | 358/1.15 |
| 2002/0186408 A1* | 12/2002 | Nakaoka et al. | 358/1.15 |
| 2002/0196478 A1* | 12/2002 | Struble | 358/474 |
| 2002/0198936 A1* | 12/2002 | McIntyre et al. | 709/203 |
| 2002/0198954 A1* | 12/2002 | Okamoto et al. | 709/213 |
| 2003/0048484 A1* | 3/2003 | Seki et al. | 358/402 |
| 2003/0078963 A1* | 4/2003 | Parry | 709/203 |
| 2003/0107762 A1* | 6/2003 | Kinoshita et al. | 358/1.15 |
| 2003/0107777 A1* | 6/2003 | Yamade et al. | 358/442 |

* cited by examiner

| USER CODE | NAME | ADDRESS | PHONE NO. | E-MAIL ADDRESS | PASSWORD | DIRECTORY |
|---|---|---|---|---|---|---|
| 200201290001 | Mr.A | Tokyo,JP | 090-****-1234 | a@+++.co.jp | MYTG1432 | sada-0001 |
| 200201290002 | Mr.B | Osaka,JP | 090-**-5678 | b@*.co.jp | OKHY2918 | sdad-0002 |
| 200201290003 | Mr.C | New York,US | 090-****-4321 | c@$$$.com | IHYT13281 | dsad-0003 |
| 200201290004 | Ms.D | Beijing,CN | 090-****-8765 | d@###.com | APSIU0987 | sjsh-0001 |
| 200201290005 | Ms.E | Seoul,KR | 090-****-2468 | e@%%%.com | SIJYD7653 | dsada-0001 |
| 200201290006 | Ms.F | London,UK | 090-****-3249 | f@&&&.com | HTGE3428 | sdada-0002 |
| : | : | : | : | : | : | : |

FIG.12
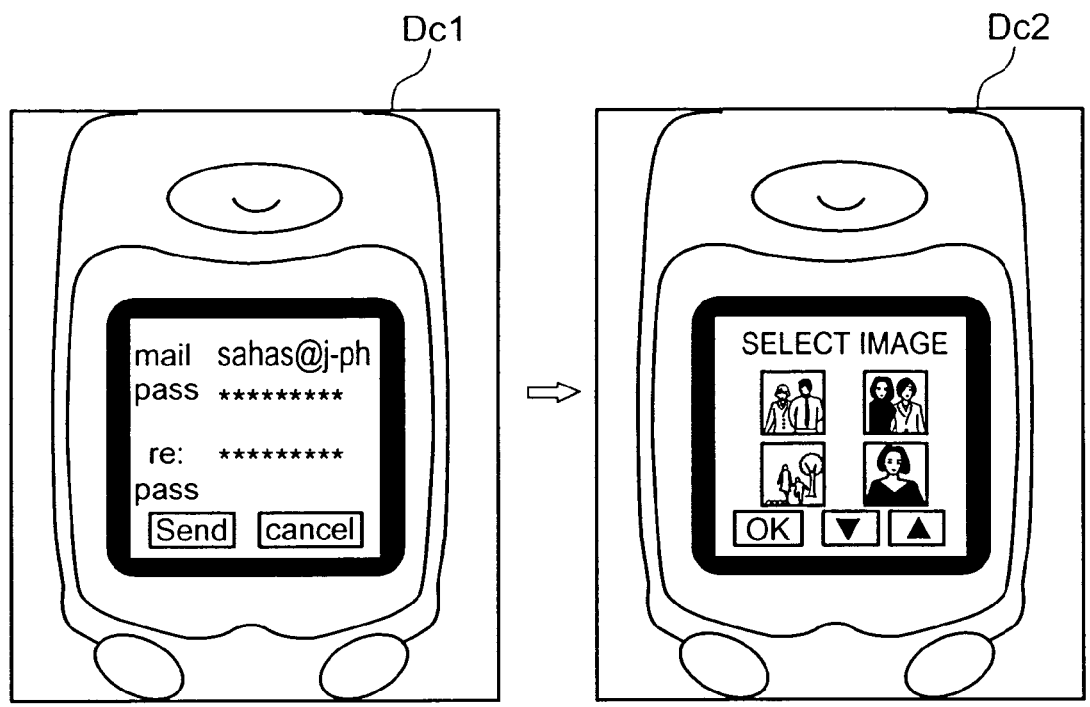
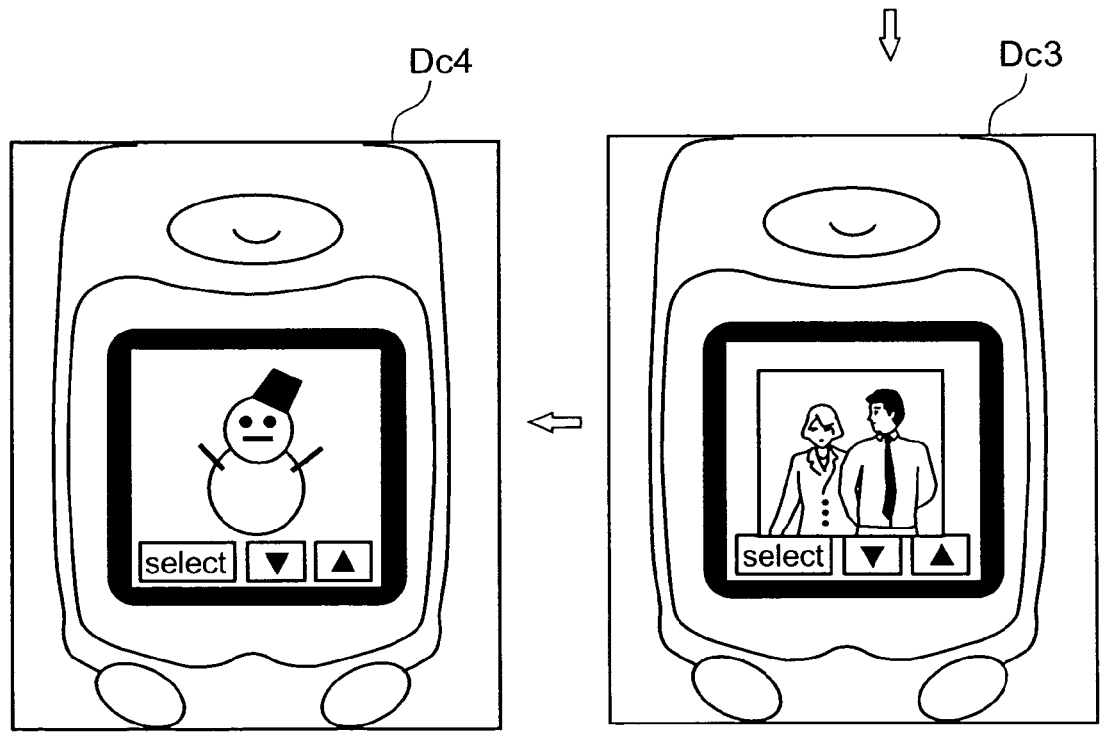

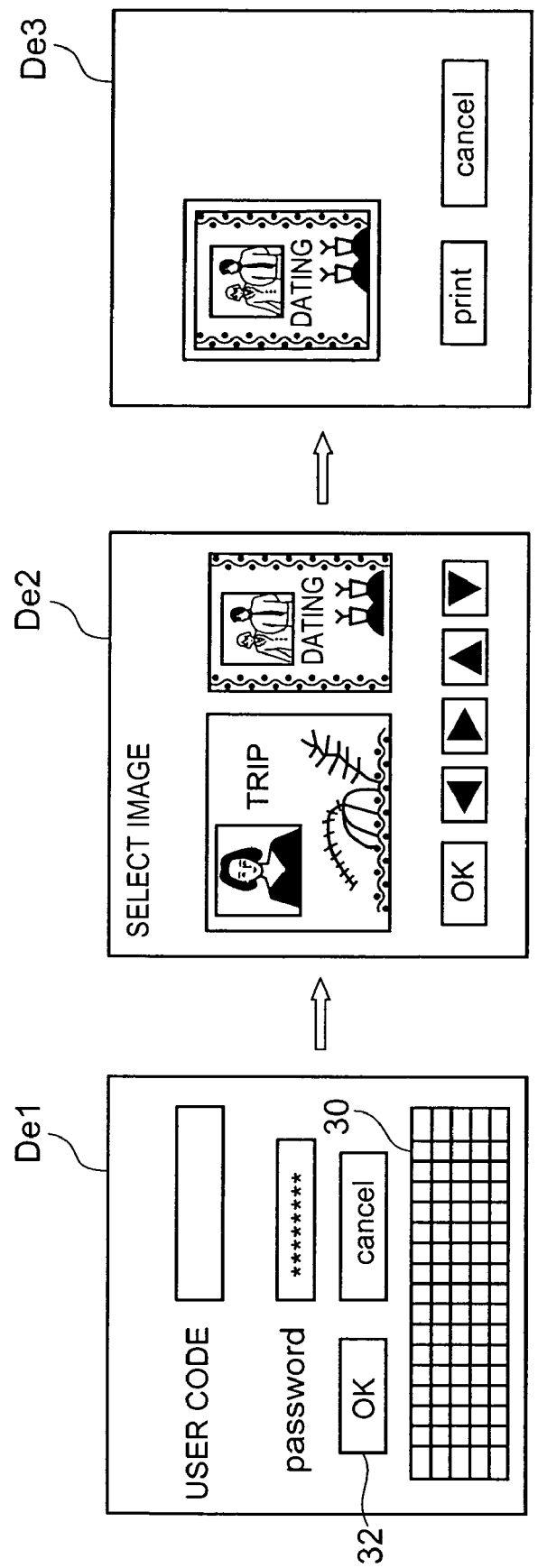

photo vending machine 5a: server URL: www.***photo.jp/001/
photo vending machine 5b: server URL: www.***photo.jp/002/ photo vending machine 5a: server URL: 001.***photo.jp
photo vending machine 5b: server URL: 002.***photo.jp

FIG.29A http:// ..... /sample.php?date1=20030220&date2=20030221
$date1= '20030220' ;
$date2= '20030221' ;

FIG.29B http:// ..... /sample.php?date1=200301&date2=200302
$date1= '200301' ;
$date2= '200302' ;

FIG.29C http:// ..... /sample.php?date1=200301&date2=20030220
$date1= '200301' ;
$date2= '20030220' ;

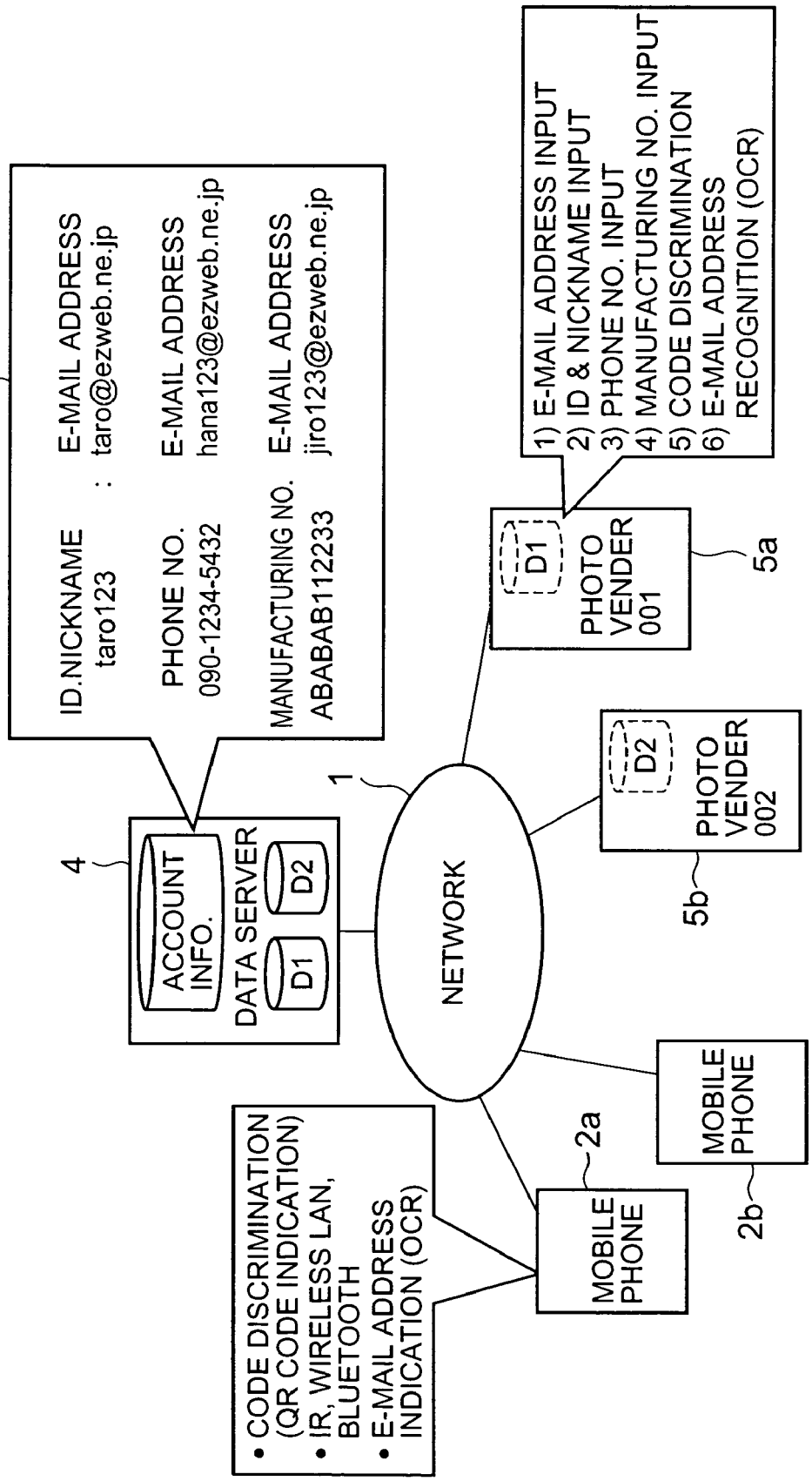

US 7,515,289 B2

NETWORK PRINTING SYSTEM, SERVER, PRINTING MACHINE, AND PRINTING METHOD

FIELD OF THE INVENTION

The present invention relates to a network printing system, server, printing machine, and printing method for providing useful printing service for printing image data captured by terminal devices with using a network.

DESCRIPTION OF THE RELATED ART

Photo printing machines for printing photo images captured by a digital still camera have been seen at common places such as shops or streets. Such the printing machines obtain photo images (image data) from the medium inserted thereto, and print the obtained photo images onto predetermined sheets. To use such the printing machine, a user takes out the medium having image data from the digital still camera, and insert it to the printing machine. Once the user select desired images on the printing machine, it prints out the selected images (photo) immediately. Thus, anyone can get photo printing service easily and quickly.

Not only ordinary photo printing, those printing machines also provides additional functions such as superimposing. For example, various frame images or character images are able to be superimposed onto the user's photo images. Those printing machines usually receives the frame image data or character image data via, for example, a communication satellite, and stocks them. In accordance with the user's operation for selecting arbitrary photo images and frame image, the printing machine superimposes the frame image on the selected photo images, and prints them out. Thus, more interesting photo images are available.

Japanese Patent Gazette (Laid Open Application) No. H10-150523 discloses an image storage system for storing photo images on an image server. The image storage system comprises an image server for storing photo images and various devices including a digital still camera. According to the system, various ways are available for transmitting photo images captured by the digital still camera, and various devices are adaptive for accessing the image server to obtain the stored photo images.

Such the conventional printing machines obtain photo images from predetermined removable recording media, thus adaptive devices are limited to predetermined digital still cameras. In other words, some mobile terminals (e.g. mobile phone with camera function) which are not adaptive to a removable recording medium (that is, only internal memory is available) are not adaptive to the conventional printing machines.

Therefore, it has been demanded a new technique for a photo vending machine that is able to obtain photo images from terminal devices without predetermined removable recording media, and provide printing service.

And, there is another demand for more useful optional functions in addition to superimposing frame images or character images on the user's photo.

SUMMARY OF THE INVENTION

The present invention has been made for improving the conventional techniques.

It is an object of the present invention to provide a network printing system, a server, a printing machine, and a printing method for providing useful printing service for printing image data captured by a terminal device with using a network.

It is another object of the present invention to provide a network printing system, a server, a printing machine, and a printing method by which more useful printing service will be available.

To achieve the above objects, a network printing system according to a first aspect of the present invention is a system comprising terminal devices, a server, and printing machines being connected to each other via a network, wherein each of the terminal devices comprises:

an image capturing unit which generates image data representing captured subject; and an e-mail transmitter which transmits an e-mail to which the image data generated by the image capturing unit are attached, to the server, the server comprises:

an e-mail receiver which receives e-mails transmitted by the terminal devices;

a storage unit which stores the image data attached to the e-mails received by the e-mail receiving unit so as to be associated with user ID information;

a request receiver which receives request information including the user ID information transmitted by the printing machines;

an image transmitter which transmits the image data stored in the storage unit to the printing machines in response to the reception of the request information by the request receiving unit, and each of the printing machines comprises:

a transmitting unit which transmits request information including user ID information, to the server;

a receiving unit which receives the image data transmitted by the server in response to the request information transmitted by the transmitting unit; and a printing unit which prints the image data received by the receiving unit.

According to the above invention, in the terminal device, the image capturing unit generates image data representing captured subject, and the e-mail transmitter transmits an e-mail to which the image data generated by the image capturing unit are attached, to the server. In the server, the e-mail receiver receives e-mails transmitted by the terminal devices, the storage unit stores the image data attached to the e-mails received by the e-mail receiving unit so as to be associated with user ID information, the request receiver receives request information including the user ID information transmitted by the printing machines, the image transmitter transmits the image data stored in the storage unit to the printing machines in response to the reception of the request information by the request receiving unit. And the printing machine, the transmitting unit transmits request information including user ID information, to the server, the receiving unit receives the image data transmitted by the server in response to the request information transmitted by the transmitting unit, and the printing unit prints the image data received by the receiving unit. As a result, useful printing service for printing image data captured by terminal devices are available with using the network.

In the above network printing system, the terminal device may further comprise:

a memory unit which sequentially stores the image data generated by the image capturing unit; and an image selector which selects arbitrary image data from the image data stored in the memory unit, the e-mail transmitter transmits an e-mail to which the image data selected by the image selecting unit, to the server.

The server may further comprise:

a user ID generator which generates ID information of users who sent the e-mails received by the e-mail receiving unit; and a notice mail transmitter which transmits notice e-mail including the ID information associated to the image data by the storage unit when storing the image data, to the terminal devices, and the terminal device further comprises:

a notice receiving unit which receives the notice e-mail transmitted by the server; and a display unit which displays the notice e-mail received by the notice receiving unit.

The terminal device may further comprise:

a preview request transmitter which transmits preview request information including the user ID information, to the server;

a preview image receiver which receives the image data transmitted by the server in response to the preview request information transmitted by the preview request transmitting unit; and a display unit which displays the image data received by the preview image receiving unit, the server further comprises:

a preview request receiver which receives the preview request information transmitted by the terminal devices; and a preview image transmitter which retrieves image data corresponding to the preview request information from the storage unit, and transmits the retrieved image data to the terminal devices in response to the preview request information received by the preview request receiver.

The server may further comprise:

a thumbnail image request receiver which receives thumbnail image request information including user ID information transmitted by the printing machines;

a thumbnail image retriever which retrieves thumbnail images representing the image data corresponding to the thumbnail image request information received by the thumbnail image request receiver, from the storage unit; and a thumbnail image transmitter which transmits thumbnail image data retrieved by the thumbnail image retriever, to the printing machine, the printing machine further comprises:

a thumbnail image request transmitter which transmits the thumbnail image request information including the user ID information, to the server;

a thumbnail image receiver which receives thumbnail image data transmitted by the server in response to the thumbnail image request information transmitted by the thumbnail image request transmitter; and a display unit which displays the thumbnail images in accordance with the thumbnail image data received by the thumbnail image receiver.

The printing machine may further comprise:

an image storage unit which stores image data received by the receiving unit; and an image selector which selects arbitrary image data from the image data stored in the image storage unit, and the printing unit prints the image data selected by the image selector.

The printing machine may further comprise a layout setting unit which sets layout information including at least frames to be superimposed on the image data, and the printing unit prints the image data in accordance with the layout set by the layout setting unit.

To achieve the above objects, a network printing system according to a second aspect of the present invention is a system comprising terminal devices, a server, and printing machines being connected to each other via a network, wherein each of the terminal devices generates image data representing captured subject, and transmits an e-mail to which the image data are attached, to the server, the server stores the image data attached to the e-mail transmitted by the terminal device while associating the image data with ID information of the user who sent the e-mail concerned, and retrieves image data corresponding to request information from the printing machine to transmit the retrieved image data to the printing machine concerned in response to reception of the request information including the user ID information, and each of the printing machines transmits request information including user ID information to the server, and prints the image data transmitted by the server in response to the request information transmitted by the printing machine concerned.

According to the above invention, the terminal device generates image data representing captured subject, and transmits an e-mail to which the image data are attached, to the server. The server stores the image data attached to the e-mail transmitted by the terminal device while associating the image data with ID information of the user who sent the e-mail concerned, and retrieves image data corresponding to request information from the printing machine to transmit the retrieved image data to the printing machine concerned in response to reception of the request information including the user ID information. And, the printing machine transmits request information including user ID information to the server, and prints the image data transmitted by the server in response to the request information transmitted by the printing machine concerned. As a result, useful printing service for printing image data captured by terminal devices are available with using the network.

To achieve the above objects, a server according to a third aspect of the present invention is a server being connected to terminal devices and printing machines via network, comprises:

an e-mail receiver which receives e-mail to which image data are attached, transmitted by the terminal devices;

a storage unit which stores image data attached to the e-mails received by the e-mail receiver while associating the image data with ID information of the users who sent the e-mails concerned;

a request receiver which receives request information including user ID information, from the printing machines; and an image transmitter which transmits the image data corresponding to the request information received by the request receiver, to the printing machine concerned.

According to the above invention, the e-mail receiver receives e-mail to which image data are attached, transmitted by the terminal devices. The storage unit stores image data attached to the e-mails received by the e-mail receiver while associating the image data with ID information of the users who sent the e-mails concerned. The request receiver which receives request information including user ID information, from the printing machines. And, the image transmitter which transmits the image data corresponding to the request information received by the request receiver, to the printing machine concerned. As a result, useful printing service for printing image data captured by terminal devices are available with using the network.

To achieve the above objects, a printing machine according to a fourth aspect of the present invention is a printing machine being connected to terminal devices and a server via a network, comprises:

a transmitter which transmits request information including user ID information to the server which stores image data transmitted by the terminal devices being associated with the user ID information;

a receiver which receives the image data corresponding to the user represented by the user ID information included in the request information transmitted by the transmitter; and a printing unit which prints the image data received by the receiver.

According to the above invention, the transmitter transmits request information including user ID information to the server which stores image data transmitted by the terminal devices being associated with the user ID information. The receiver receives the image data corresponding to the user represented by the user ID information included in the request information transmitted by the transmitter. And, the printing unit which prints the image data received by the receiver. As a result, useful printing service for printing image data captured by the terminal device is available with using the network.

To achieve the above object, a network printing system according to a fifth aspect of the present invention is a system which comprises terminal devices, a server, and printing machines being connected to each other via a network, wherein each of the terminal devices comprises:

an image capturing unit which captures subjects and generates image data representing the captured subjects;

an e-mail receiver which receives e-mails including address information of the server, from the printing machines; and a transmitter which accesses the server indicated by the address information included in the e-mail received by the e-mail receiver to transmit the image data generated by the image capturing unit to the server concerned, the server comprises:

an image receiver which receives the image data from the terminal devices in response to the access by the terminal device with designating address;

a storage unit which stores the image data received by the image receiver at the designated address; and an image transmitter which transmits the designated image data in the storage unit, to the printing machine in response to the access by the printing machine concerned with designating the address, and each of the printing machines comprises:

an e-mail transmitter which transmits an e-mail including address information of the server, to the terminal device;

a determiner which determines whether the image data are stored at the address of the server designated by the e-mail transmitted by the e-mail transmitter;

a receiver which accesses the server with designating the address to receive image data transmitted by the server in response to the access, in a case where the determiner determines that the image data are stored; and a printing unit which prints image data received by the receiver.

According to the above invention, in the terminal device, the image capturing unit captures subjects and generates image data representing the captured subjects, the e-mail receiver receives e-mails including address information of the server, from the printing machines, and the transmitter accesses the server indicated by the address information included in the e-mail received by the e-mail receiver to transmit the image data generated by the image capturing unit to the server concerned. In the server, the image receiver receives the image data from the terminal devices in response to the access by the terminal device with designating address, the storage unit stores the image data received by the image receiver at the designated address, and the image transmitter transmits the designated image data in the storage unit, to the printing machine in response to the access by the printing machine concerned with designating the address. In the printing machine, the e-mail transmitter transmits an e-mail including address information of the server, to the terminal device, the determiner determines whether the image data are stored at the address of the server designated by the e-mail transmitted by the e-mail transmitter, the receiver accesses the server with designating the address to receive image data transmitted by the server in response to the access, in a case where the determiner determines that the image data are stored, and the printing unit prints image data received by the receiver. As a result, useful printing service for printing image data captured by terminal devices are available with using the network.

The terminal device may further comprise:

a memory unit which sequentially stores the image data generated by the image capturing unit; and an image retriever which retrieves image data corresponding arbitrary date of capturing, from the memory unit, the e-mail receiver receives an e-mail including address information of the server and date information representing designated date, the image retriever retrieves the image data from the memory unit in accordance with the date information included in the e-mail received by the e-mail receiver, and the image transmitter transmits the image data retrieved by the image retriever, to the printing machine.

The terminal device may further comprise a memory unit which stores DPOF information which designates at least image data to be printed, while sequentially storing the image data generated by the image capturing unit, and the image transmitter transmits the image data designated by the DPOF information stored in the memory unit, in response to the e-mail reception by the e-mail receiver.

To achieve the above objects, a network printing system according to a sixth aspect of the present invention is a system comprising terminal devices, a server, and printing machines being connected to each other via a network, wherein each of the terminal devices accesses the server with designating address included in an e-mail transmitted by the printing machine, and transmits image data representing captured subject to the server, the server stores the image data transferred from the terminal device at designated address of a predetermined storage, in response to access by the terminal device with designating the address, and transmits the designated image data of the image data stored in the storage, in response to the access by the printing machine with designating address, and the printing machine transmits an e-mail including the address of the server to the terminal device, determines existence of the image data which are stored at the address of the server in response to the e-mail transmitted by the printing machine concerned, accesses the server with designating the address when it is determined that the image data exist, and prints the image data which are transmitted by the server as response.

According to the above invention, the terminal device accesses the server with designating address included in an e-mail transmitted by the printing machine, and transmits image data representing captured subject to the server. The server stores the image data transferred from the terminal device at designated address of a predetermined storage, in response to access by the terminal device with designating the address, and transmits the designated image data of the image data stored in the storage, in response to the access by the printing machine with designating address. And, the printing machine transmits an e-mail including the address of the server to the terminal device, determines existence of the image data which are stored at the address of the server in response to the e-mail transmitted by the printing machine concerned, accesses the server with designating the address when it is determined that the image data exist, and prints the image data which are transmitted by the server as response. As a result, useful printing service for printing image data captured by terminal devices are available with using the network.

To achieve the above objects, a server according to a seventh aspect of the present invention is a server being connected to terminal devices and printing machines via a network, comprising:

an image receiver which receives image data transmitted by the terminal device, in response to the access by the terminal device with designating address;

a storage unit which stores the image data received by the image receiver at the designated address; and an image transmitter which transmits the designated image data of the image data in the storage unit in response to the access by the terminal device with address designation, to the printing machine in order to print the image data.

According to the above invention, the image receiver receives image data transmitted by the terminal device, in response to the access by the terminal device with designating address. The storage unit stores the image data received by the image receiver at the designated address. And, the image transmitter transmits the designated image data of the image data in the storage unit in response to the access by the terminal device with address designation, to the printing machine in order to print the image data. As a result, useful printing service for printing image data captured by terminal devices are available with using the network.

To achieve the above objects, a printing machine according to a eighth aspect of the present invention is a printing machine being connected to terminal devices and a server via a network, comprises:

an e-mail transmitter which transmits an e-mail including address information of the server to the terminal device;

a determiner which determines existence of the image data which are transmitted by the terminal device to be stored at address of the server in response to the e-mail transmitted by the e-mail transmitter;

a receiver which accesses the server with designating the address to receive the image data transmitted by the server in response to the access, when the determiner determines existence of the image data; and a printing unit which prints the image data received by the receiver.

According to the above invention, the e-mail transmitter transmits an e-mail including address information of the server to the terminal device. The determiner determines existence of the image data which are transmitted by the terminal device to be stored at address of the server in response to the e-mail transmitted by the e-mail transmitter. The receiver accesses the server with designating the address to receive the image data transmitted by the server in response to the access, when the determiner determines existence of the image data. And, the printing unit prints the image data received by the receiver. As a result, useful printing service for printing image data captured by terminal devices are available with using the network.

To achieve the above objects, a printing method according to a ninth aspect of the present invention is a method for a system having terminal devices, a server, and printing machines being connected to each other via a network, comprises the steps of:

transferring an e-mail with attaching image data captured by the terminal device from the terminal device to the server;

storing the image data attached to the transferred e-mail while associating the image data concerned with ID information of the user who sent the e-mail, in a storage of the server;

transferring request information including the user ID information from the printing machine to the server;

transferring requested image data in the image data stored in the storage of the server, from the server to the printing machine in response to the transferred request information; and printing the transferred image data by the printing machine.

According to the above invention, e-mail with attaching image data captured by the terminal device is transferred from the terminal device to the server. The image data attached to the transferred e-mail is stored in a storage of the server while being associated with ID information of the user who sent the e-mail. Request information including the user ID information is transferred from the printing machine to the server. Requested image data in the image data stored in the storage of the server are transferred from the server to the printing machine, in response to the transferred request information. And, the transferred image data are printed by the printing machine. As a result, useful printing service for printing image data captured by terminal devices are available with using the network.

To achieve the above objects, a printing method according to a tenth aspect of the present invention is a method for a system having terminal devices, a server, and printing machines being connected to each other via a network, comprises the steps of:

receiving an e-mail including address information of the server, being transferred from the printing machine to the terminal device;

accessing the server by the terminal device with designating the address included in the received e-mail, and transferring the image data captured by the terminal device from the terminal device to the server;

storing the transferred image data at the designated address in a storage of the server;

transferring designated image data of the image data stored in the storage of the server to the printing machine in response to accessing the server by the printing machine with address designation; and printing the transferred image data by the printing machine.

According to the above invention, e-mail including address information of the server being transferred from the printing machine to the terminal device is received. The server is accessed by the terminal device with designating the address included in the received e-mail, and the image data captured by the terminal device are transferred from the terminal device to the server. The transferred image data are stored at the designated address in a storage of the server. The designated image data of the image data stored in the storage of the server are transferred to the printing machine in response to accessing the server by the printing machine with address designation. And, the transferred image data are printed by the printing machine. As a result, useful printing service for printing image data captured by terminal devices are available with using the network.

To achieve the above objects, a printing method according to an eleventh aspect of the present invention is a method for a printing machine being connected to terminal devices and a server via a network, comprises the steps of:

transmitting request information including user ID information to the server which stores image data transferred from the terminal device being associated with the user ID information;

receiving image data corresponding to the user designated by the user ID information in the transmitted request information; and printing the received image data.

According to the above invention, request information including user ID information is transmitted to the server which stores image data transferred from the terminal device being associated with the user ID information. The image data corresponding to the user designated by the user ID information in the transmitted request information are received. And, the received image data are printed. As a result, useful printing service for printing image data captured by terminal devices are available with using the network.

To achieve the above objects, a printing method according to a twelfth aspect of the present invention is a method for a printing machine being connected to terminal devices and a server via a network, comprises the steps of:

transmitting an e-mail including address information of the server, to the terminal device;

determining whether the image data transferred from the terminal device to the server in response to the transmitted e-mail exists at designated address in the server or not;

accessing the server with designating address in a case where it is determined that the image data concerned exist, to receive image data transferred from the server in response to the access; and printing the received image data.

According to the above invention, an e-mail including address information of the server is transmitted to the terminal device. It is determined whether the image data transferred from the terminal device to the server in response to the transmitted e-mail exists at designated address in the server or not. The server is accessed with designating address in a case where it is determined that the image data concerned exist, thus, image data transferred from the server are received in response to the access. And, the received image data are printed. As a result, useful printing service for printing image data captured by terminal devices are available with using the network.

BRIEF DESCRIPTION OF THE DRAWINGS

These objects and other objects and advantages of the present invention will become more apparent upon reading of the following detailed description and the accompanying drawings in which:

FIG. 12 is a schematic view showing exemplified screen images for explaining image browsing operations;

FIG. 21 is a schematic view showing exemplified screen images for explaining album printing process;

FIGS. 29A, 29B, and 29C are schematic views showing exemplified date information;

FIG. 37 is a simplified schematic view showing the network printing system including the data center which stores a address finder table, and the like.

DETAILED DESCRIPTION OF THE PREFERRED EMBODIMENTS

Embodiments of the present invention will now be described with reference to drawings.

First Embodiment

Figure 1:
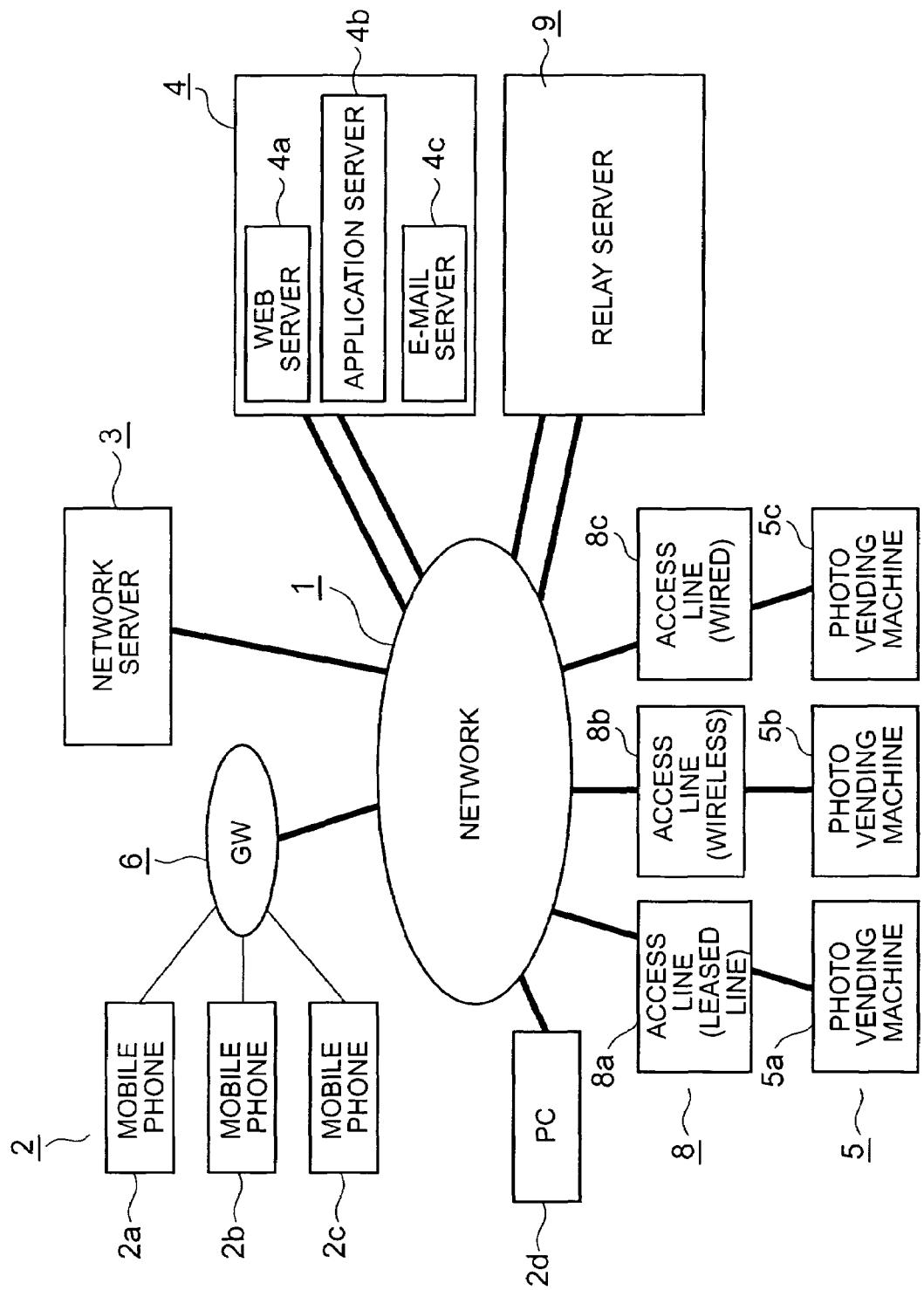
FIG. 1 is a block diagram showing an exemplified configuration of a network printing system according to a first embodiment of the present invention.

FIG. 1 is a block diagram exemplifying the configuration of a network printing system according to a first embodiment of the present invention.

As shown in FIG. 1, the network printing system comprises terminal devices (mobile phones) 2, a network server 3, a data center 4, photo vending machines 5, and a relay server 9. And, those are connected to each other via a network 1 such as the Internet.

The terminal devices 2 may be a mobile phone, a personal computer (PC), a mobile (PC), a PDA (Personal Data Assistants), or the like. In this embodiment, mobile phones with camera function are employed as terminal devices 2a-2c (hereinafter, referred to as "mobile phones 2a-2c"), and PC is employed as a terminal device 2d (hereinafter, referred to as "PC 2d"), and "user" means a user of the terminal device 2 (mobile phone 2a-2c or the PC 2d).

Those mobile phones 2a-2c are connected to the network 1 via a predetermined gateway (GW) 6. The gateway 6 carries out predetermined data conversions when the mobile phones 2 transmit/receive e-mails. For example, the gateway 6 carries out e-mail format conversion, address conversion, protocol conversion, and the like.

Figure 2:
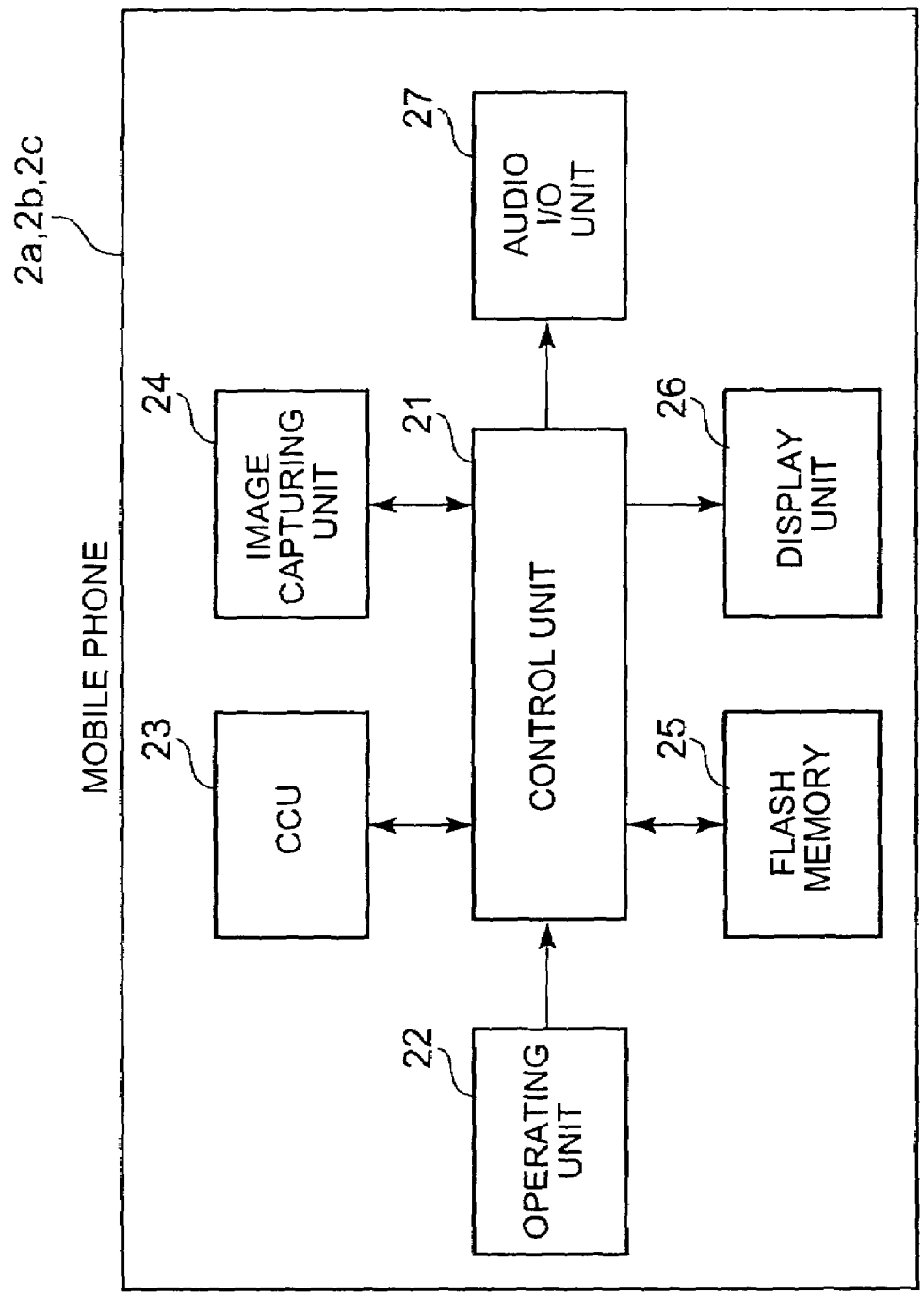
FIG. 2 is a schematic view showing an exemplified configuration of a mobile phone.

The configuration of each of the mobile phones 2a, 2b, and 2c will now be described with reference to FIG. 2. As shown in FIG. 2, the mobile phone 2 comprises a control unit 21, an operating unit 22, a communications control unit (CCU) 23, an image capturing unit 24, a flash memory 25, a display unit 26, and an audio input/output (I/O) unit 27.

The control unit 21 comprises a CPU (Central Processing Unit), ROM (Read Only Memory), RAM (Random Access Memory), and the like, and controls whole units or components in the mobile phone 2.

The operating unit 22 comprises a plurality of keys, and the like to input instructional information in accordance with the user's operation.

The CCU 23 transmits/receives audio signals to/from a predetermined wireless base station during phone call mode, and transmits/receives e-mails via the wireless base station and the gateway 6 during e-mail mode.

The image capturing unit 24 comprises a lens, a CCD (Charge Coupled Device), and the like to capture arbitrary subjects and generates image data.

The flash memory 25 is a built-in memory in the mobile phone 2, and stores image data generated by the image capturing unit 24.

The display unit 26 may be a liquid crystal display (LCD) unit which displays information representing status of the mobile phone 2, or image data in the flash memory 25.

The audio I/O unit 27, inputs user's voice and outputs received voice during the phone call mode.

Referring to FIG. 1 to explain the other components of the system.

The network server 3 is a server for managing the network of the system. For example, the network server 3 is located in a business body which operates the system to control or manage the whole system.

Figure 3:
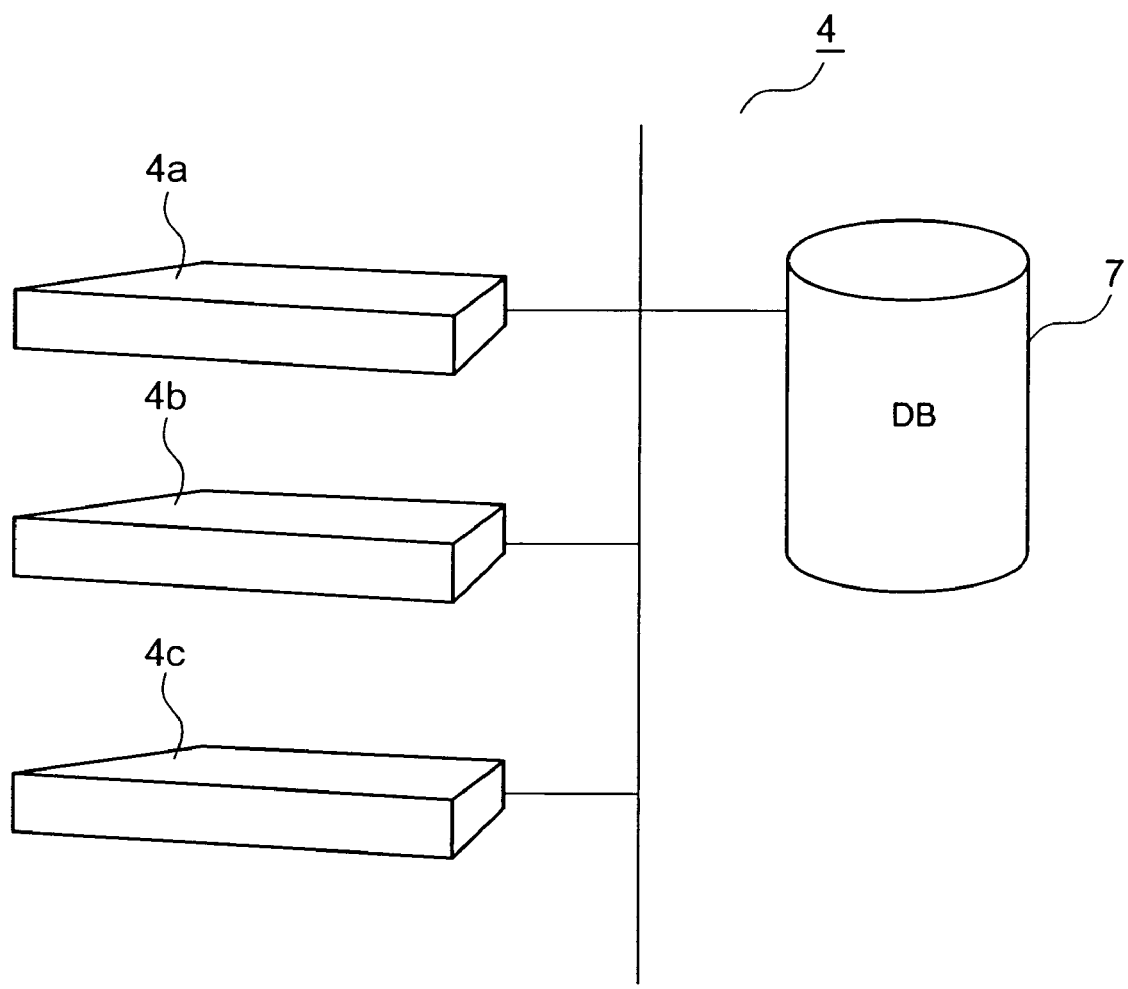
FIG. 3 is a schematic view showing an exemplified configuration of a data center.

The data center 4 comprises a web server 4a, an application server 4b, an e-mail server 4c, and the like. The data center 4 carries out image processing, database management, firewall control, e-mail management, DNS (Domain Name System) operation, and the like. In the data center 4, the appliance servers (web server 4a, application server 4b, and e-mail server 4c) are connected to a database (DB) 7 via LAN (Local Area Network) or a predetermined bus as shown in FIG. 3.

The database 7 stores and manages predetermined "user information" for managing information of each user, "print image information" for managing image data registered by the users, and the like.

Figures 4A, 4B:
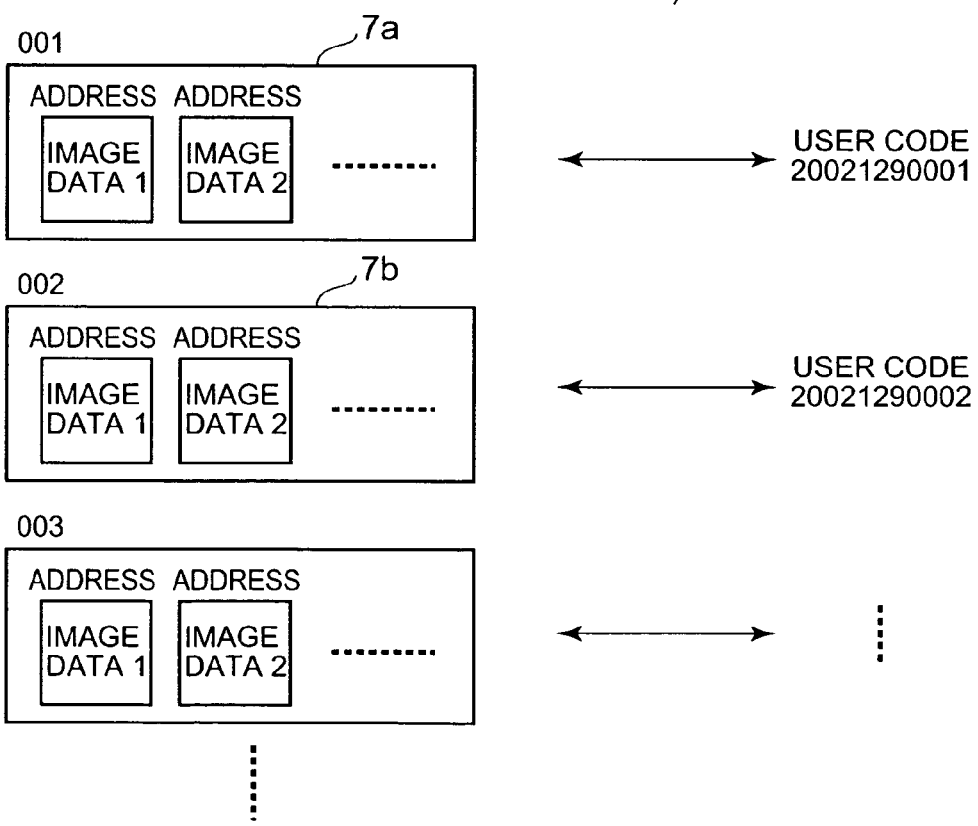
FIG. 4A is a schematic view exemplifying user information stored in a database.
FIG. 4B is a schematic view exemplifying print image information stored in the database.

An example of the "user information" is shown in FIG. 4A. As shown in FIG. 4A, the user information is categorized to "user code" (user ID), "name", "address", "phone No.", "e-mail address", "password", "directory", and the like.

"print image information" is exemplified in FIG. 4B. As shown in FIG. 4B, "print image information" is categorized into a plurality of areas prepared user by user, and stores image data respectively. Each of the areas is numbered with linking to the user information (user code) shown in FIG. 4A. Hereinafter, those numbers will be referred to as "Link Code". For example, the area 7a to which link code "001" is given, is linked to the user information to which user code "200201290001" is given. Similarly, the area 7b to which link code "002" is given, is linked to the user information to which user code "2002012902" is given.

Referring to FIG. 1 to explain the rest of the components of the system. Each of the photo vending machine 5 may be located in a shop or the like, and those are connected to the network 1 via predetermined access lines 8.

Figure 5:
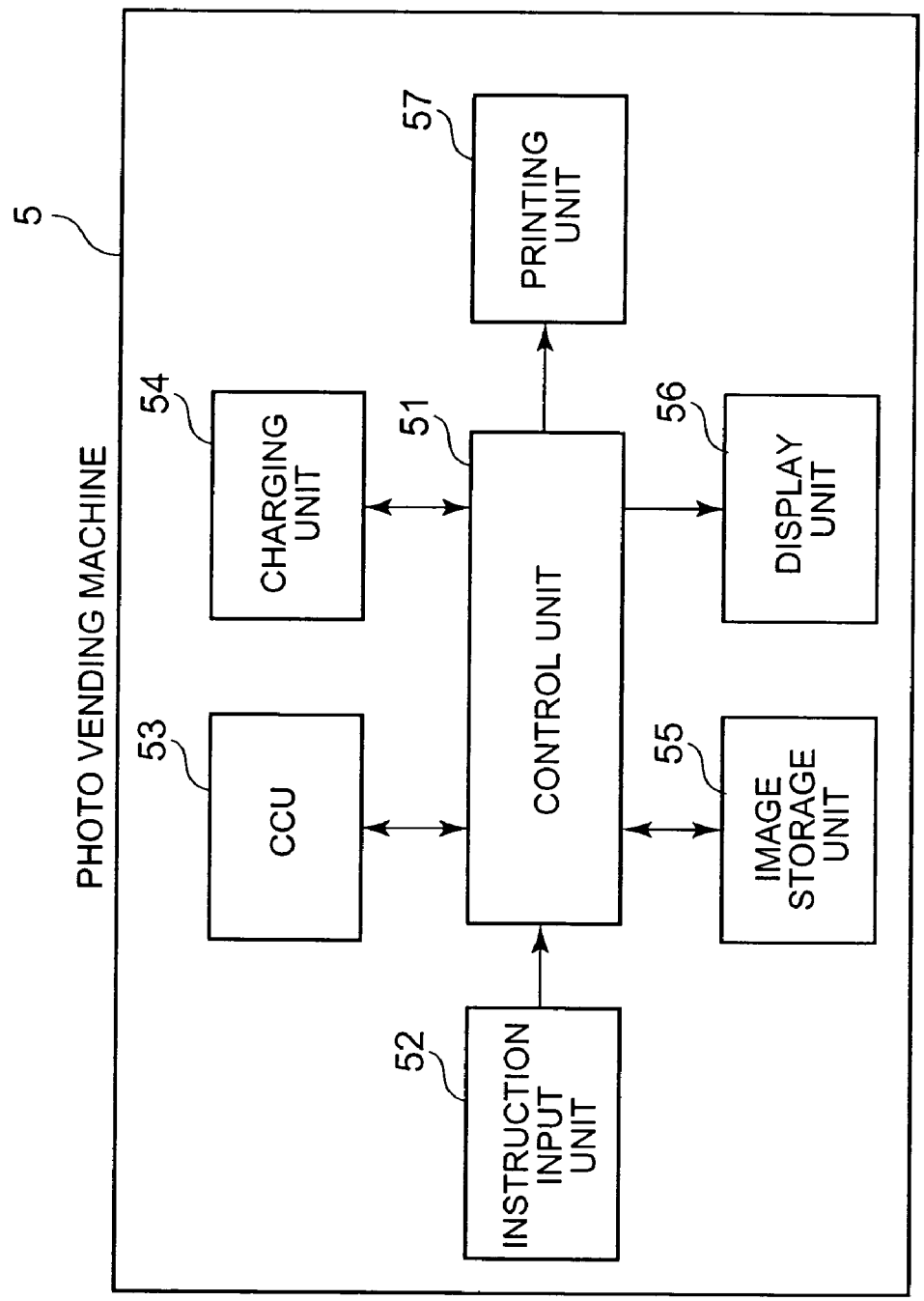
FIG. 5 is a schematic view showing an exemplified configuration of a photo vending machine.

Configuration of each photo vending machine 5 (5a, 5b, and 5c) will now be described with reference to FIG. 5. As shown in FIG. 5, the photo vending machine 5 comprises a control unit 51, an instruction input unit 52, a communications control unit (CCU) 53, a charging unit 54, an image storage unit 55, a display unit 56, and a printing unit 57.

The control unit 51 comprises a CPU, ROM, RAM, and the like, to control whole units or components in the photo vending machine S.

The instruction input unit 52 comprises a plurality of keys or buttons to input predetermined instruction information in accordance with the user's operation. For example, the instruction input unit 21 may be adaptive to input by a touch panel which is optionally attached on the display unit 56.

The CCU 53 transmits user ID, password, and the like to the data center 4, and receives image data (thumbnail image data) and the like from the data center 4 as response.

The charging unit 54 calculates fee for printing when printing out image data, displays the fee on the display unit, and stores coins or bills paid by the users. The charging unit 54 also manages the changes.

The image storage unit 55 stores image data and the like received from the data center 4 by the CCU 53.

The display unit 56 may be a CRT (Cathode Ray Tube) display or a LCD (Liquid Crystal Display) which displays status of the operations or image data (thumbnail images) in the image storage unit 55.

The printing unit 57 may be a color dye sublimation printer or the like, which prints the image data in the image storage unit 55 on predetermined sheets in accordance with predetermined layout.

In addition, the photo vending machine 5 comprises some interfaces for accepting various memory cards, thus it is able to read image data from the memory cards.

As shown in FIG. 1, each of the photo vending machine 5 is connected to the network 1 via appropriate access line 8. For example, the photo vending machine 5a is connected to the network 1 via a leased line 8a, the photo vending machine 5b employs wireless connection 8b (predetermined protocol), and the photo vending machine 5c uses wired access 8c such as xDSL (x Digital Subscriber Line), CATV (Cable Television), and FTTH (Fiber To The Home).

Figure 6:
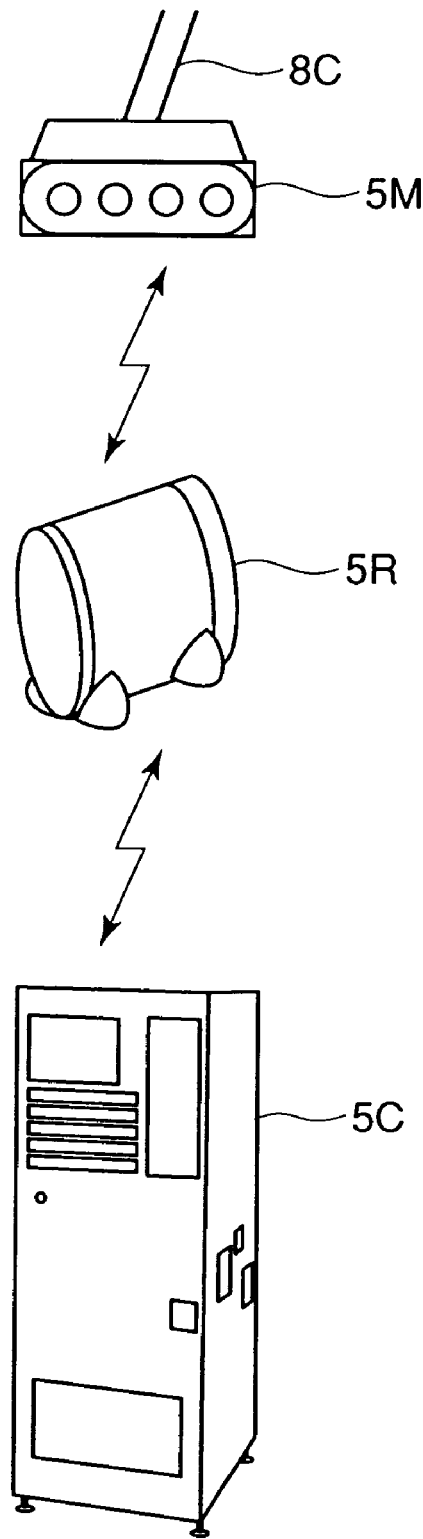
FIG. 6 is a schematic view showing a typical topology of connection between the access line and the photo vending machine.

A typical topology between the photo vending machine 5c and the wired access 8c will now be exemplified in detail with reference to FIG. 6. As shown in FIG. 6, the photo vending machine 5c is connected to the access line (wired) 8c via a router SR and a modem 5M.

Referring to FIG. 1 to explain unexplained components of the system. The relay server 9 relays data communications between the photo vending machine 5 and the data center 4, and between the photo vending machine 5 and the terminal device 2 in accordance with predetermined protocol such as HTTP (Hyper Text Transfer Protocol). More precisely, the relay server 9 receives HTML (Hyper Text Markup Language) files or image files (image data) from the mobile phones 2a-2c or the PC 2d, and transfers them to the data center 4. The relay server 9 also receives image files from the data center 4, and transfers them to the predetermined photo vending machines 5.

Steps and operations for using the network printing system according to the first embodiment will now be described.

Figure 7:
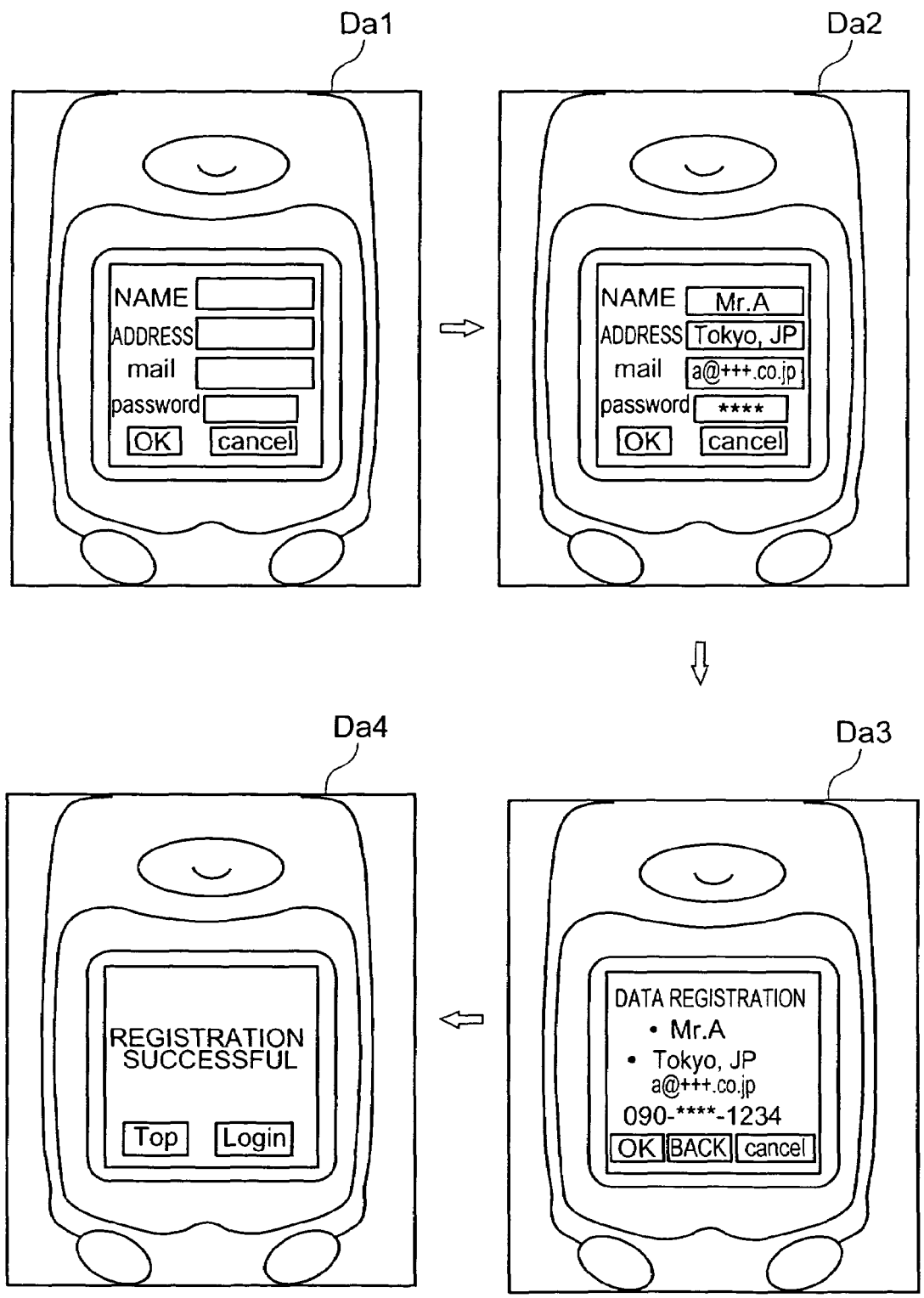
FIG. 7 is a schematic view showing exemplified screen images for explaining operations through the user registration process.

User registration is required as a first step for a user who intends to use the system. The user registration is carried out by the network server 3 in response to access by the mobile phone 2 of the user. Operations through the user registration will now be described with reference to FIG. 7 which schematically shows examples of screen images to be displayed on the display unit 26 of the mobile phone 2.

The user inputs URL (Uniform Resource Locator) of the network server 3 to the mobile phone 2. According to the input URL, the mobile phone 4 accesses the web site provided by the network server 3 via the network 1. The network server 3 provides image data of registration form with the mobile phone 2, and the mobile phone 2 displays it by its own web browsing program (Da1). The user fills in the registration form, that is, inputs user's name, address, e-mail address, and password (Da2).

In accordance with the user's operation pointing "OK" button, the mobile phone 2 displays input information for user's review (Da3). If the displayed information is complete, the user may point "OK" button. On the contrary, if any errors are found, the user may point "Back" button for retry.

In response to pointing "OK" button on the review page, the mobile phone 2 transmits the input information to the data center 4. After the data registration on the data center 4 is completed, a message saying "Registration Successful" is displayed on the mobile phone 2 (Da4).

Additionally, in accordance with the user's operation of pointing "Cancel" button during the registration process, the mobile phone 2 may quit the registration.

When the data from the mobile phone 2 arrives at the data center 4, the web server 4a adds the data to the database 7, thus user information shown in FIG. 4A have been stored in the database 7.

Figure 8:
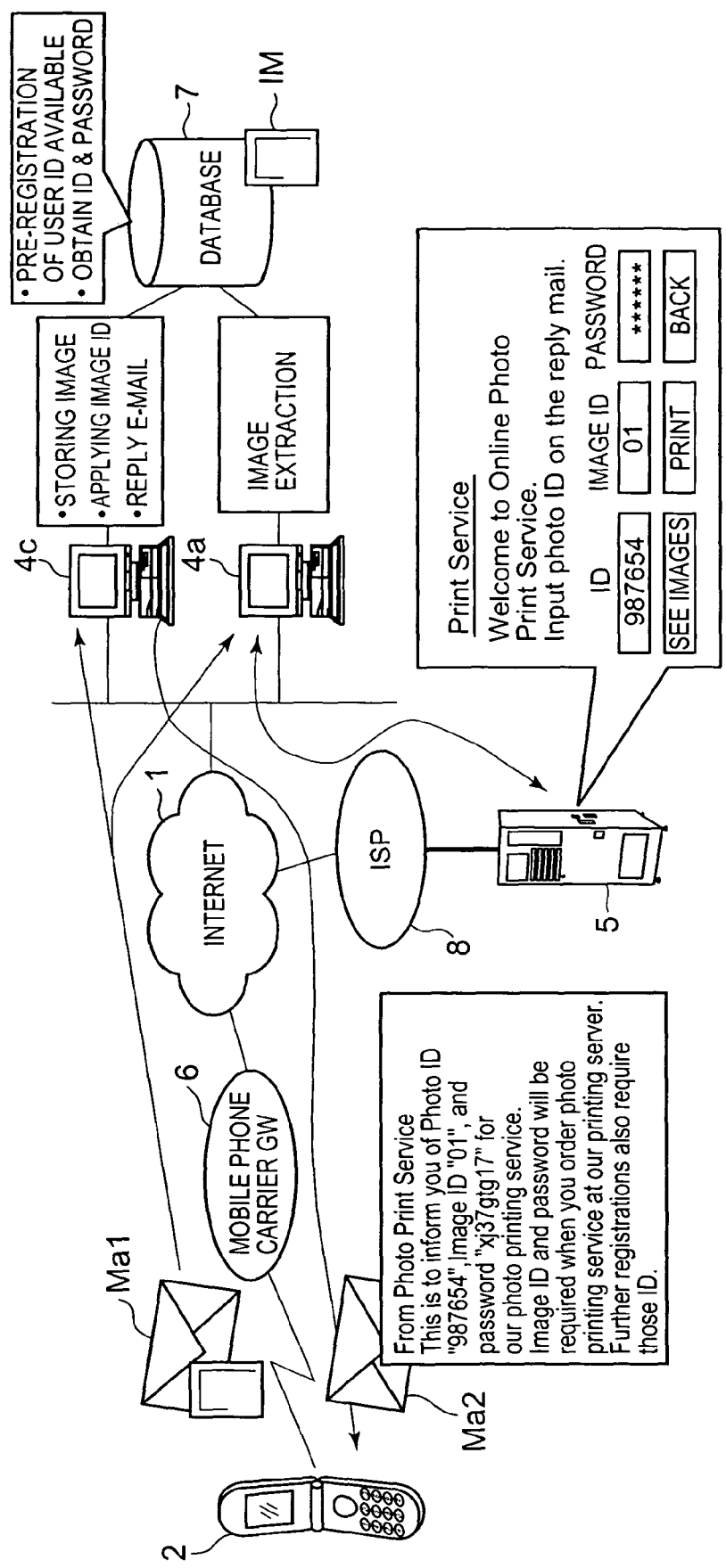
FIG. 8 is a schematic view for explaining steps and operations of network printing according to the first embodiment of the present invention.

Steps and operations for "Print by Network" provided by the network printing system will now be described with reference to FIG. 8 or other diagrams. FIG. 8 is a schematic diagram for explaining consecutive operations in the "Print-by-Network". Through the "Print by Network", image data IM in the mobile phone 2 is forwarded to the data center 4 by e-mail Ma1 to be registered to the database 7, and the photo vending machine 5 prints out the registered image data IM.

Figure 9:
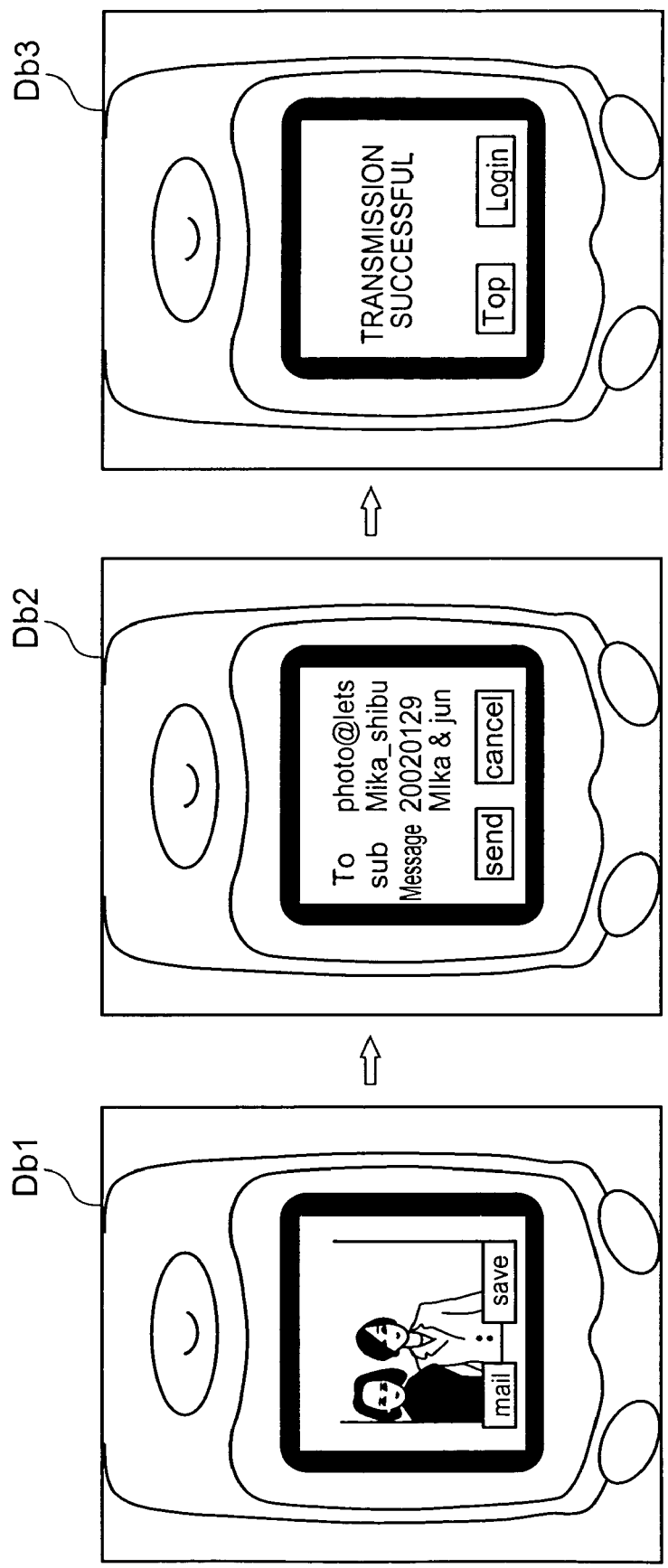
FIG. 9 is a schematic view showing exemplified screen images for explaining e-mail transmission process.

More precisely, the mobile phone 2 activates its e-mail transmission function to transmit e-mail Ma1 to which the image file (image data IM) is attached, to the data center 4. The transmission action will now be described with reference to FIG. 9. FIG. 9 is a diagram schematically showing screen images displayed on the display unit 26 of the mobile phone 2.

The user may capture images by the built-in camera of the mobile phone 2. The captured images are stored in the internal memory or the like as photo image (image data). In accordance with the user's operation, the mobile phone 2 displays the image data to be printed (Db1).

In accordance with the user's operation pointing "e-mail" button, the mobile phone 2 displays empty e-mail to be filled in by the user. Articles on the empty e-mail are "To" (addressee), "Subject", and "Message" (Db2). "To" is prepared for inputting addressee's e-mail address, and "Subject" is prepared for inputting file name of the image file to be transmitted. Additionally, "Message" may be filled in by information representing, for example, date of image data generation, comments, and the like. After the e-mail transmission has been ready, the user operates "Send" button, thus instruction for transmitting e-mail is given to the mobile phone 2.

In response to the "Send" button operation, the mobile phone 2 transmits the e-mail Ma1 to which the image data to be printed is attached, to the data center 4. After the transmission is successful, the mobile phone 2 displays a message saying that the transmission has been completed (Db3).

The above e-mail transmission may be canceled in accordance with the user's operation pointing "Cancel" button.

The data center 4 receives the e-mail Ma1 to which the image file(s) are attached, from the mobile phone 2 (FIG. 8). The data center 4 receives various e-mails through "E-mail Receiving Process" shown in FIG. 10.

Figure 10:
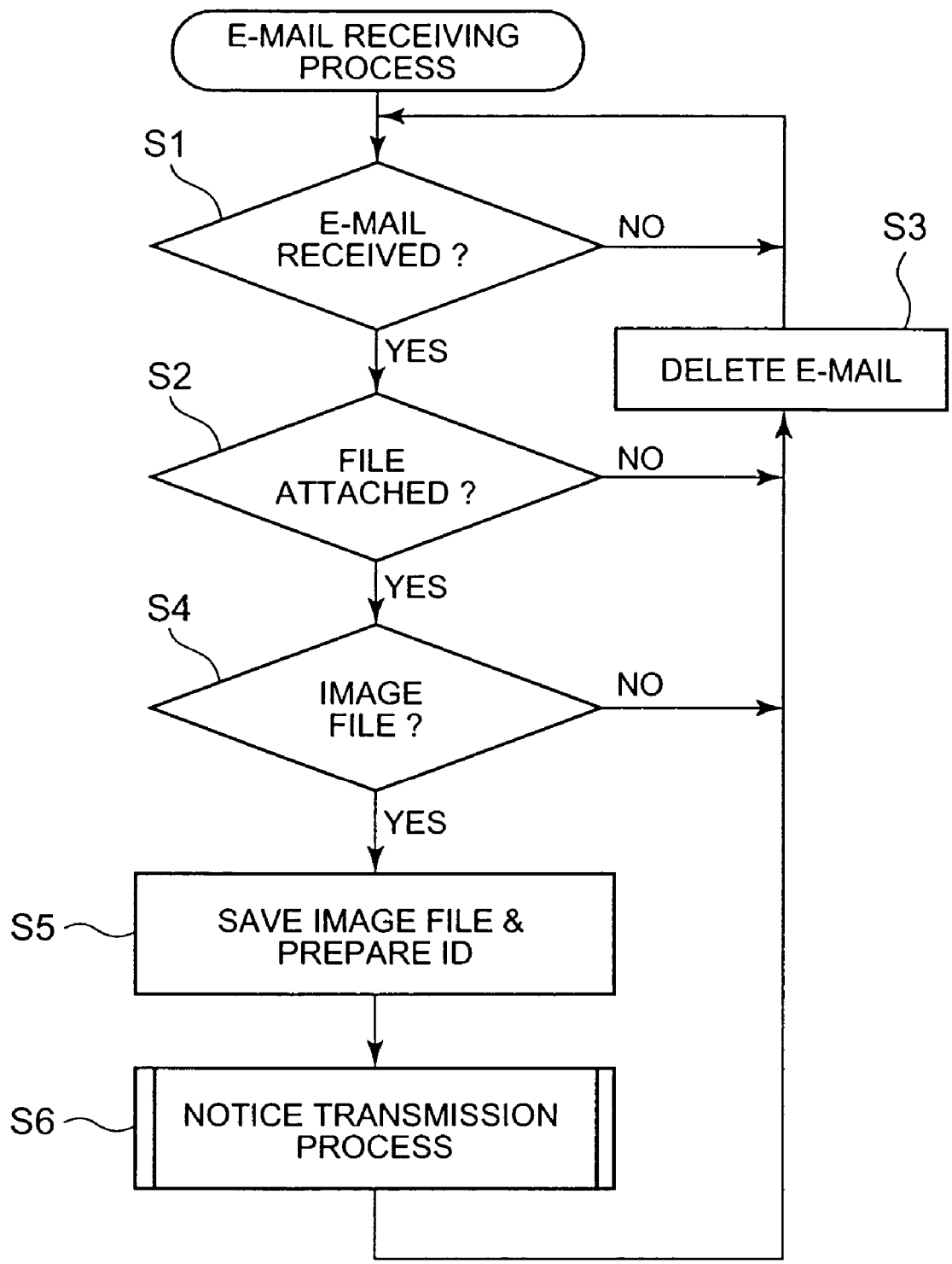
FIG. 10 is a flowchart for explaining e-mail receiving process carried out by the data center.

The e-mail receiving process will now be described with reference to FIG. 10. As shown in FIG. 10, the e-mail server 4c has been in a standby mode for receiving e-mails from the mobile phones 2 (S1). Once an e-mail arrives, the e-mail server 4c determines the e-mail has attached file or not (S2).

If no files is found, the e-mail server 4 transfers message in the e-mail to a memory or the like (not shown), and deletes the e-mail (S3). And the process flow returns to S1.

On the contrary, if any file is attached to the e-mail, the e-mail server 4c determines whether the attached file is image file (image data) or not (S4).

If it is not an image file, the e-mail server 4c carries out the process at S3. On the other hand, if the e-mail has an attached image file, the web server 4a stores the file on The database 7 (S5). Predetermined numbering operation is carried out during the image file storing, thus unique image ID is given. And thus numbered image files are stored in predetermined areas in the print image information shown in FIG. 4B being linked to the user information.

For example, if a user whose user code is "200201290001" transmits an image file, the web server 4a designates area 7a having link code "001" as a recording area for the image file. If the sender of the image file is a user whose user code is "200201290002", the web server 4a stores the image data in the area 7b to which link code "002" is assigned.

In a case where a plurality of image files are attached to an e-mail, or a plurality of mails are transmitted by the same user, the web server 4a those image files in the same area corresponding to the user code concerned.

After the image data are stored in the database 7 by the web server 4a, the e-mail server 4c carries out "Notice Transmission Process" for transmitting a notice to the sender of the image file by e-mail as shown in FIG. 10 (S6).

Figure 11:
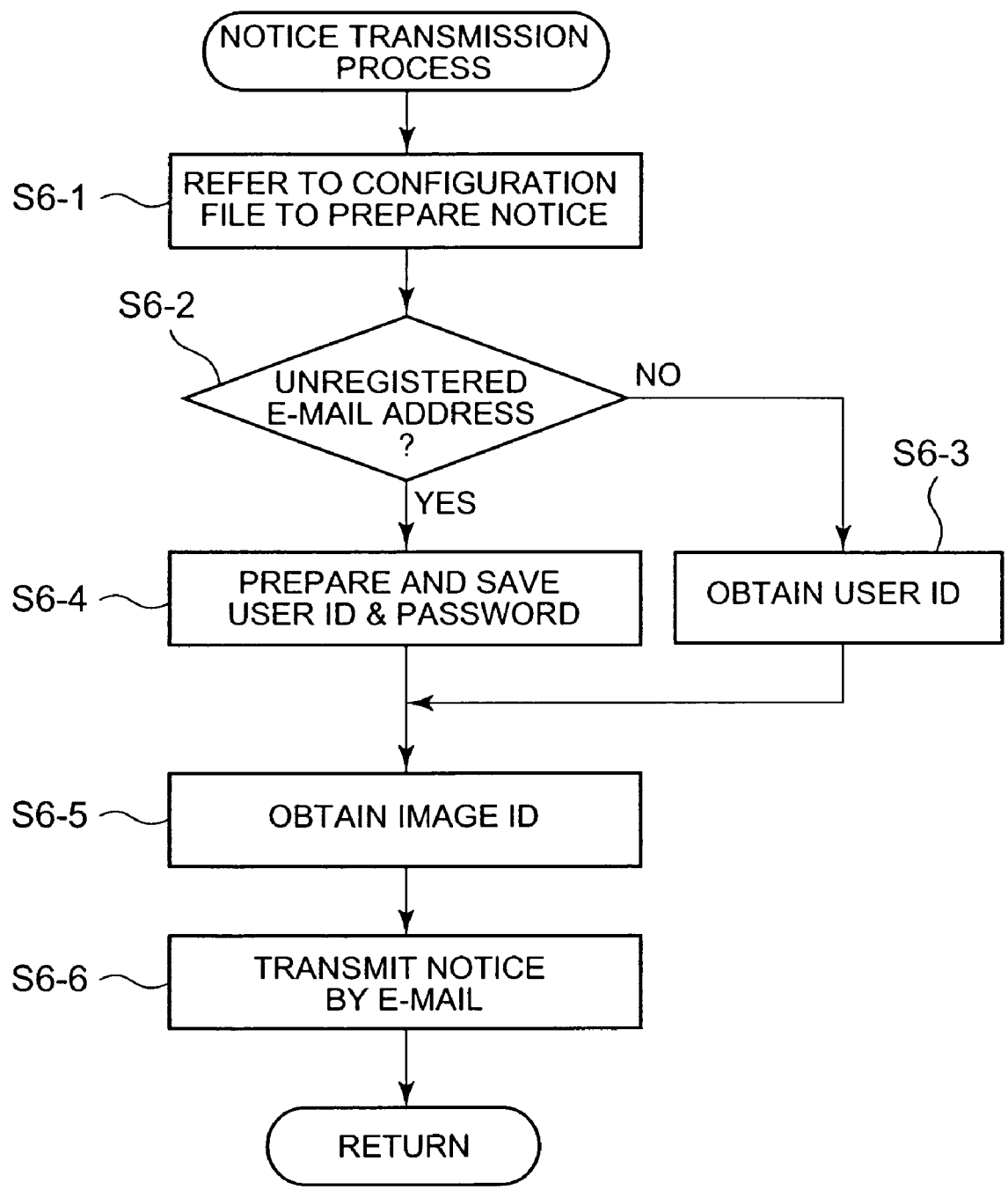
FIG. 11 is a flowchart for explaining notice transmission process carried out by the data center.

The notice transmission process will now be described with reference to FIG. 11. As shown in FIG. 11, the e-mail server 4c prepares a notice document based on a configuration file in which contents of the notice are defined (S6-1). The notice may have a message saying that, for example, the image data registration has been completed. Then, the e-mail server 4c determines whether the e-mail address of the e-mail Ma1 is unregistered one or not (S6-2). In other words, the e-mail server 4c determines whether the e-mail Ma1 was sent by the user who has been registered in the database 7 (user information shown in FIG. 4A) or not.

If it is determined that the e-mail Ma1 was sent by registered user (not unregistered), the e-mail server 4c obtains corresponding user ID (user code) from the user information (S6-3).

On the contrary, if it is determined that the sender's e-mail address of the e-mail address Ma1 is unregistered, the e-mail server prepare unique user ID and password, and adds them to the database 7 to save (S6-4). The password may be prepared automatically in accordance with a predetermined rule.

The e-mail server 4c obtains image ID assigned to the image file which was registered at S5 (see E-mail Receiving Process shown in FIG. 10) (S6-5).

Then the e-mail server 4c transmits an e-mail Ma2 including the prepared notice document to the mobile phone 2 which sent the e-mail Ma1 (S6-6). In a case where the user ID and password were prepared at S6-4, the notice document in the e-mail Ma2 includes the user ID and password.

Thus transmitted e-mail Ma2 is forwarded to the mobile phone 2 as shown in FIG. 8. In response to arrival of the e-mail Ma2, the mobile phone 2 displays the contents of the e-mail Ma2. According to this action, the user is notified that the image data has been registered to the data center 4 successfully. User ID and password are also notified to a user who has just registered.

Once the image files are registered to the data center 4, the user is able to browse the images through his/her own mobile phone 2. This browsing process will now be described with reference to FIG. 12. FIG. 12 is a diagram schematically showing screen images displayed on the mobile phone 2.

According to the user's operation, the mobile phone 2 accesses the data center 4, and displays a login page through the browser program (Dc1). Then, the mobile phone 2 transmits password input by the user and its e-mail address to the data center 4.

In response to the reception of the password and e-mail address from the mobile phone 2, the data center 4 accesses the database 7, and searches for the registered image data based on the password and e-mail address. The data center 4 creates preview images of the registered image data (e.g. thumbnail images), and transmits them to the mobile phone 2.

In response to the reception of preview image data, the mobile phone 2 displays the preview images (thumbnail images) (Dc2). If a user selects one of the thumbnail images, the mobile phone 2 requests the data center 4 to transmit original image, thus the mobile phone 2 displays the original images in accordance with the user's selection (Dc3). Additionally, the user's operation of pointing "Next" button also causes the request, thus the following original images are displayed in accordance with the user's operation (Dc4).

Figure 13:
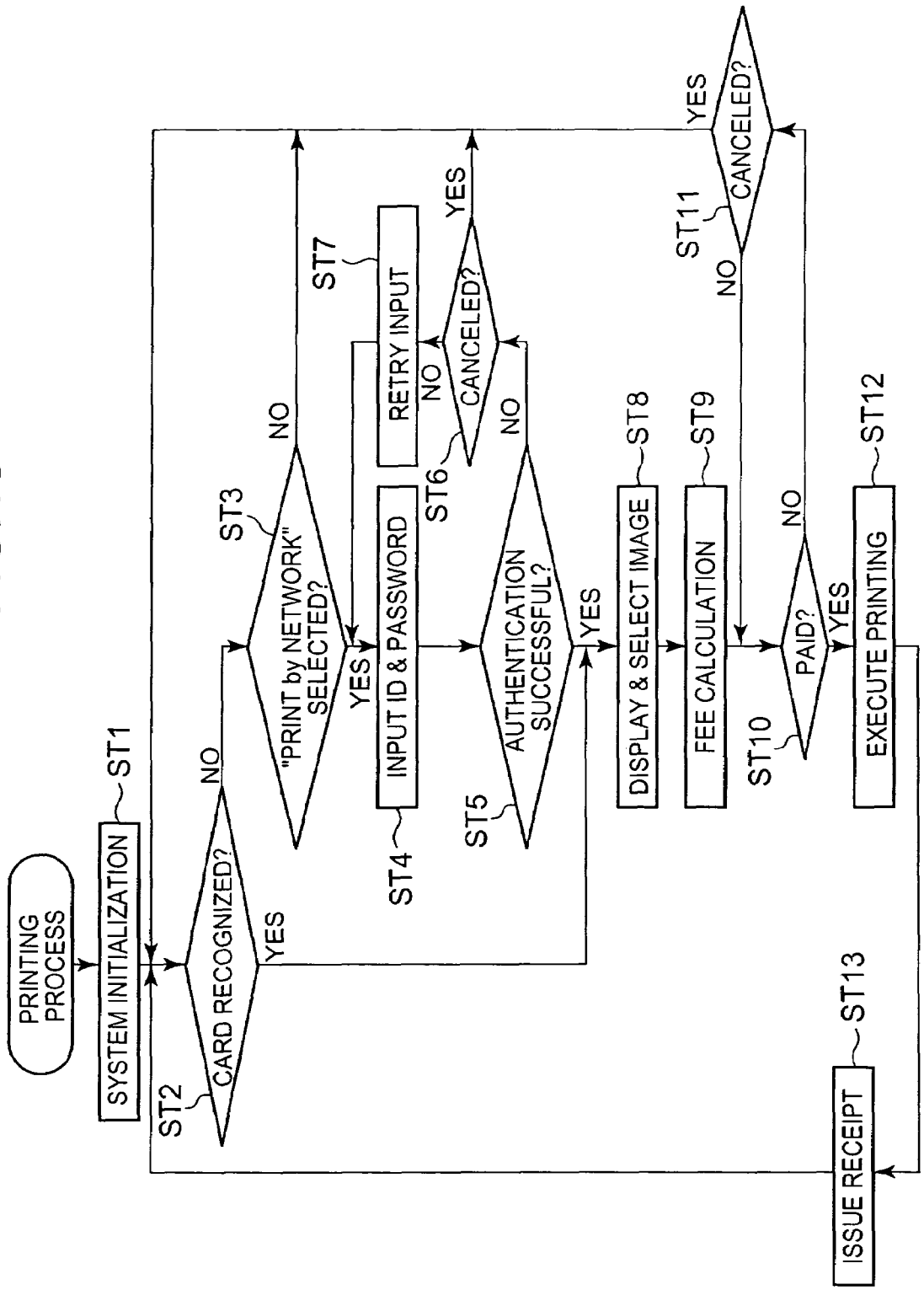
FIG. 13 is a flowchart for explaining printing process according to the first embodiment of the present invention.

The photo vending machine 5 carries out "Printing Process" shown in FIG. 13 to print arbitrary image data registered in the data center 4 in accordance with the user's operation as shown in FIG. 8.

"Printing Process" will now be described in detail with reference to FIG. 13. As shown in FIG. 13, the system is initialized, and the photo vending machine 5 stands by user's operations (ST1).

If it is detected that a memory card (recording medium on which image data are recorded) is inserted to the photo vending machine 5 (ST2), the process at ST8 (described later) is carried out. On the contrary, if it is detected that no memory card is inserted, the photo vending machine 5 detects whether "Print by Network" is selected or not (ST3).

Figure 14C:
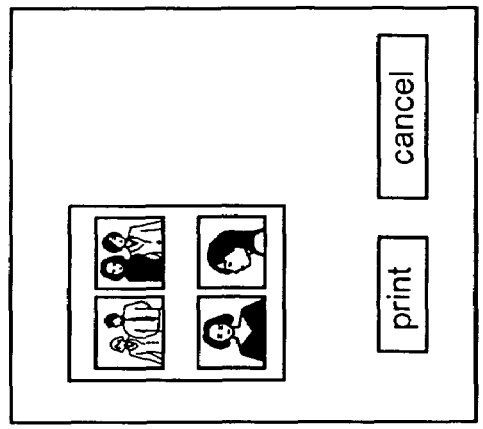
FIGS. 14A, 14B, and 14C are schematic views each showing exemplified screen images displayed on the photo vending machine during the printing process.

If the "Print by Network" is not selected, the photo vending machine 5 carries out he process at ST2. On the contrary, the photo vending machine requires a user to input user ID and password when "Print by Network" is selected (ST4). In this case, the photo ending machine 5 displays the login page as shown in FIG. 14A to obtain user ID (user code) and password. The photo vending machine 5 transmits the obtained user ID and password to the data center 4, and requests user authentication.

The photo vending machine 5 determines whether the user authentication was successful or not (ST5). If it is determined that the user authentication was not successful, the photo vending machine 5 determines whether the operation has been canceled or not (ST6). If the operation is canceled, the photo vending machine 5 carries out the step at ST2. On the other hand, if the operation has not been canceled, the photo ending machine 5 requires the user to retry (ST7), and carries out the process at ST4 again.

During the above steps, the data center 4 carries out the following operations. That is, the data center 4 retrieves registered image data from the database 7 if the user authentication has been successful. More precisely, the data center 4 retrieves image data in an area corresponding to the user code of the authenticated user based on the print image information shown in FIG. 4B.

For example, if the user code concerned is "200201290001", the data center 4 retrieves image data from the area 7A whose link code is "001". In a case where the user code is "2002012902", the data center 4 selects the area 7b to which link code "002" is assigned and retrieves image data from there.

In case of successful user authentication at ST5, the photo vending machine 5 displays image data and stands by for user's image selection (ST8).

Figure 14B:
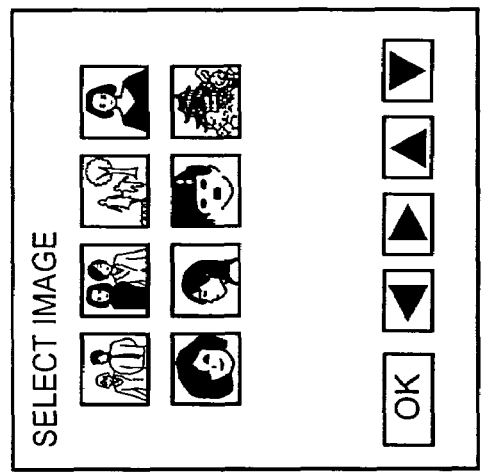
Figure 14A:
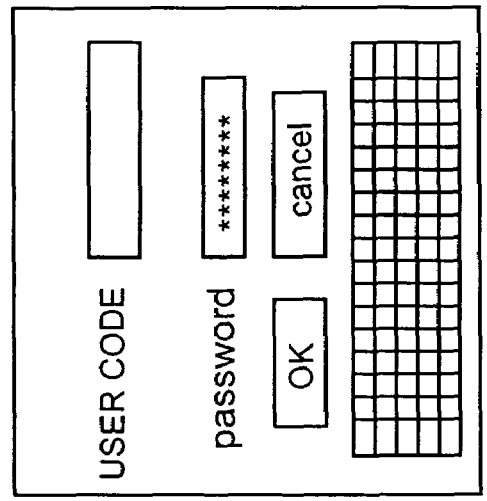

For example, the photo vending machine 5 receives the image files which were retrieved from the database 7 by the data center 4, and displays the images as shown in FIG. 14B. The user operates cursor keys or the like to select desired image to be printed from the displayed images, and operates "Print" button as shown in FIG. 14C, thus instruction for printing is given to the mobile phone 2.

In a case where the insertion of the memory card has been recognized at ST2, the photo vending machine 5 displays images represented by the image data retrieved from the memory card, and accepts the user's selection of the images.

When an instruction for printing is given by the user after the image selection, the charging unit 54 of the photo vending machine 5 calculates fee (ST9), and waits for payment (ST10 and ST11). Any events related to canceling is given (e.g. user's instruction, time out, or the like), the photo vending machine 5 carries out the process at ST2.

Figure 15A:
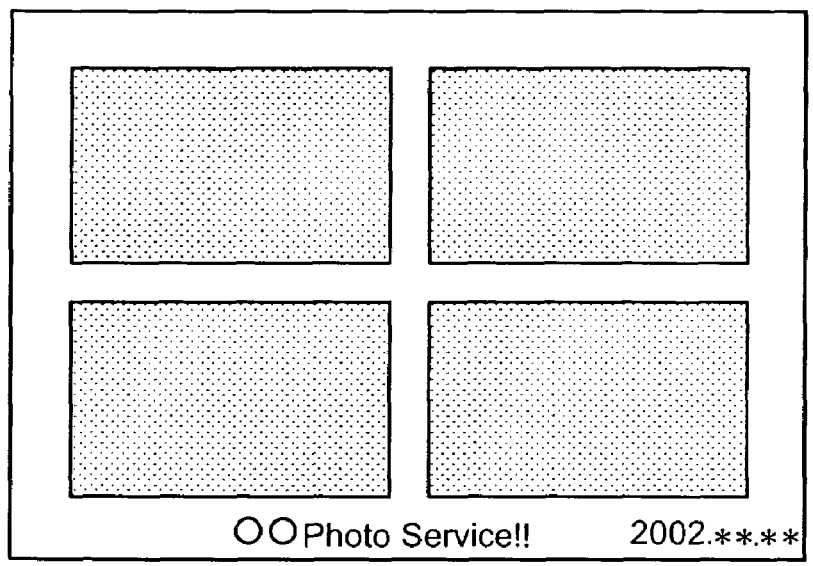
FIG. 15A is a schematic view showing an example of printing where 4 images are combined on one sheet.
Figure 15B:
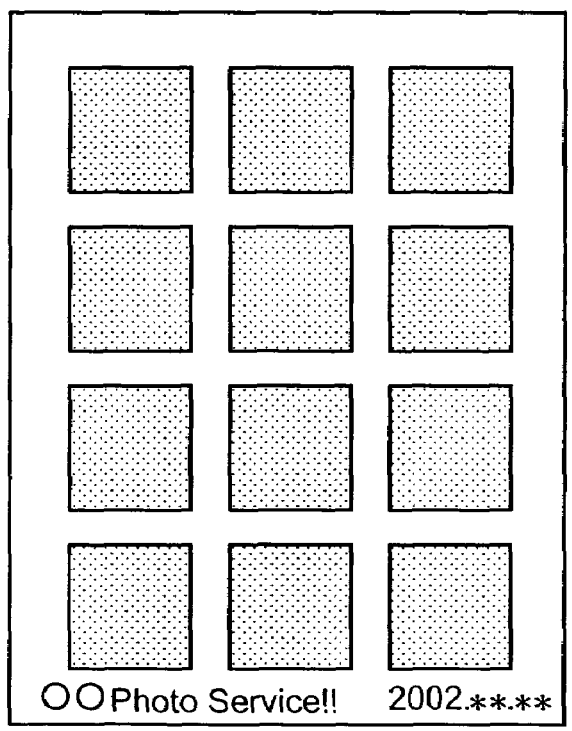
FIG. 15B is a schematic view showing an example of printing where 12 images are combined on one sheet.

If it is determined that the fee is paid, executes the operation for printing the selected image data (ST12). That is, the photo vending machine 5 prints out the selected image data onto the predetermined sheets. If any layout instruction has been given, the photo vending machine 5 prints the image data in accordance with the layout instruction. For example, if an instruction of "4-in-1" layout (combining 4 images on 1 sheet) is given, 4 images are printed on a sheet as shown in FIG. 15A. In the same manner, "12-in-1" layout instruction leads the printing as shown in FIG. 15B. The printed sheet is discharged through an outlet.

After the printing is completed, the photo vending machine 5 issues a receipt (ST13, FIG. 13). Then, the process at ST2 is carried out again.

According to the above described network printing system of the first embodiment, printing of images captured by a mobile phone 2 having camera function is available with using the network without using any memory cards. That is, the photo printing service is available for users who use the devices not adaptive to removable recording media.

Though the mobile phones having camera function have been exemplified as terminal devices 2 in the first embodiment, devices being able to enjoy the effect of the present invention are not limited to them. For example, the PC 2d or a PDA having camera function also enjoy the effect of the present invention. For example, a wrist watch having camera function is also available one. In this case, such the wrist watch is able to work as the terminal device 2, after installation of application programs which brings the above described functions such as the user registration, e-mail transmission, image browsing. Those application programs may be downloadable from the network server 3.

Second Embodiment

A second embodiment of the present invention will now be described.

A network printing system according to the second embodiment employs Java application (Java applet). Hardware components of the system according to the second embodiment are the same as those of the system of the first embodiment shown in FIG. 1, however, the data center 4 and the terminal devices 2 are compatible with Java applications.

Figure 16:
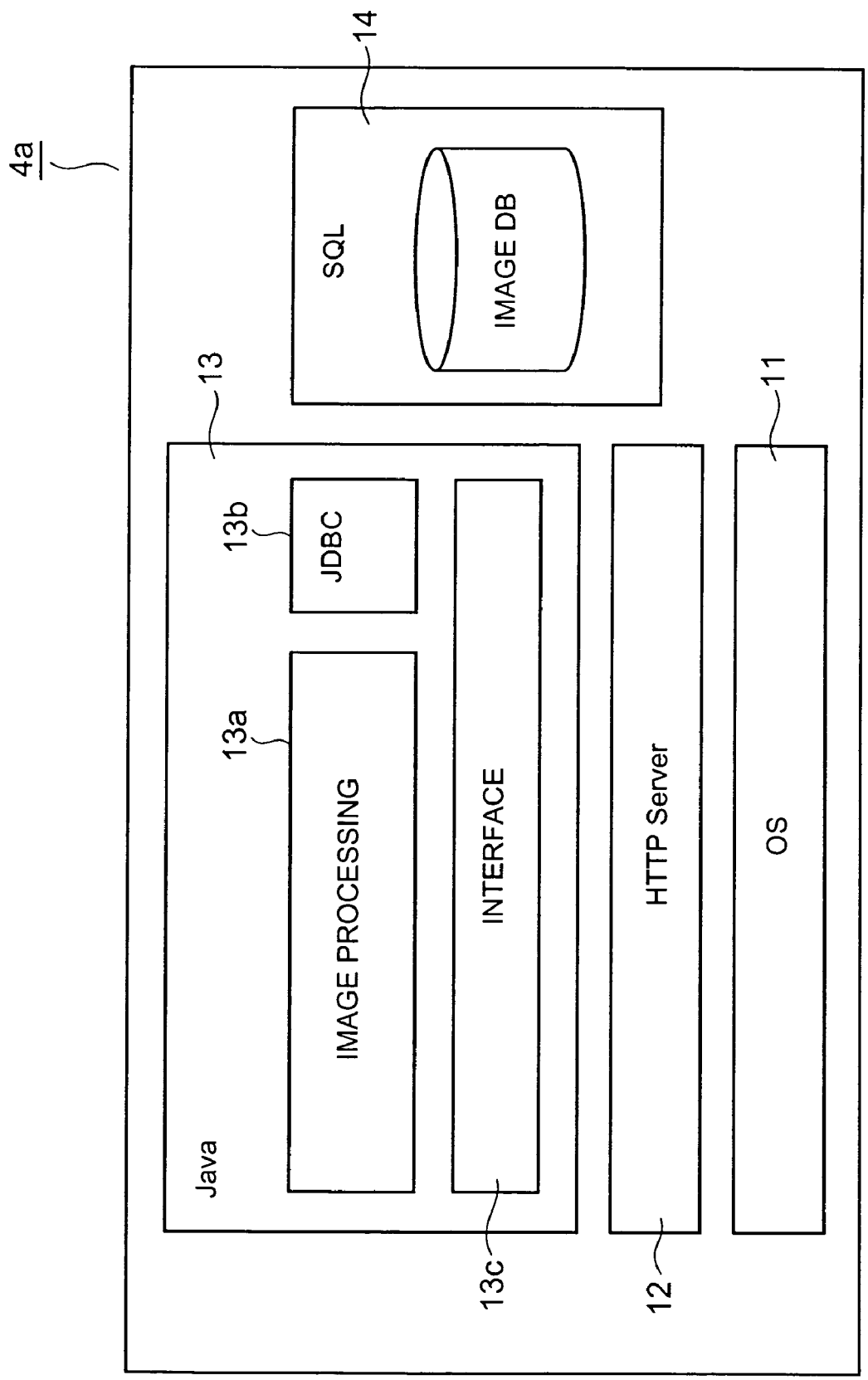
FIG. 16 is a block diagram showing an exemplified configuration of a network printing system according to a second embodiment of the present invention.

Functional structure of the web server 4a in the data center 4 is shown in FIG. 16. As shown in FIG. 16, the web server 4a has an HTTP server 12, Java applications 13, and an image DB 14, and is controlled under an operating system (OS) 11.

The Java applications 13 realizes functions of image processing 13a, JDBC (Java DataBase Connectivity) 13b, and interface 13c.

The HTTP server 12 controls input/output of hyper text files, and retrieves image file (image data) included in the hyper text files. The HTTP server 12 supplies the retrieved image files to the image processing function 13a via the interface 13c.

The image processing function 13a obtains the image data from the HTTP server 12, and carries out predetermined image processing onto the image data. The image data after the image processing are transferred to the image DB 14 under control of the HTTP server 12.

The image DB 14 may be SQL (Structured Query Language) adaptive database for managing the image data. Accesses to the image DB 14 is controlled by the JDBC 13b.

Figure 17:
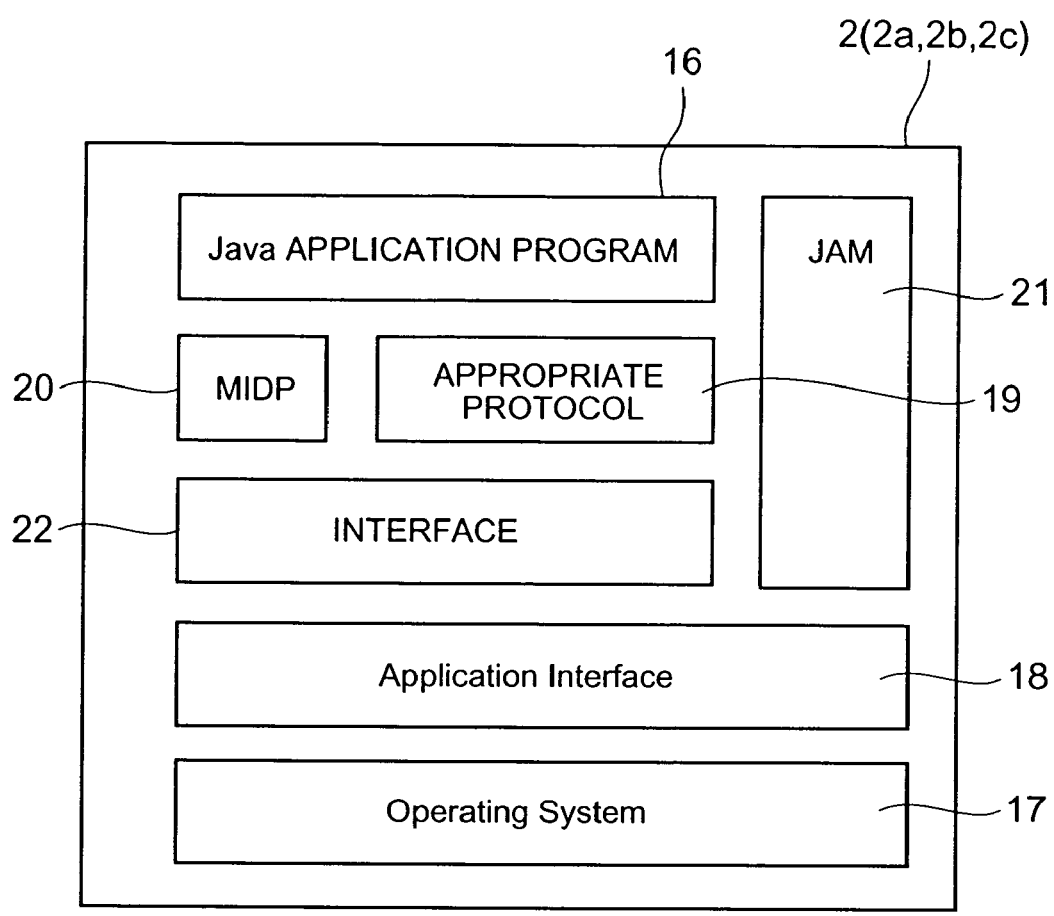
FIG. 17 is a schematic view showing an exemplified configuration of a mobile phone in the network printing system according to the second embodiment.

FIG. 17 shows the functional structure of the mobile phone 2 (2a, 2b, and 2c). As shown in FIG. 17, the mobile phone 2 has Java application program (Java applet) 16, an operating system (OS) 17, a native application interface (application interface) 18, appropriate protocol 19, MIDP 20, JAM 21, and interface 22.

The Java application program 16 has been installed in the mobile phone 2 previously to control any operations of the mobile phone 2. The Java application programs are executed on the operating system 17 via the interface 22 and the native application interface 18.

MIDP (Mobile Information Device Profile) 20 defects Java execution profile specialized for mobile terminals. MIDP includes information regarding to user interface, class library, and the like.

JAM (Java Application Manager) 21 manages the Java application programs 16 in the mobile phone 2.

The photo vending machine 5 controls image data transmission from the mobile phone 2, and prints out arbitrary image data in accordance with the user's operation. Those actions are carried out simultaneously, in accordance with "Printing Process" shown in FIG. 18.

Figure 18:
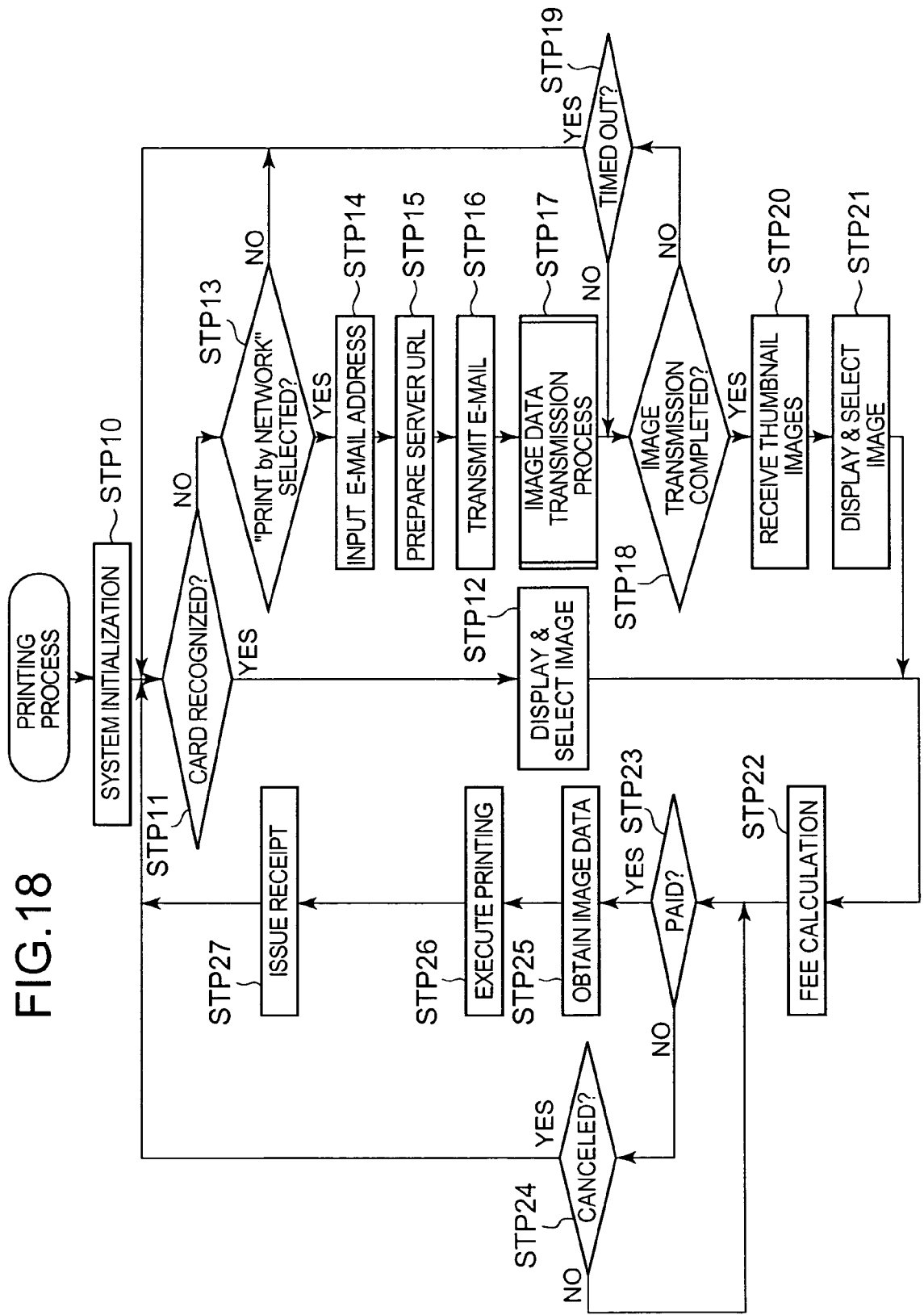
FIG. 18 is a flowchart for explaining printing process according to the second embodiment of the present invention.

As shown in FIG. 18, the photo vending machine 5 carries out system initialization (STP10), and detects whether a memory card is inserted or not (STP11).

In a case where the memory card inserted, the photo vending machine 5 obtains image data from the memory card, and accepts user's operation for selecting images (ST12). In this case, the process flow skips to STP22 (described later).

In case of no memory card, the photo vending machine 5 determines whether the user selects "Print by Network" or not (STP13).

If "Print by Network" has not been selected, the process flow returns to STP11. In case of "Print by Network", on the contrary, the photo vending machine 5 accepts the user's operation to input e-mail address (STP14). For example, the photo vending machine 5 displays predetermined input form, and obtains e-mail address of the user's mobile phone 2.

Then, the photo vending machine 5 prepares "server URL" (STP15). The server URL indicates an area to be reserved in the image DB 14 (web server 4a) in order to store the image data temporarily. The area will be cleared when the printing is completed or canceled.

The photo vending machine 5 generates an e-mail including the prepared server URL, and transmits it to the mobile phone 2 (STP16).

Figure 19:
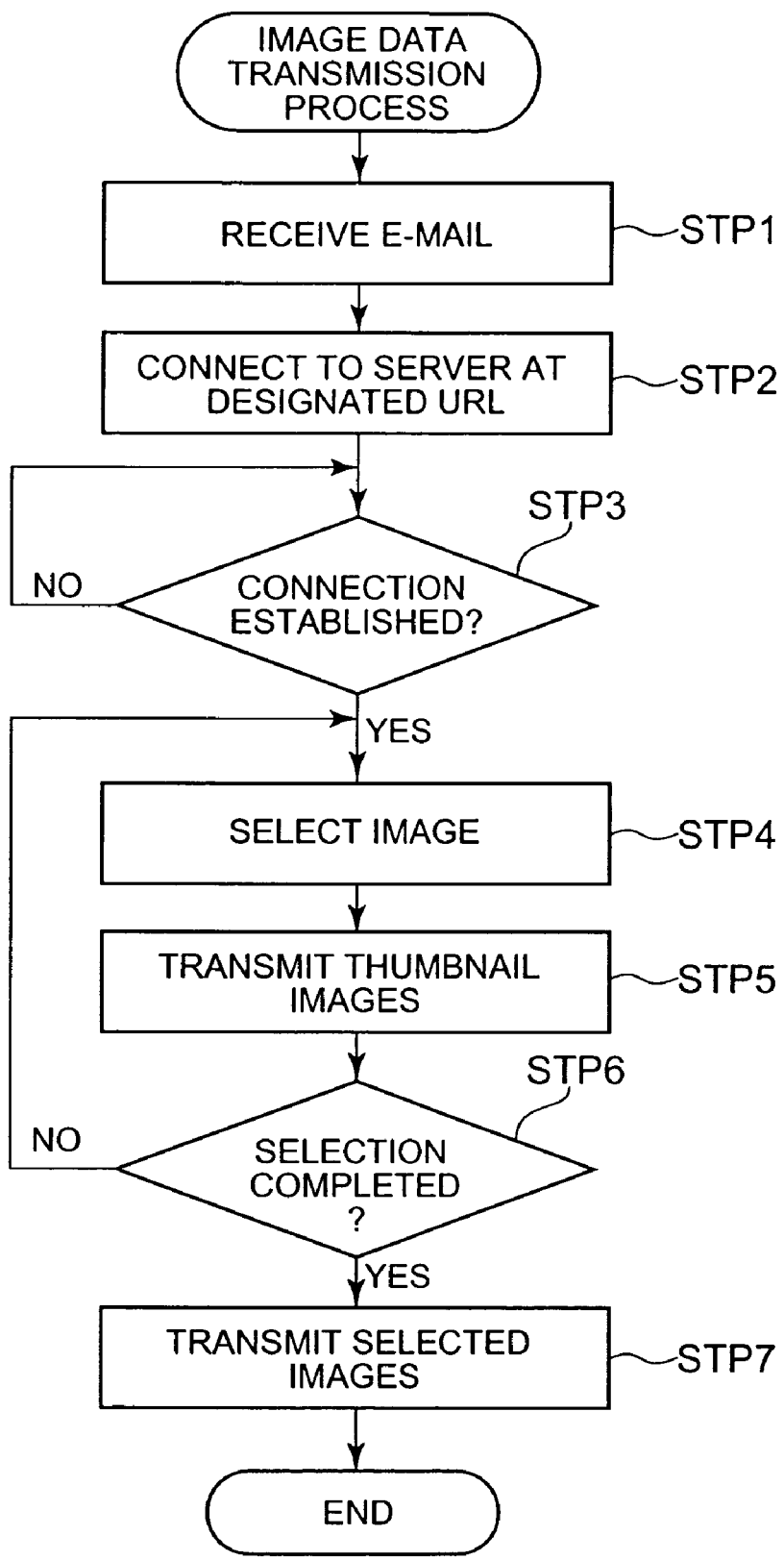
FIG. 19 is a flowchart for explaining image data transmission process according to the second embodiment of the present invention.

The mobile phone 2 receives the e-mail from the photo vending machine 5, and carries out "Image Data Transmission Process" shown in FIG. 19 (STP17) to transmit the image data to the data center 4.

As shown in FIG. 19, after the reception of the e-mail from the photo vending machine 5 (STP1), the mobile phone 2 accesses the web server 4a in the data center 4 based on the server URL in the received e-mail (STP2).

When the connection is established (STP3), the mobile phone 2 accepts the user's operation for selecting images (STP4). For example, the mobile phone 2 displays stored images one by one in accordance with the user's key operation so that the user selects arbitrary images.

After the user's image selection, the mobile phone 2 transmits thumbnail images of the selected images to the data center 4 (STP5) More precisely, the mobile phone 2 transmits the thumbnail images to the web server 4a by the Java application 16.

The mobile phone 2 determines whether the user's image selection has been completed or not (STP6). If it is determined that the user's operation has not been completed, the process flow returns to STP4.

After the user's selecting operation is completed, the mobile phone 2 transmits the image data representing the selected images to the data center 4 (STP7). More precisely, the image data are forwarded to the web server 4a under control of the Java application 16. The above described image data transmission may be canceled by the user's operation (pointing "Cancel" button).

In response to the reception of the thumbnail images and image data from the mobile phone 2, the web server 4a transfers the thumbnail images and the image data to the image DB 14 for storing. This operation is controlled by the Java application 13.

As shown in FIG. 18, the photo vending machine 5 detects whether the image transmission by the mobile phone 2 is completed (STP18), while detecting timed out or not (STP19). If it is detected that it is timed out, the process flow returns to STP11.

After the image transmission is completed, the photo vending machine 5 accesses the web server 4a to obtain the thumbnail images (STP20). Then, the photo vending machine 5 displays the thumbnail images for user's preview (STP21).

In response to the user's operation for image selection and printing, the photo vending machine 5 calculates fee (STP22), and waits for payment (STP23, 24). If any canceling matter occurs at STP24, the process flow returns to STP11.

In accordance with the payment, the photo vending machine 5 obtains image data corresponding to the user's selection through the thumbnail images (STP25). For example, the photo vending machine 5 requests the web server 4a to provide the image data concerned.

In a case where the memory card is recognized at STP11, the photo vending machine 5 obtains image data from the memory card.

Then, the photo vending machine 5 executes the printing (STP26). More precisely, the photo vending machine 5 prints out the image data representing images selected by the user on predetermined sheets. If any layout instruction has been given, the printing will be done in accordance with the instruction. For example, a plurality of the selected images are combined on one sheet as shown in FIG. 15A and 15B.

After the printing is completed, the photo vending machine 5 issues a receipt (STP27), and the process flow returns to STP11.

According to the network printing system of the second embodiment, it is able to print images captured by the mobile phone 2 having camera function with using the network. Since the system does not require any recording media such as a memory card, the printing service provided by the system is available even if the terminal device is not adaptive to a removable recording medium (in a case where only an internal memory is available).

Though the above second embodiment exemplifies a case where the web server 4a temporarily stores image data from the mobile phone 2 in the image DB 14, the image data from the mobile phone 2 may be stored in the database 7 as well as the above described first embodiment.

Instead of the mobile phones 2 (2a, 2b, and 2c), the PC 2d or the PDA having camera function is also applicable one as the terminal device 2. Moreover, a wrist watch having camera function is also applicable. In this case, even if Java application software which realizes the above described image data transmission process is installed in the wrist watch, it works as the terminal device 2 as well as the mobile phone 2 exemplified in the second embodiment. Those Java application software may be downloadable from, for example, the network server 3.

Third Embodiment

A third embodiment of the present invention will now be described. A network printing system according to the third embodiment provides album creation service. More precisely, the system accepts not only selection of frame images or character images, but also accepts text data.

Hardware components of the system according to the third embodiment are the same as those in the system of the first embodiment shown in FIG. 1.

Operations through using the network printing system according to the third embodiment will now be described. This embodiment will exemplifies a case where a user uses the mobile terminals 2 (2a, 2b, and 2c).

Figure 20:
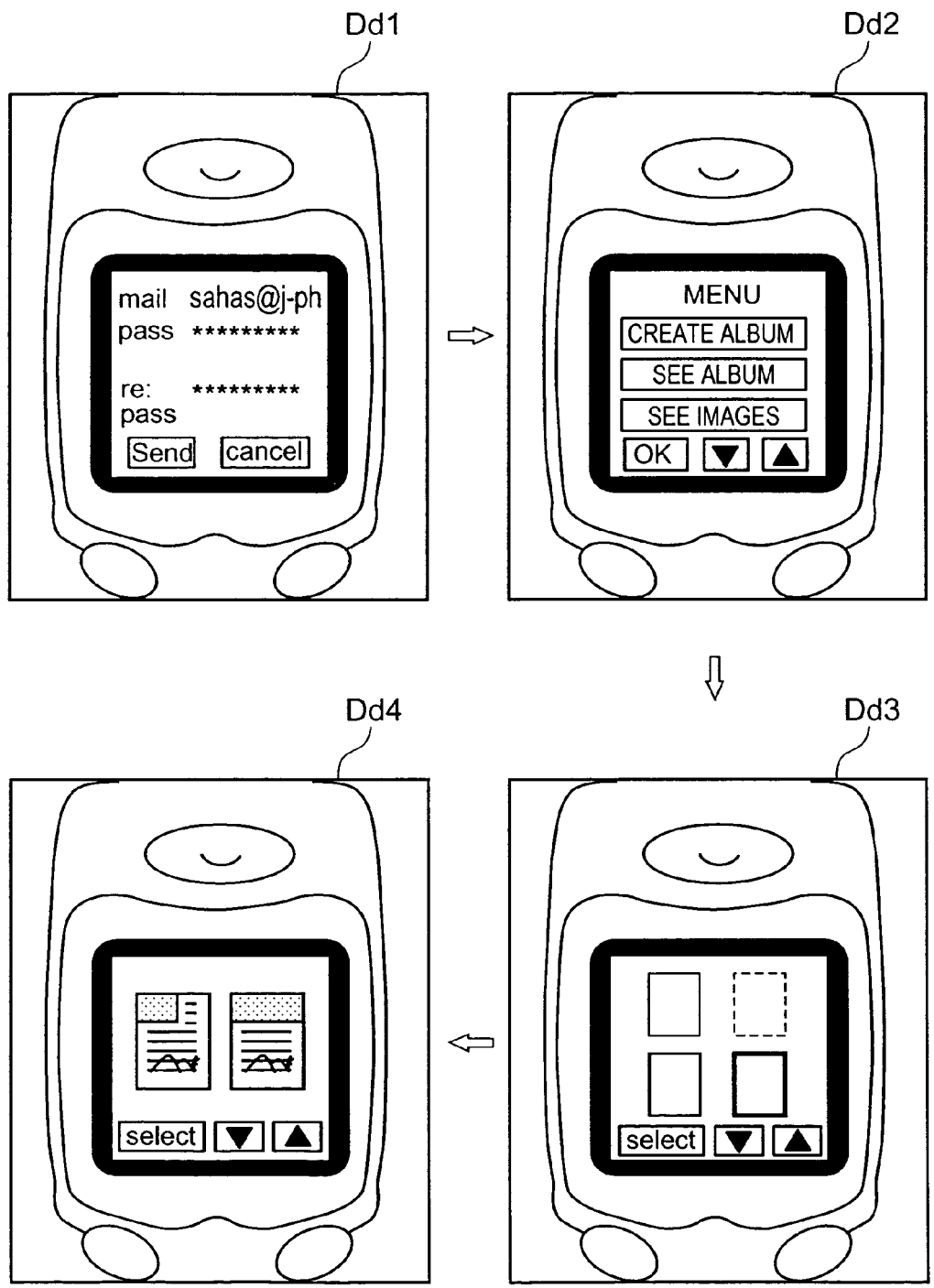
FIG. 20 is a schematic view showing exemplified screen images for explaining album creating process.

Process for creating album will now be described with reference to FIG. 20. FIG. 20 is a diagram showing screen images displayed on the display unit 26 of the mobile phone 2.

A first step of the process is to access the data center 4 by the mobile phone 2 in accordance with the user's operation. Then, the mobile phone 2 displays a login page through its own browser program (Dd1). The mobile phone 2 transmits password and e-mail address input by the user to the data center 4.

The data center 3 carries out user authentication, and generates menu information for showing a menu page. The generated menu information is transmitted to the mobile phone 2.

The mobile phone 2 receives the menu information, and displays menu page through the browser program (Dd2).

In response to the user's operation selecting "Create Album" through the menu, the mobile phone 2 requests the data center 4 to provide thumbnail images of frames. Then, the mobile phone 2 receives the thumbnail images from the data center 4, and displays frame selection page through the browser program (Dd3).

In response to the user's selecting operation, the mobile phone 2 superimposes the selected frame image onto a predetermined layout image. The superimposed layout image is displayed as preview (Dd4). According to the user's instruction "OK", the mobile phone 2 transmits layout information including ID representing the selected frame to the data center 4.

The data center 4 receives the layout information from the mobile phone 2, and transfers frame images corresponding to the layout information to the database 7 for storing. In this case, the frame images are stored in the predetermined area corresponding to the user concerned, as well as the aforementioned image data storing.

Then, the user operates the photo vending machine 5 to print the album. The album printing operation will now be described with reference to FIG. 21. FIG. 21 is a diagram exemplifying screen images displayed on the display unit 56 of the photo vending machine 5.

The photo vending machine 5 accesses the data center 4, and displays the login page (De1). The photo vending machine 5 transmits user ID (user code) and password input by the user through the login page, to the data center 4.

The use further inputs phrases to be added to the album through a text input means 30, and points "OK" button 32. In response to this operation, the photo vending machine 5 receives registered image data and the frame images from the data center 4, and displays image selection page for selecting images to be included in the album (De2). More precisely, the photo vending machine 5 superimposes the frame image and the text onto the received image data, and displays thus superimposed image as album image.

After the album image is selected by the user, the photo vending machine 5 displays preview page showing the selected album image (De3).

In response to the user's operation for instructing "print", the photo vending machine 5 carries out printing of the album images. In the same manner as the above described embodiments, the photo vending machine 5 carries out fee calculation, payment confirmation, issuance of a receipt. Then, the photo vending machine 5 outputs the printed album images through the outlet. In a case where the layout instruction has been given by the user, a plurality of the album images are combined on one sheet as shown in FIG. 15A or 15B.

According to the network printing system of the third embodiment, more useful photo prints are available.

Instead of the mobile phones 2 (2a, 2b, and 2c), the PC 2d or the PDA having camera function is also applicable one as the terminal device 2. Moreover, a wrist watch having camera function is also applicable. In this case, even if application programs which realize the above described album image processing is installed in the wrist watch, it works as the terminal device 2 as well as the mobile phone 2 exemplified in the above embodiment. Those application programs may be downloadable from, for example, the network server 3.

Fourth Embodiment

A fourth embodiment of the present invention will now be described. A network printing system according to the fourth embodiment employs Java application as well as the second embodiment. According to the Java application support, image data (thumbnail image data) in the terminal device 2 are transmitted to photo vending machine 5 automatically to be printed.

Any hardware components of the network printing system according to the fourth embodiment are basically the same as those of the system in the first embodiment shown in FIG. 1. As well as the second embodiment, the terminal devices 2 are adaptive to the Java applications. That is, the mobile phones 2a, 2b, and 2c have the same structures as those described in the second embodiment.

Figures 22A, 22B, 22C:
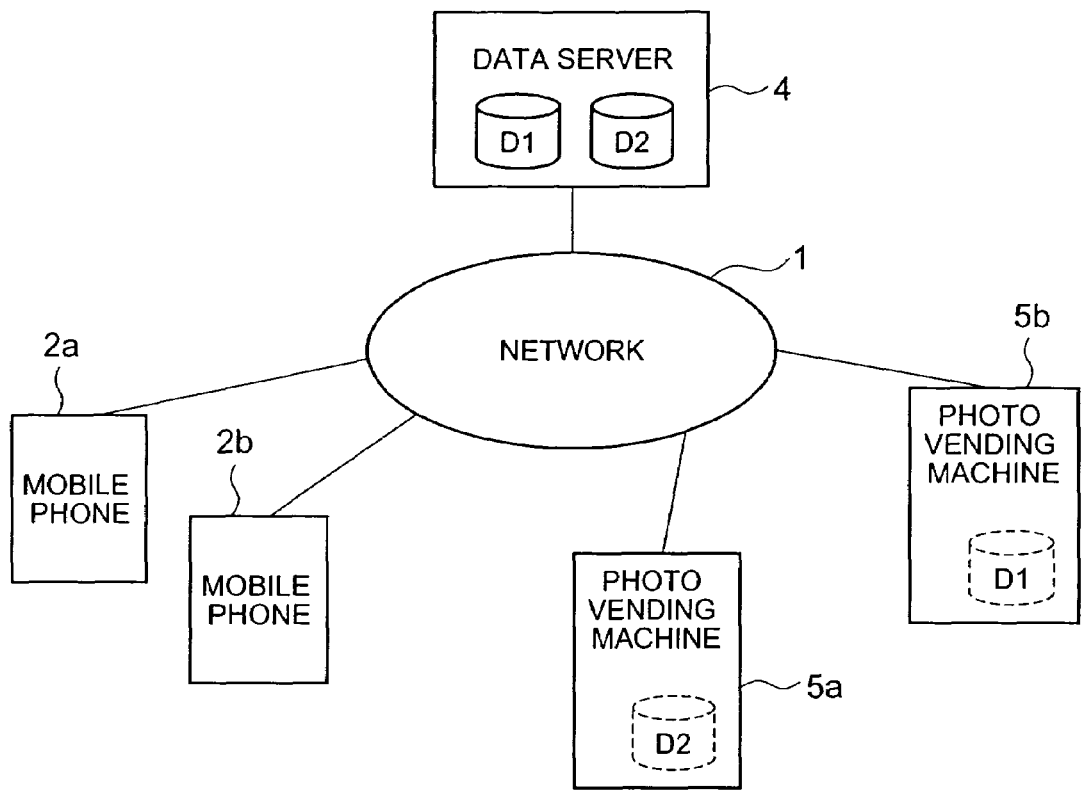
FIG. 22A is a simplified schematic view showing the network printing system according to the fourth embodiment of the present invention.
FIGS. 22B and 22C are schematic views showing exemplified server URL information set in the photo vending machine.

Operations though using the network printing system of the fourth embodiment will now be described. For comprehensive explanation, the following description will refer to FIG. 22A which is a simplified diagram showing the whole configuration of the network printing system. FIGS. 22B and 22C are diagrams each exemplifying configuration data representing server URL assigned to the photo vending machines 5 respectively.

Figure 23:
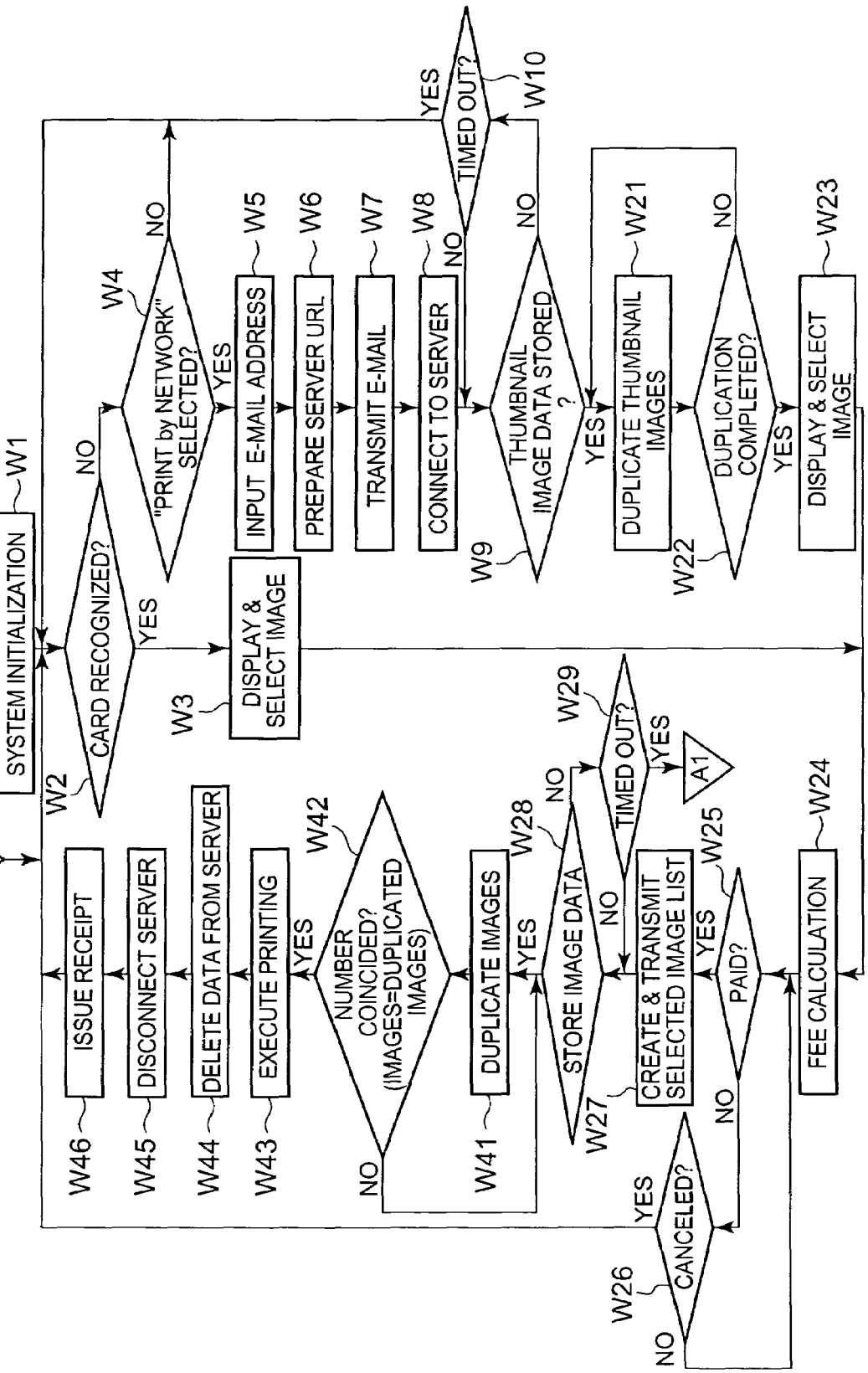
FIG. 23 is a flowchart for explaining printing process according to the fourth embodiment of the present invention.
Figure 24:
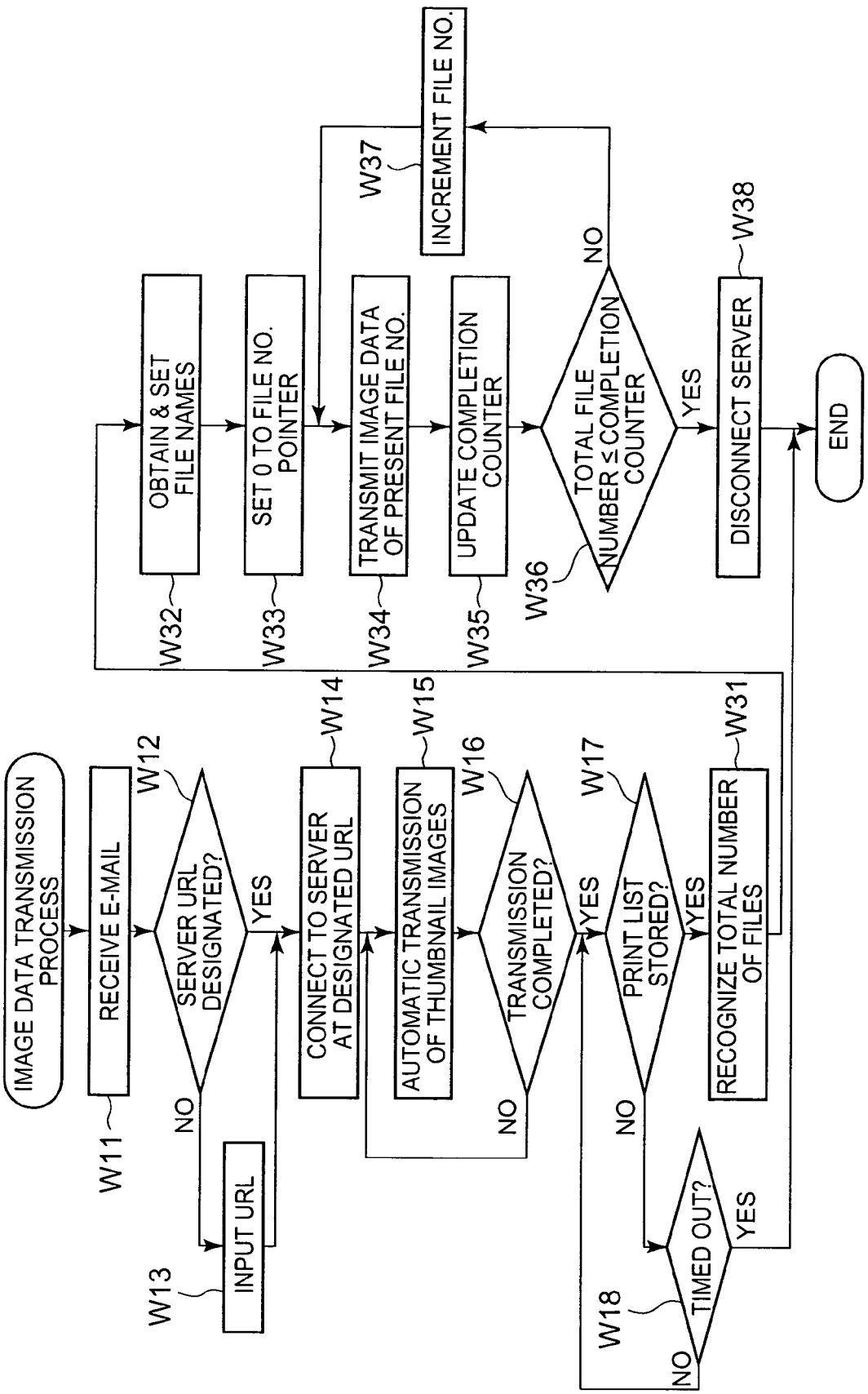
FIG. 24 is a flowchart for explaining image data transmission process according to the fourth embodiment of the present invention.

The photo vending machine 5 carries out the printing process shown in FIG. 23, and the mobile terminal 2 carries out the image data transmission process shown in FIG. 24.

As shown in FIG. 23, the photo vending machine 5 initializes the system (W1), and detects whether a memory card is inserted or not (W2).

In case of the memory card insertion, the photo vending machine 5 obtains image data from the memory card, and displays them for accepting the user's selection (W3). Then the process flow skips to W24 (described later).

If the memory card insertion is not recognized, the photo vending machine 5 detects whether "Print by Network" is selected by the user (W4). Unless the "Print by Network" is selected, the process flow returns to W2.

In case of "Print by Network", the photo vending machine 5 accepts the user's operation for inputting e-mail address (W5). In this case, the photo vending machine 5 displays a predetermined input form, and obtains e-mail address of the user's mobile phone 2.

Then, the photo vending machine 5 prepares server URL which indicates the data server 4 assigned for the photo vending machine 5 concerned (W6). In a case where the server URL of the photo vending machines 5a and 5b are set as shown in FIG. 22B, the photo vending machine Sa prepares "www.*.jp/001" as the server URL. In the same manner, the photo vending machine 5b prepares "www.*.jp/002" as the server URL. If script style as shown in FIG. 22C is available, the photo vending machines 5 may prepare the server URL as shown in FIG. 22C, instead of those shown in FIG. 22B.

As shown in FIG. 23, the photo vending machine 5 prepares an e-mail including the prepared server URL, and transmits it to the mobile phone 2 (W7).

After the e-mail transmission is completed, the photo vending machine 5 accesses the data server 4 (W8) to determine whether thumbnail images from the mobile phone 2 are stored in the data server 4 (W9). Simultaneously, the photo vending machine 5 detects whether timed out or not (W10). If it is detected that timed out, the process flow returns to W2.

In response to reception of the e-mail from the photo vending machine 5, the mobile phone 2 activates the Java application program, and the image data transmission process shown in FIG. 24 automatically starts.

As shown in FIG. 24, the mobile phone 2 receives the e-mail from the photo vending machine 5 (W11), and determines whether it includes server URL or not (W12).

In case of no server URL, the mobile phone 2 displays a predetermined input form for accepting the user's manual input (W13).

The mobile phone 2 accesses the data server 4 in accordance with the server URL (W14). In a case where time-out occurs or the connection is failed because of incorrect URL, the process is canceled.

After the connection is established, the mobile phone 2 automatically transmits thumbnail image data representing the stored images to the data server 4 (W15), until transmission of all thumbnail images is completed (W16).

After the thumbnail image data transmission, the mobile phone 2 waits for a print list given by the photo vending machine 5 (W17), while detecting whether timed out or not (W18). If it is timed out at W18, the image data transmission process is canceled.

The data server 4 receives the thumbnail image data from the mobile phone 2, and stores the thumbnail image data in a designated directory.

After the thumbnail image data saving at W9, the photo vending machine 5 duplicates the thumbnail image data (W21), until duplication of all thumbnail images is completed (W22).

After the duplication of the thumbnail image data, the photo vending machine 5 displays thumbnail images represented by the duplicated thumbnail image data, to accept the user's operation for selecting desired images (W23).

In response to the user's instruction for printing after selecting the images, the photo vending machine 5 calculates fee (W24) and waits for payment (W25, W26). Any events for canceling occurs at W26, the process flow returns to W2.

If the payment at W25 is sufficient, the photo vending machine 5 generates a print list which indicates the selected images, and transmits it to the data server 4 (W27).

After transmitting the selection list, the photo vending machine 5 waits for image data given by the mobile phone 2 (W28), while detecting whether timed out or not (W29). If it is timed out at W29, the process flow returns to W2.

In response to reception of the print list from the photo vending machine 5, the data server 4 carries out "Responding Process" (described later) to store the print list.

The mobile phone 2 receives the print list from the photo vending machine 5 and stores it at W17 (FIG. 24), and refers to the print file to recognize the total number of images (W31). The mobile phone 2 further obtains file names (titles) from the print list for identifying the image data (W32). Those file names are set to a predetermined management table.

The mobile phone 2 transmits image data to be printed to the data server 4 in accordance with the management table. More precisely, the mobile phone 2 initializes file No. pointer (which points file No. of the files in the management table) to "0" (W33), and specifies image data corresponding to file name corresponding to present file No. pointed by the pointer. The mobile phone 2 transmits the specified image data to the data server 4 (W34).

After one image file is transmitted, the mobile phone 2 updates "completion counter" (W35), and determines whether the completion counter is equal to or greater than the total number of the files (W36). In other words, the mobile phone 2 determines whether all image data to be printed have been transmitted completely or not.

If the transmission of all image data has not been completed, the mobile phone 2 updates the pointer to increment file No. +1 (W37), and the process flow returns to W34. After the all image data have been transmitted completely, the mobile phone 2 disconnects the data server 4 (W38), and terminates the image data transmission process.

The data server 4 receives the image data from the mobile phone 2, and stores them in accordance with the responding process (described later).

As shown in FIG. 23, the photo vending machine 5 carries out duplication of the image data stored at W28 (W41), until all image data are duplicated (W42).

After the image data duplication, the photo vending machine 5 execute printing process for printing the duplicated image data (W43). More precisely, the photo vending machine 5 prints out the image data selected by the user, and outputs the photo prints. If any layout instruction has been given, the photo vending machine 5 prints a plurality of images on one sheet as shown in FIGS. 15A or 15B.

In response to completion of the printing, the photo vending machine 5 instructs the data server 4 to delete the data stored therein (W44), and disconnect the data server 4 (W45).

Then, the photo vending machine 5 issues a receipt (W46), and the process flow returns to W2.

The responding process carried out by the data server 4 which intermediates the data transfer between the photo vending machine 5 and the mobile phone 2 will now be described with reference to FIG. 25.

Figure 25:
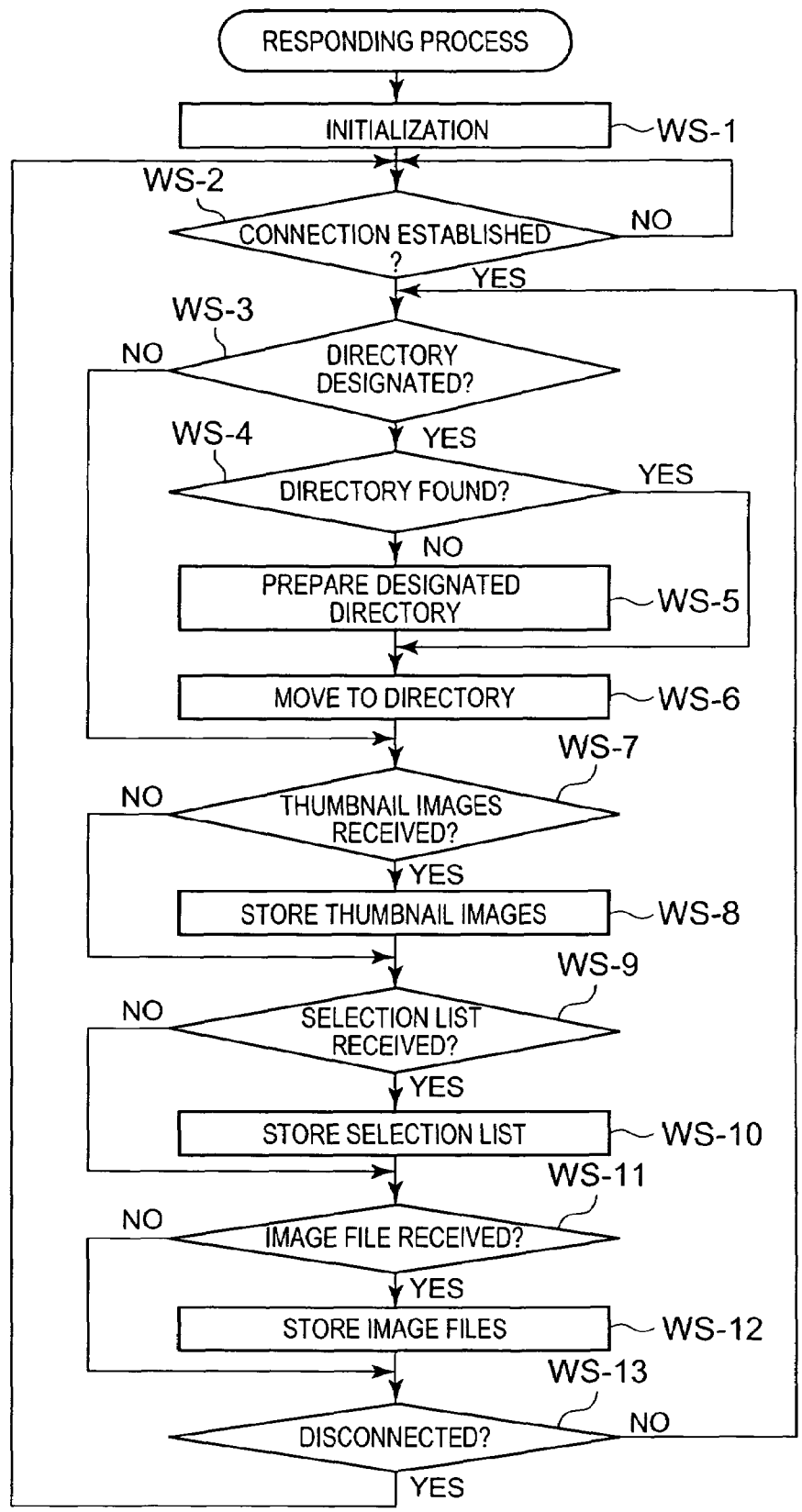
FIG. 25 is a flowchart for explaining responding process according to the fourth embodiment of the present invention.

As shown in FIG. 25, the data server 4 initializes the system (SW-1), and stand by for accesses (SW-2).

In response to access from the mobile phone 2, the data server 4 determines whether directory (directory name) is designated or not (SW-3). If designation is not recognized, the process flow skips to SW-7 (described later). If directory name is designated, the data server 4 determines whether a directory having the designated name exists or not (SW-4). If such the directory has not existed, the data server 4 prepares a directory with affixing the name designated (SW-5).

The data server 4 designates the directory concerned as a current directory (SW-6).

The data server 4 determines whether the thumbnail image data have arrived from the mobile phone 2 or not (SW-7). Only when the thumbnail image data are received, the data server 4 stores the thumbnail image data in the current directory (SW-8).

The data server 4 further determines whether the print list has arrived from the photo vending machine 5 or not (SW-9). Only when the print list is received, the data server 4 stores the print list in the current directory (SW-10).

The data server 4 further determines whether image data have arrived from the mobile phone 2 or not (SW-11). In response to the reception, the data server 4 stores the image data on the current directory (SW-12).

Then the data server 4 determines whether the mobile phone 2 has been disconnected from the data server 4 or not (SW-13). If the mobile phone 2 has not been disconnected, the process flow returns to SW-3. On the contrary, the process flow returns to SW-2 when the disconnection is detected.

According to the network printing system of the fourth embodiment, printing of images captured by the mobile phone 2 having the camera function is available with using the network. In this case, since thumbnail image data or image data are automatically transmitted to the data server 4 from the mobile phone 2, the printing service is available even if the user does not have the terminal device with him/her.

Though, the fourth embodiment above exemplifies a case where the image data are transferred to the photo vending machine 5 after those are transferred to the data server 4 once, the mobile phone 2 may transmits the image data and the like to the photo vending machine 5 directly.

Instead of the mobile phones 2 (2a, 2b, and 2c), the PC 2d or the PDA having camera function is also applicable one as the terminal device 2. Moreover, a wrist watch having camera function is also applicable. In this case, even if Java application software which realizes the above described image data transmission process is installed in the wrist watch, it works as the terminal device 2 as well as the mobile phone 2 exemplified in the fourth embodiment. Those Java application software may be downloadable from, for example, the network server 3.

Fifth Embodiment

A network printing system according to a fifth embodiment of the present invention will now be described.

The network printing system of this embodiment also realizes the automatic data transfer before printing, as well as the fourth embodiment. In addition, date indication is available.

Hardware components of the printing system according to the fifth embodiment are the same as those of the system in the first embodiment shown in FIG. 1. As well as the second embodiment, the terminal devices 2 are adaptive to the Java applications. That is, the mobile phones 2a, 2b, and 2c have the same structures as those described in the second embodiment.

Operations of thus structured network printing system of the fifth embodiment will now be described.

Figure 26:
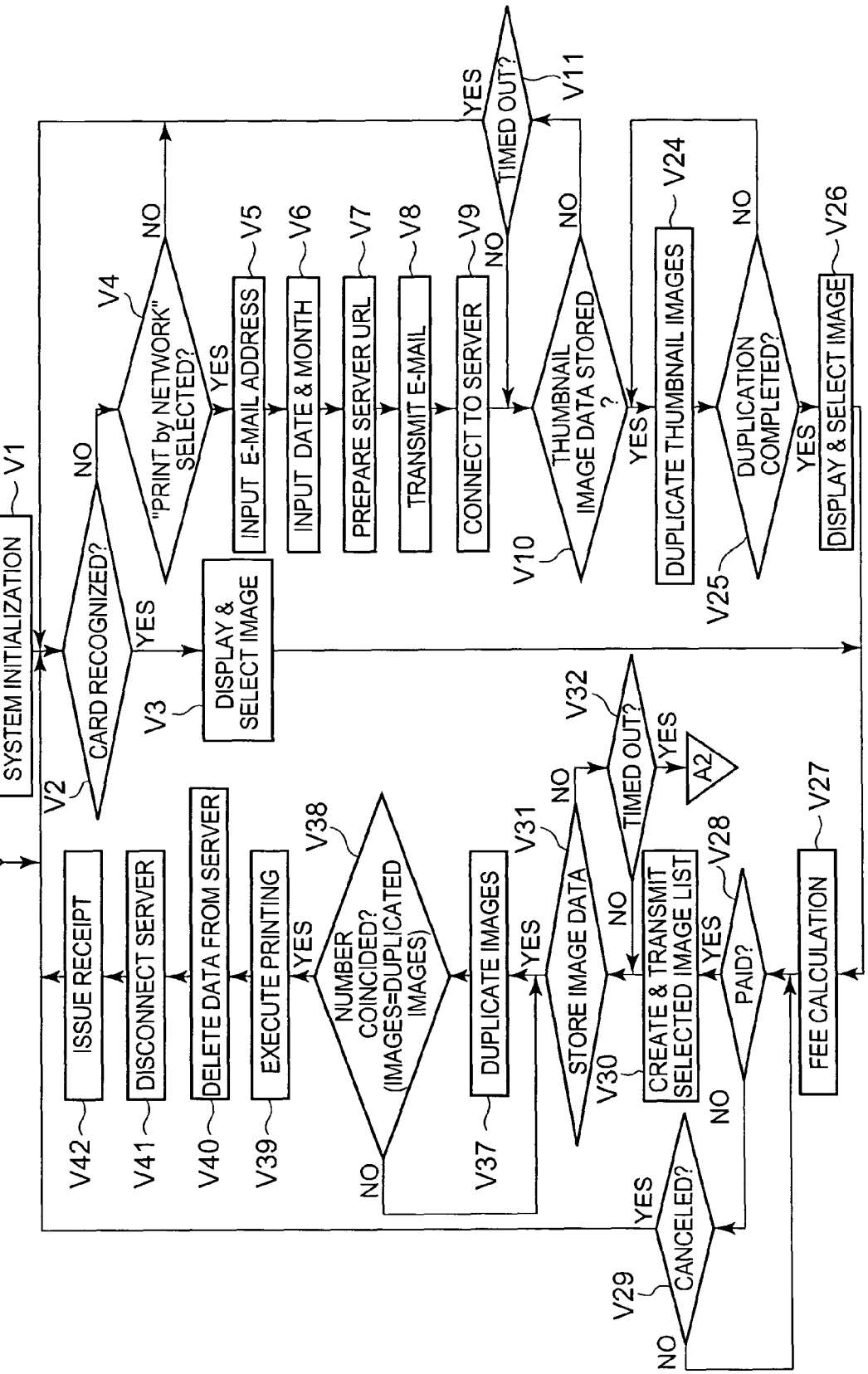
FIG. 26 is a flowchart for explaining printing process according to the fifth embodiment of the present invention.
Figure 27:
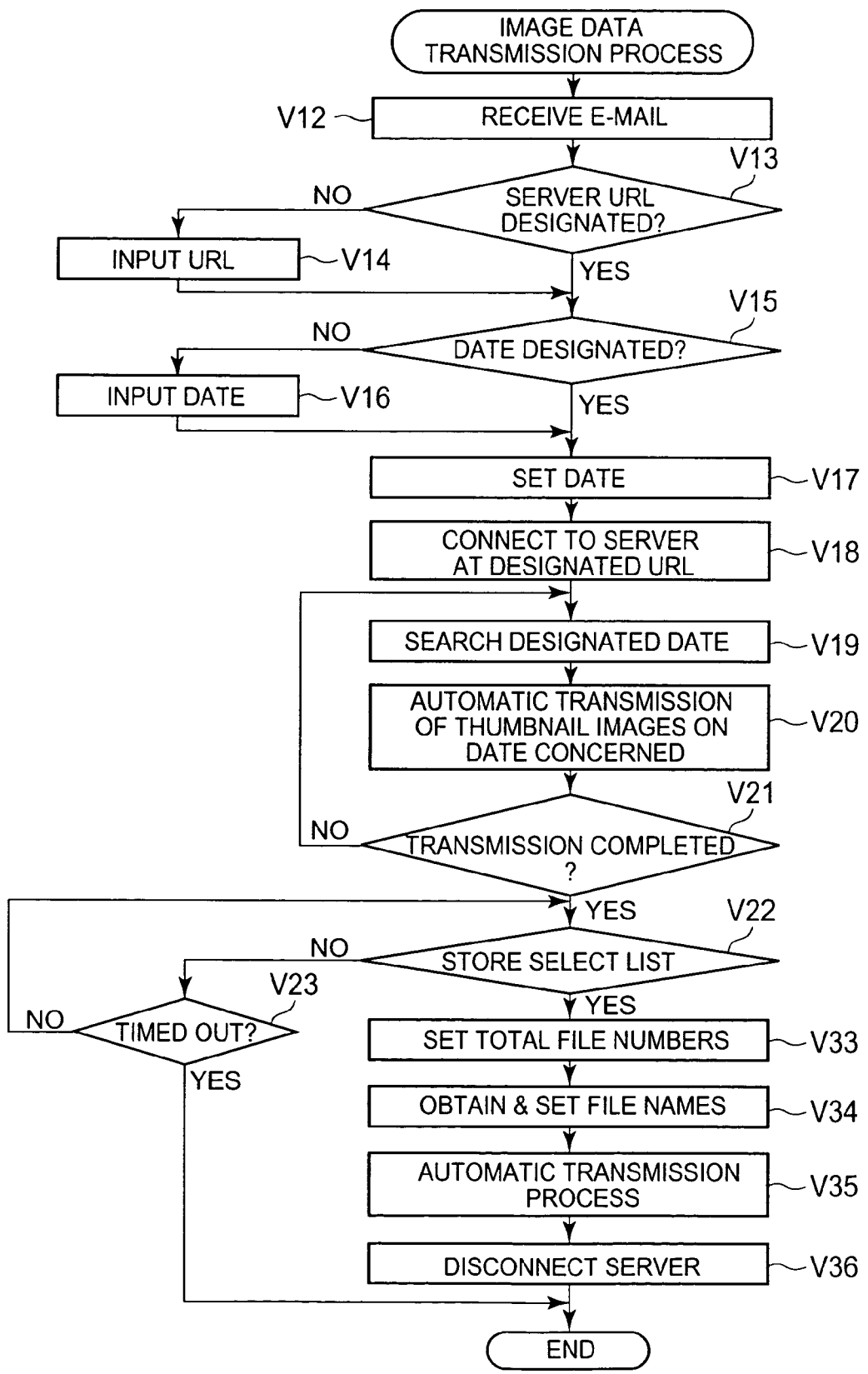
FIG. 27 is a flowchart for explaining image data transmission process according to the fifth embodiment of the present invention.
Figure 28:
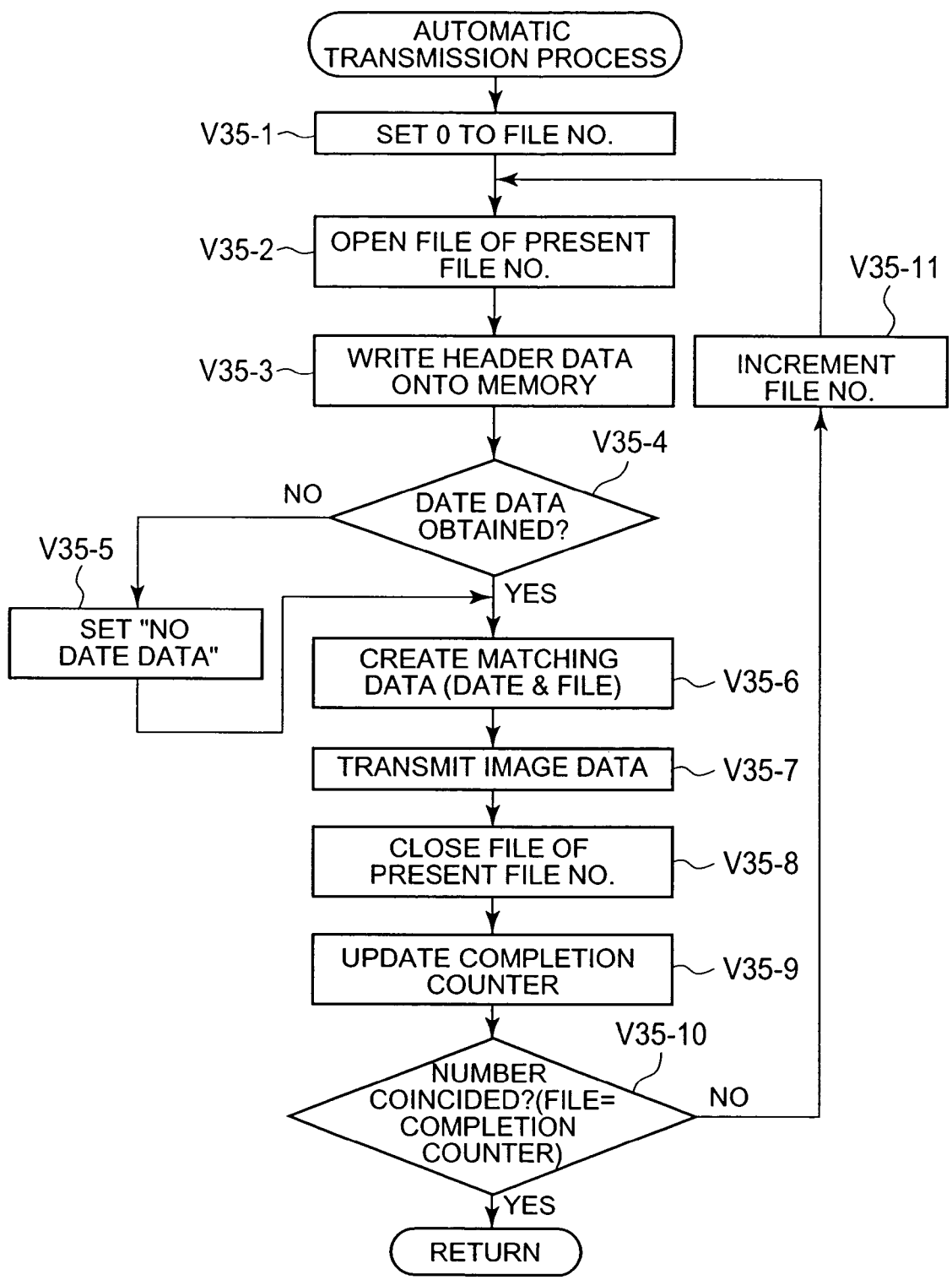
FIG. 28 is a flowchart for explaining automatic transmission process according to the fifth embodiment of the present invention.

The photo vending machine 5 executes the printing process shown in FIG. 26, while the mobile phone 2 carries out the image data transmission process shown in FIG. 27 (automatic transmission process shown in FIG. 28).

As shown in FIG. 26, the photo vending machine 5 initializes the system (V1), and detects whether the memory card is inserted or not (V2).

In case of the memory card insertion, the photo mending machine 5 obtains image data from the memory card, and stands by for the user's image selection (V3). Then, the process flow skips to V27 (described later).

In a case where no memory card is recognized, the photo vending machine 5 determines whether "Print by Network" is selected by the user or not (V4).

In case of "Print by Network", the photo vending machine 5 accepts the user's operation for inputting e-mail address (V5).

The photo vending machine 5 also accepts information representing month or date on which the images are captured (V6). Those information will be used for designating the image data. For example, the photo vending machine 5 obtains "2003/01" or "2003/02" (Year and Month) as month information, or "2003/02/20" or "2003/02/21" (Year, Month, Date) as the date information. The photo vending machine 5 generates date information based on those obtained information.

Once the assigned server URL is prepared (V7), the photo vending machine 5 adds the date information to the server URL. The photo vending machine 5 prepares an e-mail including the server URL, and transmits it to the mobile phone 2 (V8).

For example, if "2003/02/20" and "2003/02/21" are designated as date information, the server URL information includes the date information as shown in FIG. 29A. In a case where "2003/01" and "2003/02" are designated as month information, the server URL information includes the date information as shown in FIG. 29B. Or, if "2003/01" is designated as month information while "2003/02/20" is designated as date information, the server URL information includes the date information as shown in FIG. 29C. The photo vending machine 5 transmits an e-mail including such the exemplified server URL information.

After the e-mail transmission at V8 (FIG. 26), the photo vending machine 5 accesses the network server 3 (V9), and waits for arrival of the thumbnail image data from the mobile phone 2 (V10) while detecting whether timed out or not (V11). If is detected that it is timed out, the process flow returns to V2.

In response to arrival of the e-mail from the photo vending machine 5, the mobile phone 2 activates the Java application software to execute the image data transmission process shown in FIG. 27 automatically.

As shown in FIG. 27, the mobile phone 2 receives the e-mail from the photo vending machine 5 (V12), and determines whether the e-mail includes the server URL information or not (V13). In case of no server URL information, the mobile phone 2 accepts the user's manual input to obtain the server URL (V14).

The mobile phone 2 further determines whether the date information is added to the server URL information or not (V15). In case of no date information, the mobile phone 2 accepts the user's manual input in order to obtain the date information (V16).

The mobile phone 2 sets up the date search based on the date information (V17), and accesses the data center 4 in accordance with the given server URL (V18). In case of canceling or connection failure caused by incorrect URL, the image data transmission process may be canceled.

In response to establishment of the connection to the data center 4, the mobile phone 2 searches for image data corresponding to designated date (V19), and automatically transmits thumbnail image data representing found image data (V20). The thumbnail image data transmission is continued until it is determined that the thumbnail image data representing all of the found images is transmitted completely (V21).

After the transmission of the thumbnail image data, the mobile phone 2 waits for arrival of the print list given by the photo vending machine 5 (V22) while detecting whether timed out or not (V23). If time-out is detected, the mobile phone 2 may cancel the image data transmission process.

In response to reception of the thumbnail image data from the mobile phone 2, the data center 4 transfers the thumbnail image data to the designated directory for storing.

After the thumbnail image data storing at V10 (FIG. 26), the photo vending machine 5 duplicates the thumbnail image data (V24). The duplication is continued until it is determined that all thumbnail image data are duplicated (V25).

Following to the thumbnail image data duplication, the photo vending machine 5 displays thumbnail images in accordance with the thumbnail image data in order to accept the user's operation for selecting images (V26).

In accordance with the user's instruction for printing after arbitrary images are selected, the photo vending machine 5 calculates fee (V27), and waits for payment (V28, V29). If any canceling event occurs, the process flow returns to V2.

When payment is recognized at V28, the photo vending machine 5 prepares a print list indicating the selected images, and transmits it to the data center 4 (V30).

After the print list transmission, the photo vending machine 5 waits for the image data transferred from the mobile phone 2 (V31), while detecting timed out or not (V32). If time-out is detected, the process flow returns to V2.

In response to arrival of the print list from the photo vending machine 5, the data center 4 stores the print list.

After the print list is stored at V22 (FIG. 27), the mobile phone 2 refers to the print list to recognize the total number of the image files (V33). Further, the mobile phone 2 obtains file name information or the like from the print list in order to identifies the image data. Those information are set to a predetermined management table (V34).

The mobile phone 2 carries out the automatic transmission process in accordance with the contents of the management table (V35). The process will now be described with reference to FIG. 28.

As shown in FIG. 28, the mobile phone 2 initializes file No. pointer to "0" (V35-1). The file No. pointer indicates file No. of the files in the management table. The mobile phone 2 opens the image data having the file name corresponding to file No. pointed by the pointer (V35-2).

The mobile phone 2 transfers header information included in the image data concerned to the predetermined memory (V35-3), and determines whether date information is available in the header information or not (V35-4).

In a case where the date information is not available, the mobile phone 2 adds information representing "no date information" to the header information (V35-5).

Then the mobile phone 2 creates matching data of the date and file names (V35-6), and transmits image data to the data center 4 (V35-7).

After the image data transmission, the mobile phone 2 closes the image data corresponding to file No. pointed by the pointer (V35-8), and updates completion counter (V35-9). The mobile phone 2 determines whether the completion counter value becomes equal to or greater than the total file numbers or not (V35-10). That is, it is determined whether all image data to be printed are completely transmitted or not.

If the transmission of all image data has not been completed, the mobile phone 2 updates the pointer to increment file No. +1 (V35-11), and the process flow returns to V35-2.

In response to completion of the image data transmission, the automatic data transmission process is terminated, and the process flow returns to the image transmission process shown in FIG. 27.

After the completion of the automatic process, the mobile terminal 2 disconnects the data center 4 (V36), thus the image data transmission process is terminated.

In response to arrival of the image data from the mobile phone 2, the data center 4 stores the arrived image data.

Following to the image data storing at V31 (FIG. 26), the photo vending machine 5 duplicates the image data (V37). The duplication is continued until all image data are completely duplicated (V38).

After the duplication, the photo vending machine 5 prints the duplicated image data (V39). More precisely, the photo vending machine 5 prints out the image data corresponding to the date designated by the user, and outputs the photo print.

In response to completion of the printing, the photo vending machine 5 instructs the data center 4 to delete the image data (V40), and disconnects from the data center 4 (V41). Finally, the photo vending machine 5 issues a receipt (V42), and the process flow returns to V2.

According to the network printing system of the fifth embodiment, printing service for printing images captured by the mobile phone 2 having the camera function is available with using the network. In this case, since the thumbnail image data including designated date information or the image data are automatically transmitted to the photo vending machine 5 from the mobile phone 2, the users are released from operations. Moreover, the printing service is available even if the terminal device is not held by the user.

Though, the fifth embodiment above exemplifies a case where the image data are transferred to the photo vending machine 5 after those are transferred to the data center 4 once, the mobile phone 2 may transmits the image data and the like to the photo vending machine 5 directly.

Instead of the mobile phones 2 (2a, 2b, and 2c), the PC 2d or the PDA having camera function is also applicable one as the terminal device 2. Moreover, a wrist watch having camera function is also applicable. In this case, even if Java application software which realizes the above described image data transmission process is installed in the wrist watch, it works as the terminal device 2 as well as the mobile phone 2 exemplified in the fifth embodiment. Those Java application software may be downloadable from, for example, the network server 3.

Sixth Embodiment

A network printing system according to a sixth embodiment will now be described.

The network printing system of this embodiment is similar to that of the fourth embodiment, however, thumbnail image data transfer is omitted.

Hardware components of the network printing system according to the sixth embodiment are the same as those of the system according to the first embodiment shown in FIG. 1. As well as the second embodiment, the terminal devices 2 are adaptive to the Java application software. That is, the mobile phones 2a, 2b and 2c have the same structure as the structure of the mobile phones 2 according to the second embodiment.

Operations through using the system according to the sixth embodiment will now be described.

Figure 30:
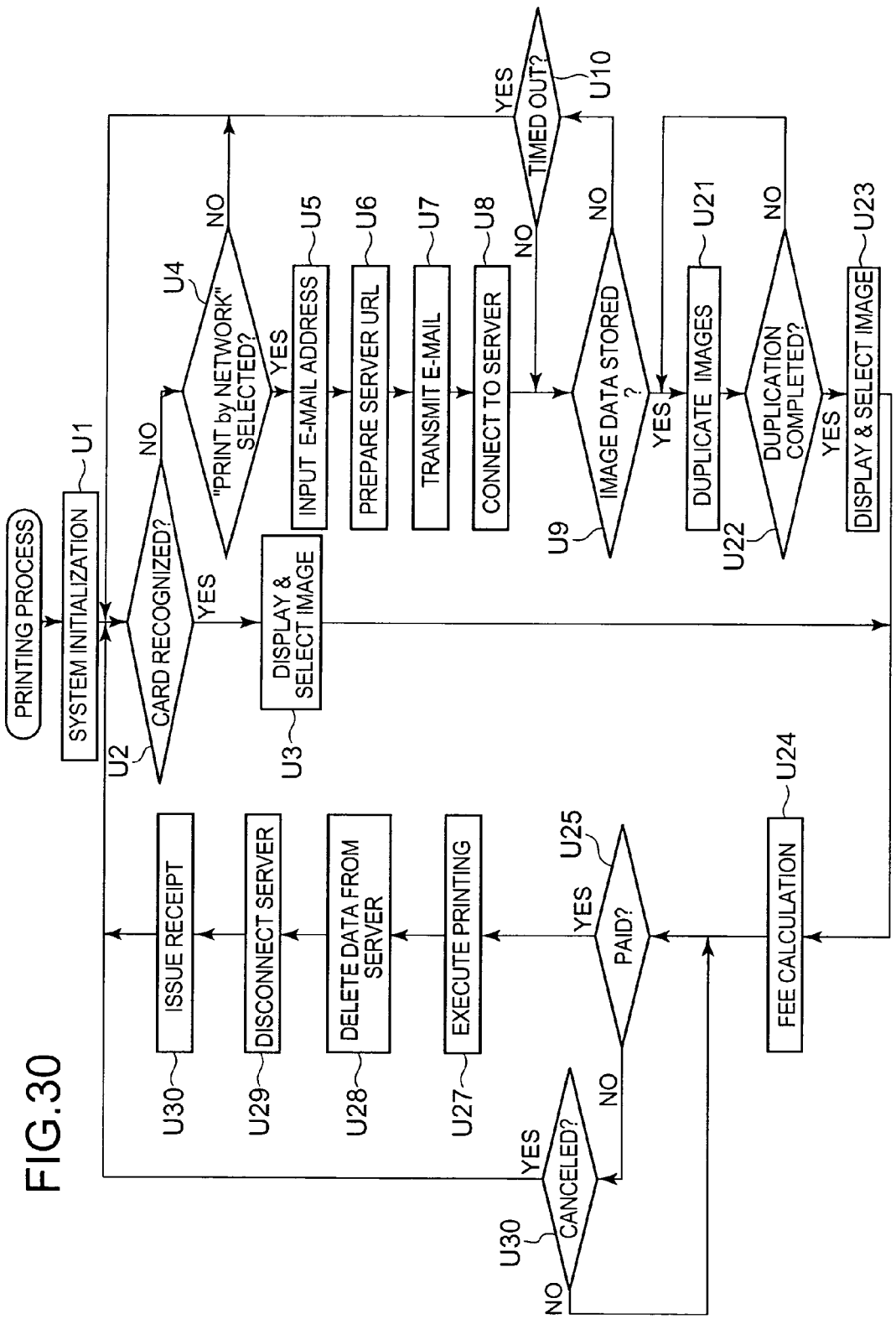
FIG. 30 is a flowchart for explaining printing process according to the sixth embodiment of the present invention.
Figure 31:
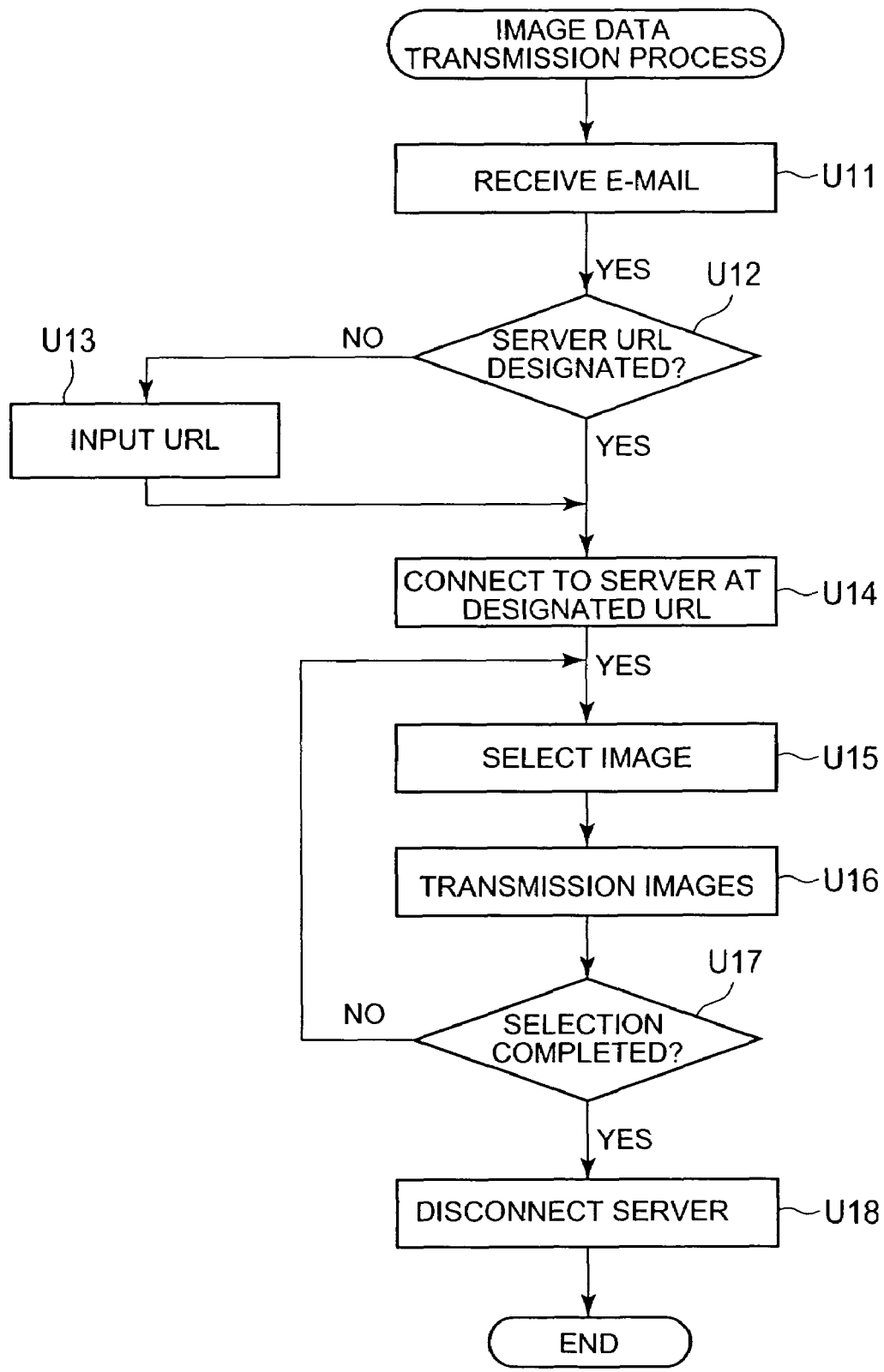
FIG. 31 is a flowchart for explaining image data transmission process according to the sixth embodiment of the present invention.

The photo vending machine 5 carries out the printing process shown in FIG. 30, while the mobile phone 2 carries out the image data transmission process shown in FIG. 31.

As shown in FIG. 30, the photo vending machine 5 initializes the system (U1), and detects whether a memory card is inserted or not (U2).

In case of the memory card insertion, the photo vending machine 5 obtains image data from the memory card, and displays the images in order to accept the user's operation for selecting images (U3). Then, the process flow skips to U24.

In a case where the memory card has not been recognized, the photo vending machine 5 determines whether the user selects "Print by Network" or not (U4).

If "Print by Network" is not selected, the process flow returns to U2. On the contrary, the photo vending machine 5 accepts the user's operation for inputting e-mail address of the user's mobile phone 2, if "Print by Network" has been selected (U5).

The photo vending machine 5 prepares server URL information assigned to the photo vending machine 5 concerned (U6), and transmits an e-mail including the server URL information to the mobile phone 2 (U7).

After the e-mail transmission, the photo vending machine 5 accesses the data center 4 (U8), and waits for arrival of the image data from the mobile phone 2 (U9), while detecting timed out or not (U10). If time-out is detected, the process flow returns to U2.

In response to reception of the e-mail from the photo vending machine 5, the mobile phone 2 activates the Java application program, thus the image data transmission process shown in FIG. 31 is automatically executed.

More precisely, the mobile phone 2 receives the e-mail from the photo vending machine 5 (U11), and determines whether the e-mail includes the server URL information or not (U12).

In case of no server URL information, the mobile phone 2 may display input form to accept the user's manual input of the server URL (U13).

Then, the mobile phone 2 accesses the data center 4 in accordance with the server URL concerned (U14). The image data transmission may be cancelled, if any cancel events such as time-out and connection failure caused by incorrect URL.

After the connection is established, the mobile phone 2 displays the images represented by the stored image data, in order to accept the user's operation for selecting the images (U15). The mobile phone 2 transmits the image data of the selected images to the data center 4 (U16). The image data transmission is continued until the user's image selection is completed (U17).

In response to the completion of the image selecting, the mobile phone 2 disconnects from the data center 4 (U18), thus the image data transmission process is terminated.

When the image data are transferred from the mobile phone 2 to the data center 4, the data center 4 carries out the responding process (described later) to store the image data in the designated directory.

In response to the image data storing at U9 (FIG. 30), the photo vending machine 5 duplicates the image data (U21). The duplication is continued until all image data are duplicated completely (U22).

After the image data duplication, the photo vending machine 5 displays the duplicated image data in order to accept the user's operation for selecting the images (U23).

In response to the user's instruction for printing after selecting desired images to be printed, the photo vending machine 5 calculates fee (U24), and waits for payment (U25, U26). If any cancel event occurs at U25, the process flow returns to U2.

When the payment is recognized, the photo vending machine 5 executes the printing (U27). That is, the photo vending machine 5 prints out the selected image data on a predetermined sheet, and outputs the photo print.

After the printing, the photo vending machine 5 instructs the data center to delete the image data therein (U28), and disconnects from the data center 4 (U29). Finally, the photo vending machine issues a receipt (U30), and the process flow returns to U2.

The responding process carried out by the data center 4 will now be described with reference to FIG. 32. The data center 4 intermediates the data transfer between the photo vending machine 5 and the mobile phone 2.

Figure 32:
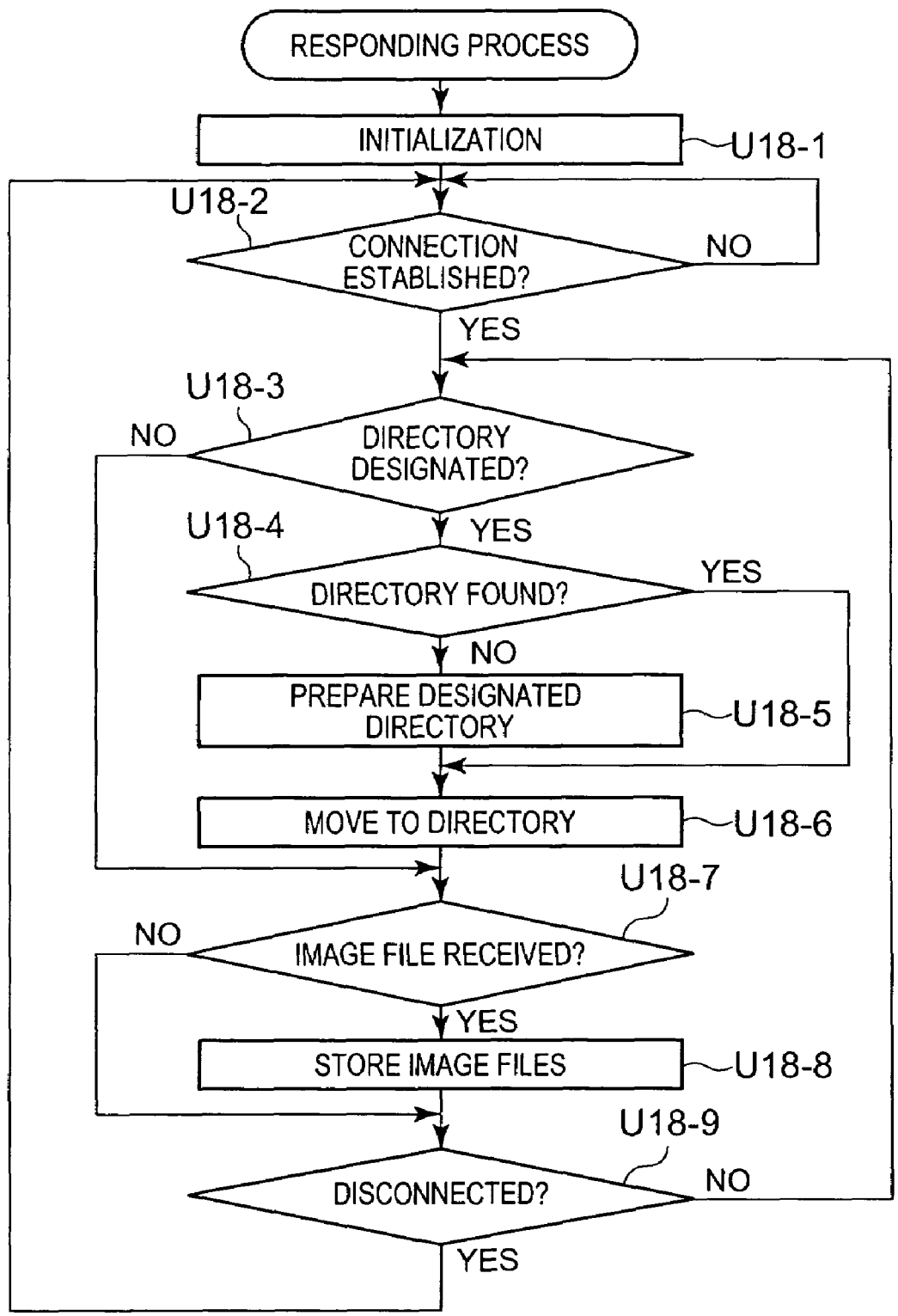
FIG. 32 is a flowchart for explaining responding process according to the sixth embodiment of the present invention.

As shown in FIG. 32, the data center 4 initializes the system (U18-1), and waits for access (U18-2).

If the data center 4 is accessed by the mobile phone 2, the data center 4 determines whether a directory is designated or not (U18-3). In case of no designation of directory, the process flow skips to U18-7 (described later). If any directory is designated, the data center 4 confirms whether the designated directory exists or not (U18-4). The data center 4 creates a directory only when the designated directory has not existed (U18-5).

The data center 4 sets the directory concerned as a current directory (U18-6).

The data center 4 determines whether the image data from the mobile phone 2 arrived or not (U18-7), and stores the image data in the current directory only when the image data arrived (U18-8).

Further, the data center 4 determines whether the connection has been maintained or not (U18-9). If the connection has been maintained, the process flow returns to U18-3, while the process flow returns to U18-2 in case of disconnection.

According to the network printing system of the sixth embodiment, printing service for printing images captured by the mobile phone 2 with camera function is available with using the network.

Though, the sixth embodiment above exemplifies a case where the image data are transferred to the photo vending machine 5 after those are transferred to the data center 4 once, the mobile phone 2 may transmits the image data and the like to the photo vending machine 5 directly.

Instead of the mobile phones 2 (2a, 2b, and 2c), the PC 2d or the PDA having camera function is also applicable one as the terminal device 2. Moreover, a wrist watch having camera function is also applicable. In this case, even if Java application software which realizes the above described image data transmission process is installed in the wrist watch, it works as the terminal device 2 as well as the mobile phone 2 exemplified in the sixth embodiment. Those Java application software may be downloadable from, for example, the network server 3.

Seventh Embodiment

A network printing system according to a seventh embodiment of the present invention will now be described.

The network printing system of this embodiment employs DPOF (Digital Print Order Format) for designating images to be printed or the number of print copies. More precisely, the image data recorded in the terminal device 2 are transferred to the photo vending machine 5 in accordance with DPOF. The photo vending machine 5 prints thus transferred image data.

Hardware components of the network printing system according to the seventh embodiment are the same as those of the system according to the first embodiment shown in FIG. 1. As well as the second embodiment, the terminal devices 2 are adaptive to the Java application software. That is, the mobile phones 2a, 2b and 2c have the same structure as the structure of the mobile phones 2 according to the second embodiment.

Figure 33:
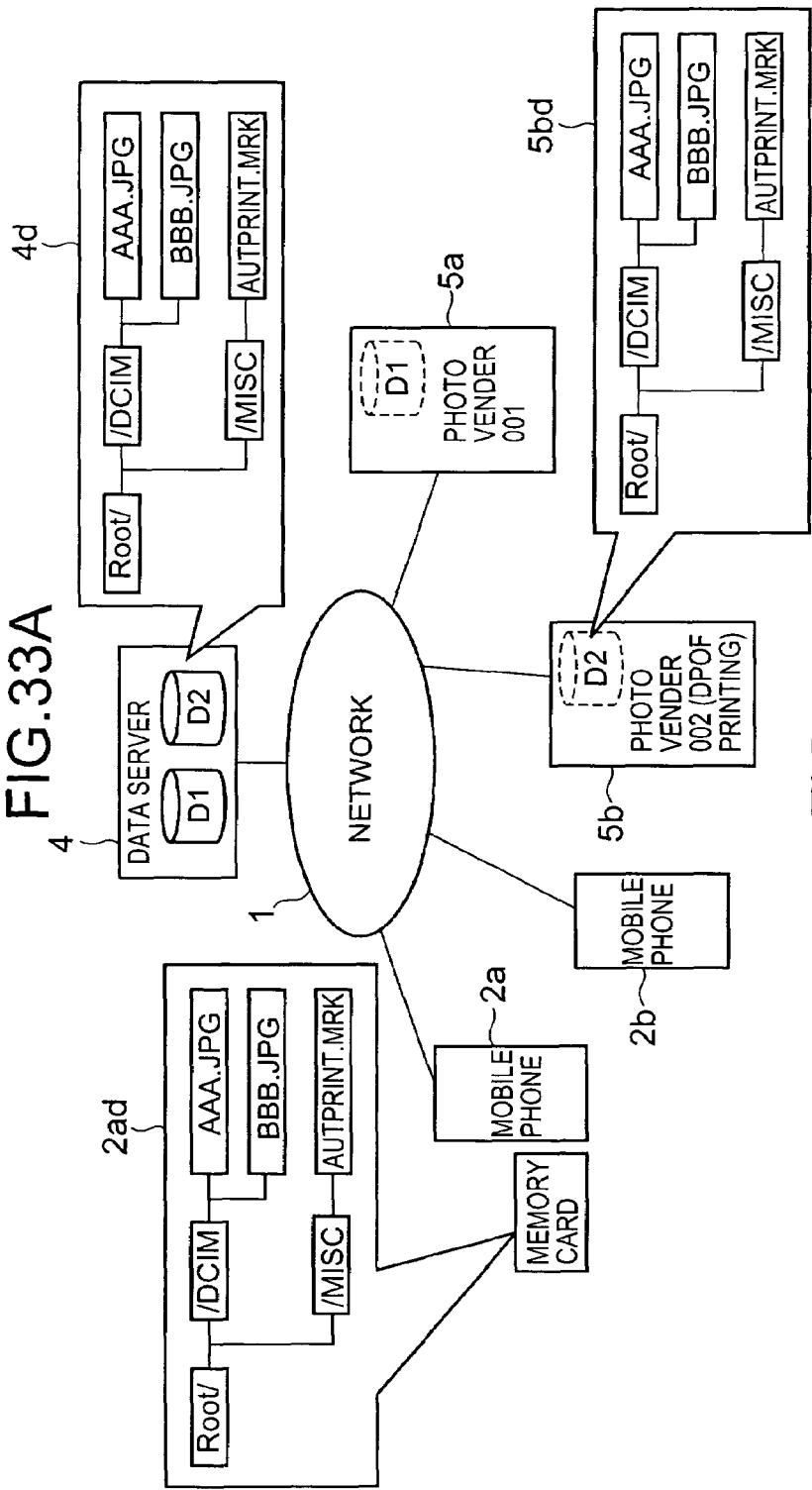
FIG. 33A is a simplified schematic view showing the network printing system according to the seventh embodiment of the present invention.
FIGS. 33B and 33C are schematic views showing exemplified server URL information set in the photo vending machine.

Operations through using the network printing system according to the seventh embodiment will now be described. For comprehensive explanation, the following description will refer to FIG. 33A which is a simplified diagram showing the whole configuration of the network printing system. FIGS. 33B and 33C are diagrams each exemplifying configuration data representing server URL assigned to the photo vending machines 5 (5a, 5b) respectively. Designation information according to DPOF is affixed to the server URL information.

Figure 34:
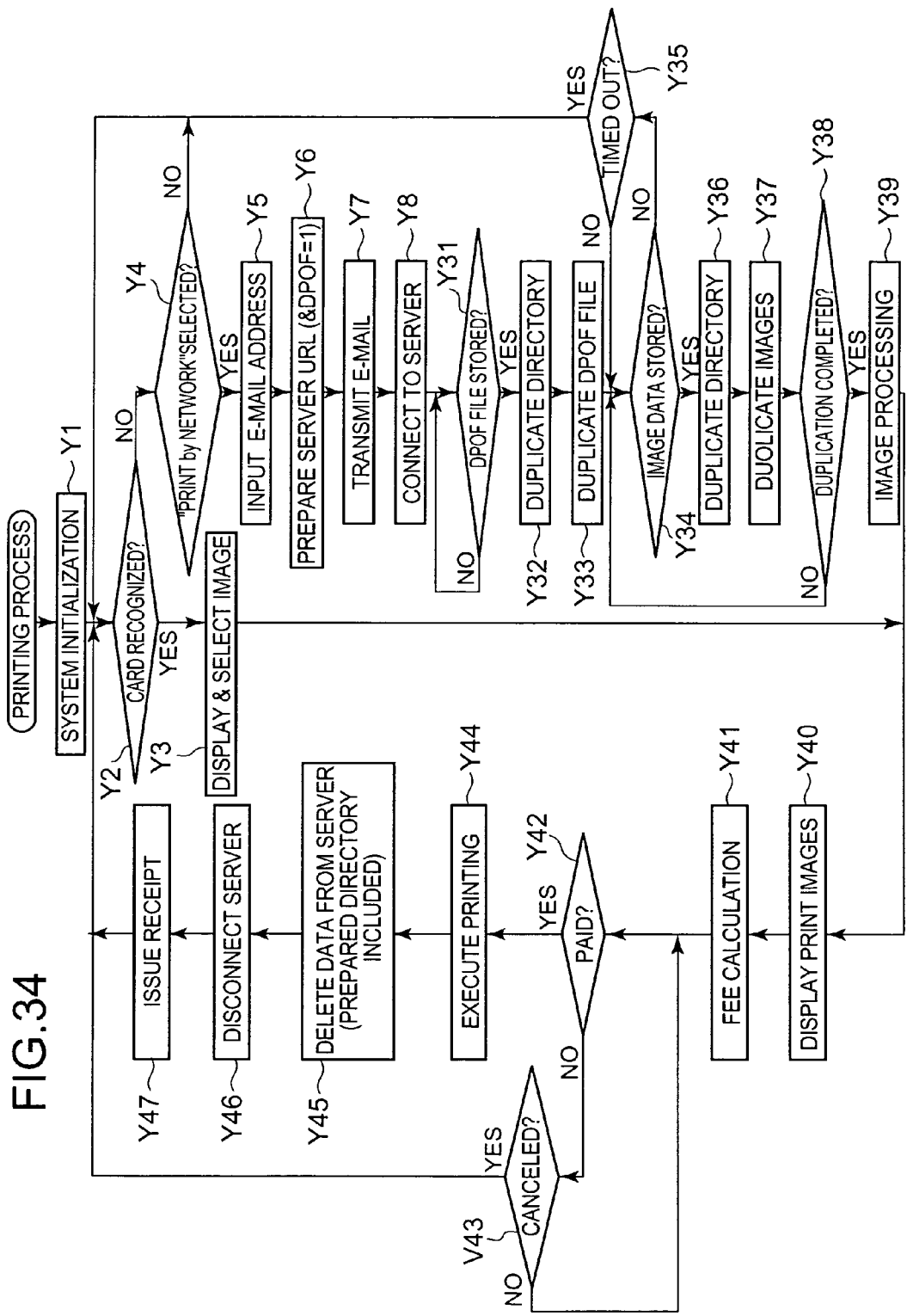
FIG. 34 is a flowchart for explaining printing process according to the seventh embodiment of the present invention.
Figure 35:
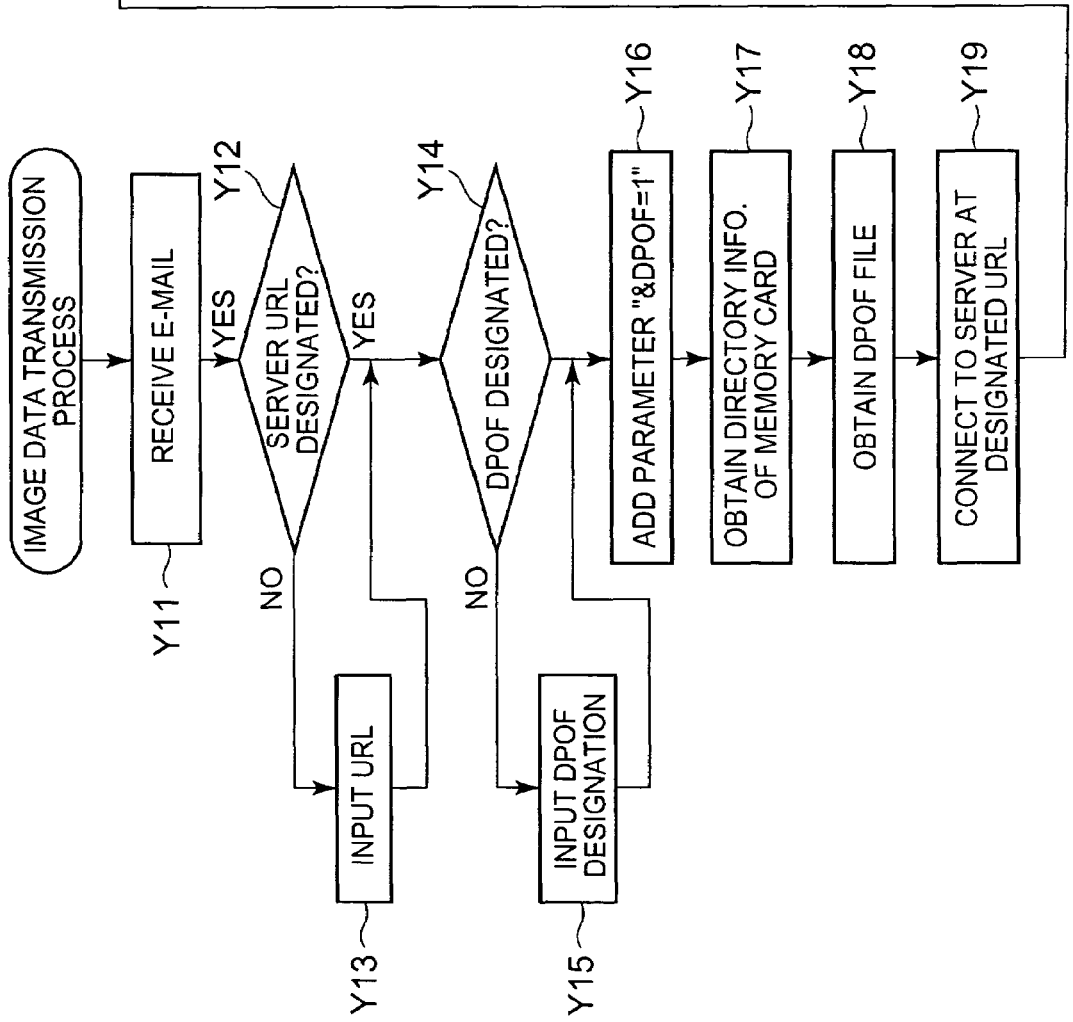
FIG. 35 is a flowchart for explaining image data transmission process according to the seventh embodiment of the present invention.

Under such the configuration, the photo vending machine 5 executes the printing process shown in FIG. 34, while the mobile phone 2 carries out the image data transmission process shown in FIG. 35.

As shown in FIG. 34, the photo vending machine 5 initializes the system (Y1), and detects whether the user inserts a memory card or not (Y2).

In case of using the memory card, the photo vending machine 5 obtains image data from the memory card, and displays the images corresponding to the image data in order to accept the user's operation for selecting the images (Y3). In this case, the process flow skips to Y40 (described later).

If the memory card is not recognized, the photo vending machine 5 determines whether "Print by Network" is selected by the user or not (Y4).

If "Print by Network" is not selected, the process flow returns to Y2, while accepting the user's input of e-mail address when "Print by Network" is selected (Y5).

The photo vending machine 5 prepares server URL information representing server RL assigned to the photo vending machine 5 concerned (Y6). The photo vending machine 5 further affixes designation information of DPOF to the prepared server URL information. Examples of the server URL information to which the DPOF designation information is affixed are shown in FIGS. 33B and 33C.

Then, the photo vending machine 5 generates an e-mail including the server URL information to which the DPOF designation information is affixed, and transmits it to the mobile phone 2 (Y7).

After the e-mail transmission, the photo vending machine 5 accesses the data server 4 (Y8).

In response to arrival of the e-mail from the photo vending machine 5, the mobile phone 2 activates the Java application program, thus the image data transmission process shown in FIG. 35 is executed automatically.

As shown in FIG. 35, the mobile phone 2 receives the e-mail from the photo vending machine 5 (Y11), and determines whether the e-mail includes the server URL information or not (Y12). In case of no URL inclusion, the mobile phone 2 obtains it by the user's input (Y13).

The mobile phone 2 further determines whether the DPOF designation information is affixed to the server URL information (Y14). In case of no DPOF information, the mobile phone 2 obtains the same by the user's input (Y15). Then, the mobile phone 2 adds a DPOF parameter to the server URL information (Y16). For example, when the DPOF designation information indicates "/001/index.php&dpof=1", the mobile phone 2 adds "$dpof='1'" to the server URL information as the parameter.

The mobile phone 2 recognize the directories in its memory card (Y17), and obtains the DPOF file (Y18). For example, the mobile phone 2 (mobile phone 2a) recognizes directory configuration 2ad in the memory card as shown in FIG. 33A, and obtains the DPOF file "AUTOPRINT.MRK" from the directory "./MISC/".

In the "./MISC/" directory, files for automatic printing, automatic data transmission, automatic image display, and the like. Those files are components of the DPOF file.

The mobile phone 2 accesses the data server 4 in accordance with the server URL information (Y19). The image data transmission process may be canceled by time-out or access failure caused by incorrect URL.

After the connection is established, the mobile phone 2 transmits directory name information representing name of the directory where the DPOF file is stored (Y20). For example, in a case where the mobile phone 2 recognizes the directory configuration 2ad shown in FIG. 33A, information representing the directory name "./MISK/" is transmitted to the data server 4. Following to this action, the mobile phone 2 transmits the DPOF file to the data server 4 (Y21). In this case, the mobile phone 2 transmits the DPOF file "AUTOPRINT.MRK" in case of the directory configuration 2ad.

Further, the mobile phone 2 transmits information representing name of the directory storing the image data, to the data server 4 (Y22). In case of the directory configuration 2ad, for example, the mobile phone 2 transmits information representing "./DCIM" which is the name of the directory storing the image data. Then, the mobile phone 2 transmits the image data designated by the DPOF file to the data server 4 (Y23). In a case where, for example, the directory configuration 2ad has been recognized while "AAA.JPG" and "BBB.JPG" are designated by "AUTOPRINT.MRK" as the image data to be printed, the mobile phone 2 transmits the image data "AAA.JPG" and "BBB.JPG" sequentially. Such the data transmission is continued until all image data designated by the DPOF file are transmitted completely (Y24).

In response to the completion of the data transmission, the mobile phone 2 disconnects from the data server 4 (Y25), thus the image data transmission process is terminated.

The data server 4 carries out the responding process (described later) to prepare directory, and stores the DPOF file or the image files in the directory concerned. For example, the data server 4 duplicates the directory configuration 4d shown in FIG. 33A in accordance with the directory name information, the DPOF file, and the image file sent by the mobile phone 2.

The photo vending machine 5 which has accessed the data server 4 at Y8 (FIG. 34), waits for storing of the DPOF file (Y31). When the DPOF file is stored in the data server 4, the photo vending machine 5 duplicates the directory of the DPOF file (Y32), and duplicates the DPOF file into the duplicated directory (Y33).

The photo vending machine 5 further waits for storing the image data (Y34) while detecting whether timed out or not (Y35). In case of time-out, the process flow returns to Y2.

After the image data are stored in the data server 4, the photo vending machine 5 duplicates the directory of the image data (Y36), and duplicates the image data (Y37). The duplication is continued until all image data are duplicated completely (Y38).

For example, if the directory configuration 4d (including DPOF file and image data) shown in FIG. 33A is stored in the data server 4, the photo vending machine 5 (5a) duplicates the directory configuration 5bd as shown in FIG. 33A.

The photo vending machine 5 carries out image processing in accordance with the contents of the DPOF file after the duplication of the image data and the like is completed (Y39). Then, the photo vending machine 5 displays images to be printed (Y40). For example, the photo vending machine 5 carries out the image processing such as trimming, superimposing, and date imprint, and displays the images after the image processing.

In accordance with the user's instruction for printing, the photo vending machine 5 calculates fee (Y41) and waits for payment (Y42, Y43). If any cancel event occurs at Y43, the process flow returns to Y2.

After the payment, the photo vending machine 5 executes the printing (Y44).

The photo vending machine 5 instruct the data server 4 to delete the data, after the printing is completed (Y45). More precisely, deletion of DPOF file, image data, and directory is demanded.

The photo vending machine 5 disconnects from the data server 4 (Y46), and issues a receipt (Y47). Then the process flow returns to Y2.

The responding process carried out by the data server 4 which intermediates the data transfer between the photo vending machine 5 and the mobile phone 2 will now be described with reference to FIG. 36.

Figure 36:
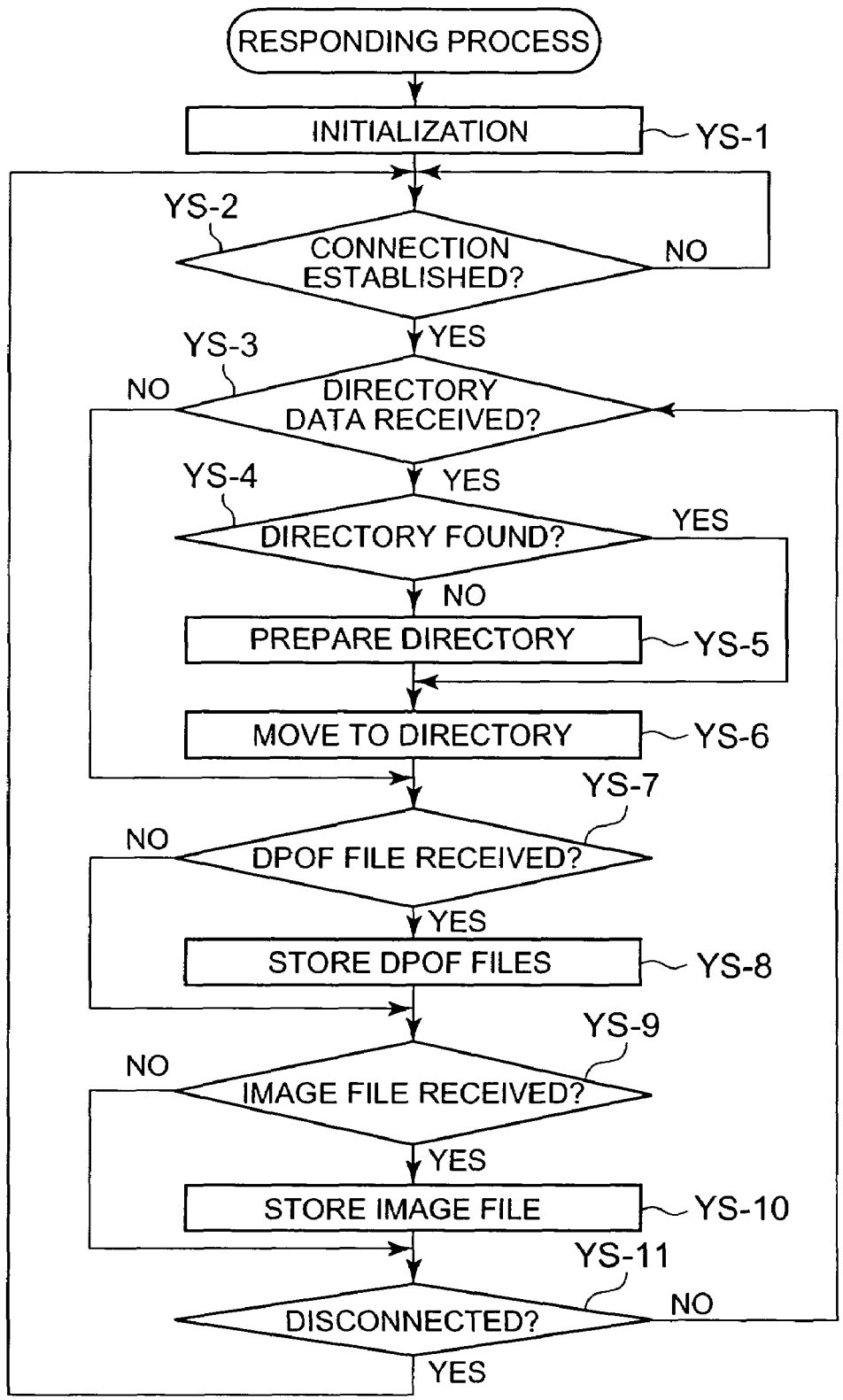
FIG. 36 is a flowchart for explaining responding process according to the seventh embodiment of the present invention.

As shown in FIG. 36, the data server 4 initializes the system (YS-1), and waits for access (YS-2).

In response to access from the mobile phone 2 or the like, the data server 4 determines whether a directory is designated or not (YS-3). In case of no directory designation, the process flow skips to YS-7 (described later).

In a case where a directory is designated, the data server 4 recognizes the existence of the directory concerned (YS-4), and prepares the directory only if the designated directory has not existed (YS-5). The data server 4 indicates the directory concerned as current directory (YS-6).

The data server 4 determines whether the DPOF file from the mobile phone 2 has arrived or not (YS-7). Only when the DPOF file has arrived, the data server 4 stores it in the current directory (YS-8).

The data server 4 further determines whether the image data from the mobile phone 2 have arrived or not (YS-9). Only when the image data have arrived, the data server 4 stores them in the current directory (YS-10).

Then the data server 4 detects whether the mobile phone 2 is disconnected or not (YS-11). If the connection has been maintained, the process flow returns to YS-3. When the disconnection is detected, the process flow returns to YS-2.

According to the network printing system of the seventh embodiment, printing service for printing images captured by the mobile phone 2 with camera function is available with using the network. According to the seventh embodiment, the image data designated by the DPOF file of the mobile phone 2 are automatically transferred to the photo vending machine 5, thus the users are released from troublesome operations when using the system. Moreover, it does not require the user to bring the terminal device with him/her at the time of printing.

Though, the seventh embodiment above exemplifies a case where the image data are transferred to the photo vending machine 5 after those are transferred to the data server 4 once, the mobile phone 2 may transmits the image data and the like to the photo vending machine 5 directly.

Instead of the mobile phones 2 (2*a*, 2*b*, and 2*c*), the PC 2*d* or the PDA having camera function is also applicable one as the terminal device 2. Moreover, a wrist watch having camera function is also applicable. In this case, even if Java application software which realizes the above described image data transmission process is installed in the wrist watch, it works as the terminal device 2 as well as the mobile phone 2 exemplified in the seventh embodiment. Those Java application software may be downloadable from, for example, the network server 3.

Through the fourth to seventh embodiments, the photo vending machine 5 obtains e-mail address of the mobile phone 2 itself. However, the photo vending machine 5 may obtain user ID or nickname from the user, and asks the data center (data server) 4 or the like the e-mail address of the mobile phone 2 with notifying the user ID or nickname.

In this case, the data center (data server) 4 may previously have account information including an address finder table 4*t* as shown in FIG. 37. The address finder table 4*t* records relational information for introducing e-mail address based on user ID, nickname, phone number, manufacturing No. (serial No.) of the mobile phone 2, and the like.

When a user inputs any one of nickname, phone No. and serial No. on the photo vending machine 5, the data center (data server) 4 refers the address finder table 4*t*, and informs the photo vending machine 5 of the e-mail address of the user's mobile phone 2.

The e-mail address information or the like may be supplied to the photo vending machine 5 during the data transfer between the mobile phone 2 and the photo vending machine 5. For example, the mobile phone 2 displays predetermined QR code (2 dimensional code) to be presented to the photo vending machine 5. That is, the photo vending machine 5 may scan the QR code displayed on the mobile phone 2 to obtain the e-mail address information. Instead of the QR code, predetermined color code may be applicable. Or, the mobile phone 2 may display text information representing the e-mail address, and the photo vending machine 5 may carry out character recognition to obtain the e-mail address.

Any communications method such as infrared or wireless communications (wireless LAN, Bluetooth, or the like) may be applicable for transferring data from the mobile phone 2 to the photo vending machine 5.

According to the above description, the present invention realizes printing service for printing images captured by any terminal device, via the network.

Moreover, more useful and interest photo prints are available by the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the resent invention.

This application is based on Japanese Patent Application Nos. 2002-186829 (filed on Jun. 26, 2002) and 2003-092495 (filed on Mar. 28, 2003), and including specification, claims, drawings and summary. The disclosure of the above Japanese Patent Applications are incorporated herein by reference in its entirety.

What is claimed is:

1. A network printing system comprising a terminal device, a server, and a printing machine that are connected to each other via a network,
   wherein the printing machine comprises:
   an e-mail address acquiring unit which acquires an e-mail address of said terminal device;
   an address generating unit which generates a temporary address indicating a storage area of said server, said storage area being reserved to temporarily store image data which has not yet been received by the server;
   an e-mail transmitter which transmits an e-mail, which includes the temporary address generated by said address generating unit, to the e-mail address acquired by said e-mail address acquiring unit;
   a determiner which determines whether image data has been transmitted by said terminal device to be stored at the storage area designated by the temporary address;
   a receiver which accesses said server and designates the temporary address to receive image data transmitted by said server in response to the access, if said determiner determines that the image data has been transmitted by said terminal device to be stored at the storage area designated by the temporary address; and
   a printing unit which prints the image data received by said receiver;
   wherein the terminal device comprises:
   an image capturing unit which captures images of subjects and generates image data representing the captured images;
   an e-mail receiver which receives the e-mail including the temporary address, from said printing machine; and
   a transmitter which accesses the temporary address indicating the storage area of said server included in the e-mail received by said e-mail receiver, and which transmits image data generated by said image capturing unit to said server; and
   wherein said server comprises:
   an image receiver which receives the image data transmitted from said terminal device that has accessed the temporary address;
   a storage unit which stores the image data received by said image receiver at the storage area designated by the temporary address; and
   an image transmitter which transmits designated image data stored at the storage area designated by the temporary address in said storage unit, to said printing machine in response to the access by said printing machine designating the temporary address.

2. The network printing system according to claim 1, wherein said terminal device further comprises:
   a memory unit which sequentially stores the image data generated by said image capturing unit; and
   an image retriever which retrieves image data corresponding to an arbitrary date of capturing, from said memory unit,
   wherein the e-mail from said printing machine which is received by said e-mail receiver includes date information representing a designated date, wherein said image retriever retrieves the image data from said memory unit in accordance with the date information included in the e-mail received by said e-mail receiver, and wherein said transmitter transmits the image data retrieved by said image retriever to said server.

3. The network printing system according to claim 1, wherein said terminal device further comprises a memory unit which stores DPOF information which designates at least image data to be printed, while sequentially storing the image data generated by said image capturing unit, and wherein in response to the e-mail from the printing machine received by the e-mail receiver, said transmitter transmits the image data designated by the DPOF information stored in said memory unit to said server.

4. A network printing system comprising a terminal device, a server, and a printing machine that are connected to each other via a network, wherein said printing machine acquires an e-mail address of said terminal device, generates a temporary address indicating a storage area of said server, said storage area being reserved to temporarily store image data which has not yet been received by the server, and transmits an email including the generated temporary address to the e-mail address of said terminal device;

wherein said terminal device accesses the temporary address indicating the storage area of said server that is included in the e-mail transmitted by said printing machine, and transmits image data representing a captured subject to said server;

wherein said server stores the image data transmitted from said terminal device at the storage area designed by the temporary address, and transmits designated image data that is stored at the storage area designated by the temporary address to said printing machine, in response to said printing machine accessing said server and designating the temporary address; and wherein said printing machine determines whether the image data has been transmitted by said terminal device to be stored at the storage area designated by the temporary address, accesses said server and designates the temporary address when it is determined that the image data has been transmitted by said terminal device to be stored at the storage area designated by the temporary address, receives the image data transmitted from said server in response to the access by said printing machine, and prints the received image data.

5. A server that is connected to a terminal device and a printing machine via a network, the server comprising:

an image receiver which receives image data transmitted by said terminal device when said terminal device accesses said server and designates a temporary address indicating a storage area of said server, said storage area being reserved to temporarily store image data which has not yet been received by the server;

a storage unit which stores, at the storage area designated by the temporary address, the image data received by said image receiver; and an image transmitter which transmits designated image data that is stored at the storage area designated by the temporary address in said storage unit to said printing machine so as to print the designated image data, in response to the printing machine accessing said terminal device and designating the temporary address.

6. A printing machine that is connected to a terminal device and a server via a network, the printing machine comprising:

an e-mail address acquiring unit which acquires an e-mail address of said terminal device;

an address generating unit which generates a temporary address indicating a storage area of said server, said storage area being reserved to temporarily store image data which has not yet been received by the server;

an e-mail transmitter which transmits an e-mail, which includes the temporary address generated by said address generating unit, to the e-mail address acquired by said e-mail address acquiring unit;

a determiner which determines whether image data has been transmitted by said terminal device to be stored at the storage area designated by the temporary address;

a receiver which accesses said server and designates the temporary address to receive image data transmitted by said server in response to the access, when said determiner determines that the image data has been transmitted by said terminal device to be stored at the storage area designated by the temporary address; and a printing unit which prints the image data received by said receiver.

7. A printing method for a system including a terminal device, a server, and a printing machine that are connected to each other via a network, the method comprising:

acquiring an e-mail address of said terminal device, by said printing machine;

generating a temporary address indicating a storage area of said server, by said printing machine, said storage area being reserved to temporarily store image data which has not yet been received by the server;

transmitting an e-mail from said printing machine to said acquired e-mail address of said terminal device, said e-mail including the temporary address;

receiving the e-mail including the temporary address, by said terminal device;

accessing said server and designating said temporary address included in the received e-mail, by said terminal device;

transferring image data captured by said terminal device from said terminal device to said server;

storing the transferred image data at the storage area of said server designated by the temporary address;

transferring designated image data, which is stored at the storage area designated by the temporary address, from said server to said printing machine, in response to said printing machine accessing said server and designating said temporary address; and printing the image data transferred to said printing machine, by said printing machine.

8. A printing method for a printing machine that is connected to a terminal device and a server via a network, the method comprising:

acquiring an e-mail address of said terminal device;

generating a temporary address indicating a storage area of said server, said storage area being reserved to temporarily store image data which has not yet been received by the server;

transmitting an e-mail including the temporary address to the acquired e-mail address of said terminal device;

determining whether image data has been transferred from said terminal device to said server to be stored at the storage area designated by the temporary address included in the e-mail;

accessing said server and designating the temporary address if it is determined that the image data has been transferred from said terminal device to be stored at the storage area designated by the temporary address, to receive image data transferred from said server in response to the access; and printing the received image data.

* * * * *

UNITED STATES PATENT AND TRADEMARK OFFICE
CERTIFICATE OF CORRECTION

| | |
|---|---|
| PATENT NO. | : 7,515,289 B2 |
| APPLICATION NO. | : 10/602362 |
| DATED | : April 7, 2009 |
| INVENTOR(S) | : Toshihiko Ohtuka |

It is certified that error appears in the above-identified patent and that said Letters Patent is hereby corrected as shown below:

On the Title page:

Below item (65) Prior Publication Data:

Insert --(30) Foreign Application Priority Data

Jun. 06, 2002 (JP)........2002-186829

Mar. 28, 2003 (JP)........2003-92495--.

Signed and Sealed this

Nineteenth Day of January, 2010

David J. Kappos
*Director of the United States Patent and Trademark Office*